United States Patent
Haws

(10) Patent No.: US 9,930,830 B2
(45) Date of Patent: Apr. 3, 2018

(54) SELECTIVE HARVESTER

(71) Applicant: Spencer Kim Haws, Richland, WA (US)

(72) Inventor: Spencer Kim Haws, Richland, WA (US)

(*) Notice: Subject to any disclaimer, the term of this patent is extended or adjusted under 35 U.S.C. 154(b) by 0 days.

(21) Appl. No.: 15/143,403

(22) Filed: Apr. 29, 2016

(65) Prior Publication Data

US 2016/0235000 A1 Aug. 18, 2016

Related U.S. Application Data

(63) Continuation of application No. 12/789,402, filed on May 27, 2010, now Pat. No. 9,357,704.

(60) Provisional application No. 61/183,014, filed on Jun. 1, 2009.

(51) Int. Cl.
  *A01D 45/00* (2006.01)
  *A01D 34/01* (2006.01)
  *A01D 101/00* (2006.01)

(52) U.S. Cl.
  CPC ......... *A01D 34/015* (2013.01); *A01D 45/007* (2013.01); *A01D 2101/00* (2013.01)

(58) Field of Classification Search
  CPC ...... A01D 45/26; A01D 45/005; A01D 45/00; A01D 45/007; A01D 25/048; A01D 31/00; A01D 33/08; A01D 34/005; A01D 34/243; A01D 25/042; A01D 34/015; A01D 2101/00; A01G 23/095
  USPC ....... 56/13.8, 327.1, 328.1, 13.5, 12.7, 16.9, 56/17.5, 153, 156, 194, 13.6, 327.2
  See application file for complete search history.

(56) References Cited

U.S. PATENT DOCUMENTS

| | | | |
|---|---|---|---|
| 2,202,433 A | 5/1940 | Shumacher |
| 2,322,926 A | 6/1943 | Dorland |
| 2,579,584 A | 12/1951 | Kachelhoffer |
| 2,767,544 A | 10/1956 | Turkington |
| 2,791,878 A | 5/1957 | Kepner |
| 2,827,746 A | 3/1958 | Bouilliant-Linet |
| 2,891,369 A | 6/1959 | Rietz |
| 3,025,067 A | 3/1962 | Raney et al. |
| 3,176,456 A | 4/1965 | Franzen |
| 3,373,548 A | 3/1968 | Meyers et al. |
| 3,380,234 A | 4/1968 | Garrett |
| 3,400,527 A | 9/1968 | Woodring |
| 3,411,279 A | 11/1968 | Woodring et al. |
| 3,412,541 A | 11/1968 | Fuchs |
| 3,447,292 A | 6/1969 | Rehmke |
| 3,548,950 A | 12/1970 | Phelan et al. |
| 3,690,382 A | 9/1972 | Bradbury |
| 3,704,733 A | 12/1972 | McColl |
| 3,970,150 A | 7/1976 | Gibson |

(Continued)

OTHER PUBLICATIONS

U.S. Appl. No. 61/183,014 titled "Selective Harvester," filed Jun. 1, 2009 by inventor Spencer Kim Haws, 57 pages.

(Continued)

*Primary Examiner* — Robert E Pezzuto
(74) *Attorney, Agent, or Firm* — Rainier Patents, P.S.; Paul W. Mitchell; Remembrance Newcombe

(57) ABSTRACT

The present application relates to selective harvesting of agricultural objects, such as asparagus spears. One described example relates to a harvester that includes at least one set of independently controllable cutter arm assemblies that rotate about a common axis to harvest individual asparagus spears.

5 Claims, 43 Drawing Sheets

(56) References Cited

U.S. PATENT DOCUMENTS

| | | | |
|---|---|---|---|
| 4,003,193 A | 1/1977 | Haws | |
| 4,059,943 A | 11/1977 | Peasley | |
| 4,064,682 A | 12/1977 | Haws | |
| 4,196,568 A * | 4/1980 | Perry | A01D 34/005 56/13.8 |
| 4,236,581 A | 12/1980 | Beckett | |
| 4,253,296 A | 3/1981 | Boydston | |
| 4,288,970 A | 9/1981 | Wilde | |
| 4,291,525 A | 9/1981 | Benkert | |
| 4,425,751 A | 1/1984 | Bousseau et al. | |
| 4,512,145 A | 4/1985 | Lund | |
| 4,580,396 A | 4/1986 | Tanke | |
| 4,918,909 A | 4/1990 | Salkeld | |
| 5,626,007 A | 5/1997 | Harrington | |
| 8,136,336 B2 | 3/2012 | Haws | |
| 8,656,695 B2 | 2/2014 | Haws | |
| 2011/0126504 A1 | 6/2011 | Haws | |
| 2011/0131943 A1 | 6/2011 | Haws | |

OTHER PUBLICATIONS

Non-final Office Action dated Apr. 5, 2011 from U.S. Appl. No. 12/789,379, 11 pages.
Response filed Aug. 3, 2011 to Non-final Office Action dated Apr. 5, 2011 from U.S. Appl. No. 12/789,379, 13 pages.
Examiner Interview Summary Record dated Aug. 10, 2011 from U.S. Appl. No. 12/789,379, 3 pages.
Final Office Action dated Nov. 1, 2011 from U.S. Appl. No. 12/789,379, 11 pages.
Response filed Dec. 27, 2011 to Final Office Action dated Nov. 1, 2011 from U.S. Appl. No. 12/789,379, 11 pages.
Notice of Allowance dated Jan. 25, 2012 from U.S. Appl. No. 12/789,379, 7 pages.
Non-Final Office Action dated Sep. 24, 2012 from U.S. Appl. No. 12/789,402, 15 pages.
Response filed Feb. 25, 2013 to the Non-Final Office Action dated Sep. 24, 2012 from U.S. Appl. No. 12/789,402, 10 pages.
Final Office Action dated Oct. 8, 2014 from U.S. Appl. No. 12/789,402, 16 pages.
Response filed Dec. 31, 2014 to the Final Office Action dated Oct. 8, 2014 from U.S. Appl. No. 12/789,402, 13 pages.
Non-Final Office Action dated Dec. 1, 2015 from U.S. Appl. No. 12/789,402, 16 pages.
Response filed Mar. 28, 2016 to the Non-Final Office Action dated Dec. 1, 2015 from U.S. Appl. No. 12/789,402, 8 pages.
Notice of Allowance dated Apr. 20, 2016 from U.S. Appl. No. 12/789,402, 9 pages.
Non-Final Office Action dated Nov. 30, 2012 from U.S. Appl. No. 12/789,410, 18pages.
Response filed Mar. 26, 2013 to Non-Final Office Action dated Nov. 30, 2012 from U.S. Appl. No. 12/789,410, 15 pages.
Final Office Action dated Dec. 5, 2014 from U.S. Appl. No. 12/789,410, 10 pages.
Response filed Mar. 25, 2015 to Final Office Action dated Dec. 5, 2014 from U.S. Appl. No. 12/789,410, 12 pages.
Non-Final Office Action dated Dec. 14, 2015 from U.S. Appl. No. 12/789,410, 6 pages.
Response filed Mar. 28, 2016 to the Non-Final Office Action dated Dec. 14, 2015 from U.S. Appl. No. 12/789,410, 9 pages.
Notice of Allowance dated Apr. 19, 2016 from U.S. Appl. No. 12/789,410, 10 pages.
Requirement for Restriction/Election dated Sep. 20, 2012 from U.S. Appl. No. 12/789,390, 6 pages.
Response filed Oct. 16, 2012 to Restriction Requirement dated Sep. 20, 2012 from U.S. Appl. No. 12/789,390, 4 pages.
Non-final Office Action dated Dec. 14, 2012 from U.S. Appl. No. 12/789,390, 12 pages.
Response filed Mar. 26, 1013 to Non-final Office Action dated Dec. 14, 2012 from U.S. Appl. No. 12/789,390, 10 pages.
Notice of Allowance dated Oct. 11, 2013 from U.S. Appl. No. 12/789,390, 10 pages.

* cited by examiner

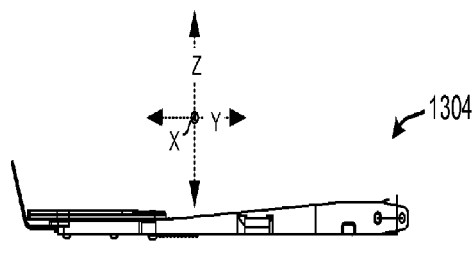
FIG. 18
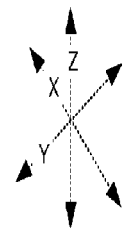
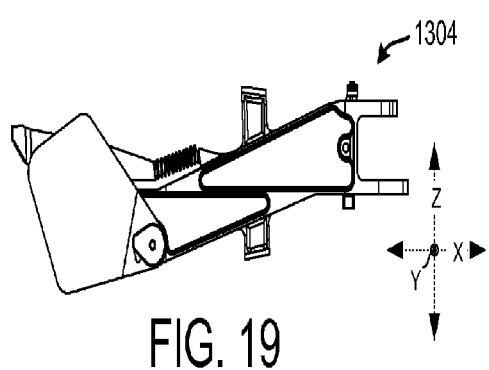
FIG. 19
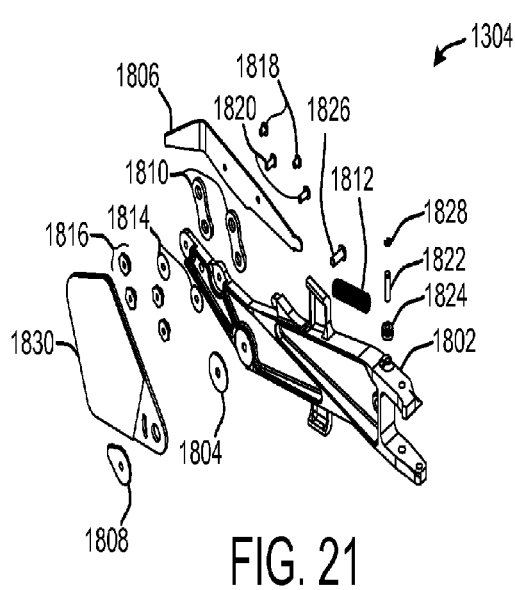
FIG. 21
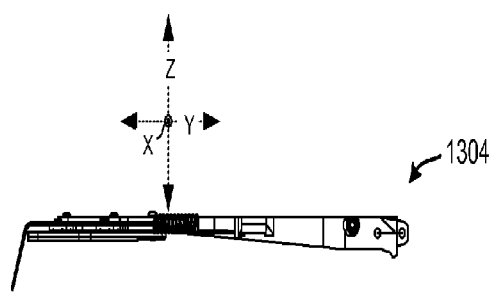
FIG. 20

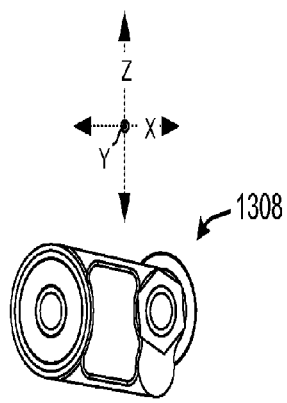
FIG. 27
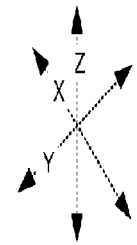
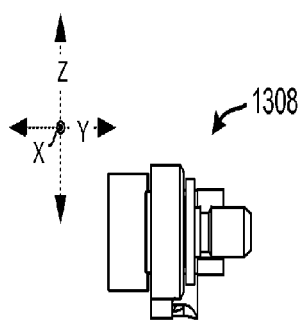
FIG. 28
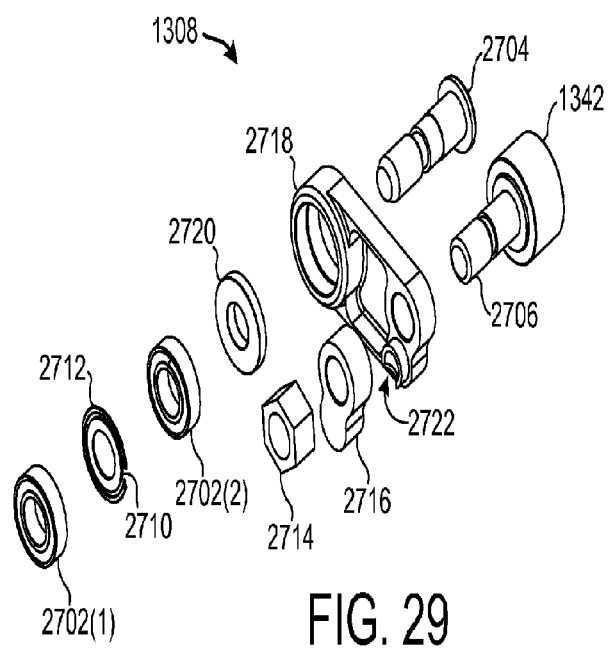
FIG. 29

FIG. 43 POSITION 1 CLOSE-UP

Position 2

FIG. 45 POSITION 2 CLOSE-UP

Position 3

FIG. 47 POSITION 3 CLOSE-UP

Mechanism 2009 Position 4

FIG. 49 POSITION 4 CLOSE-UP

Mechanism 2009 Position 5

FIG. 51 POSITION 5 CLOSE-UP

Position 6

FIG. 53 POSITION 6 CLOSE-UP

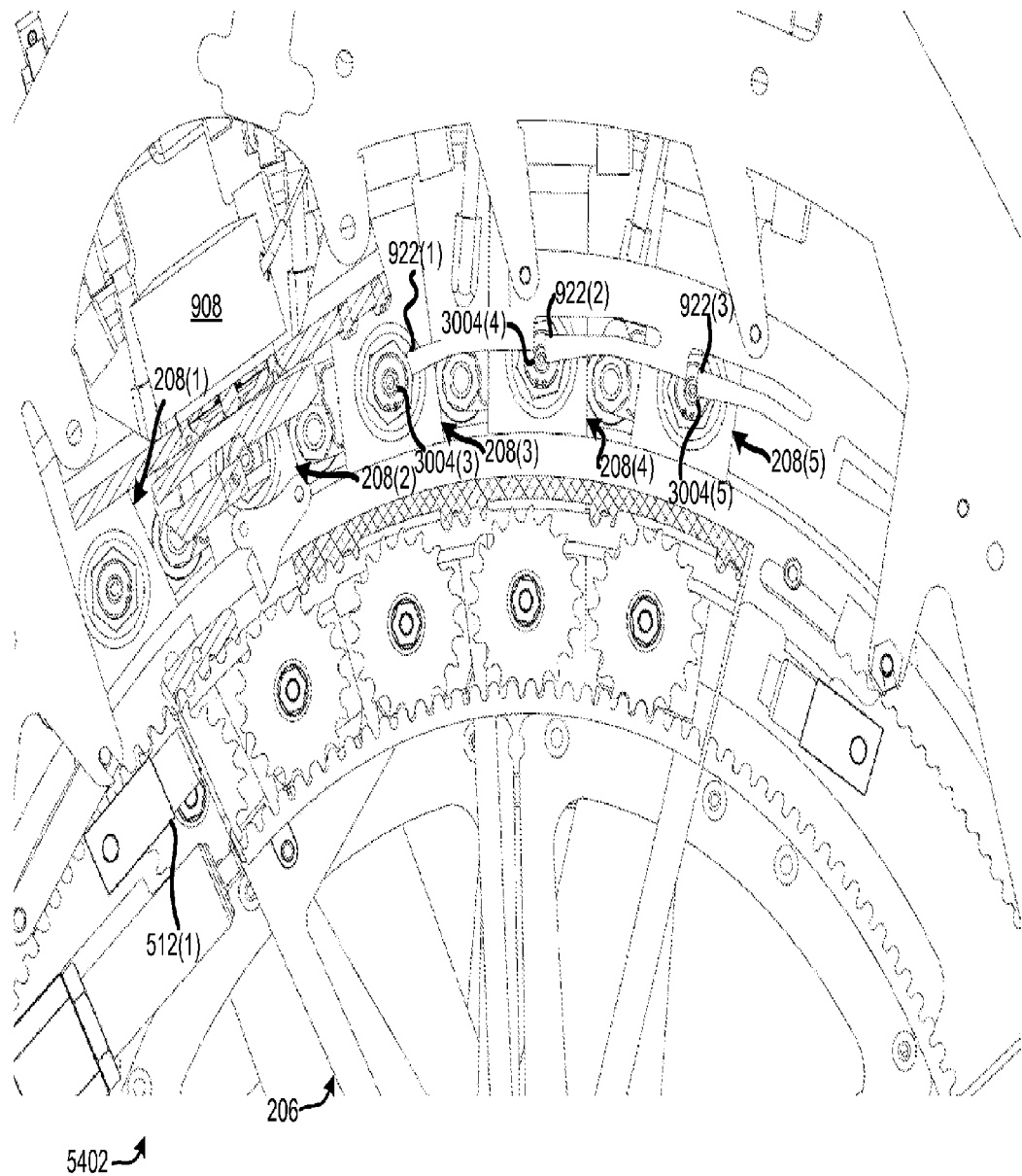
FIG. 55 POSITION 7 CLOSE-UP

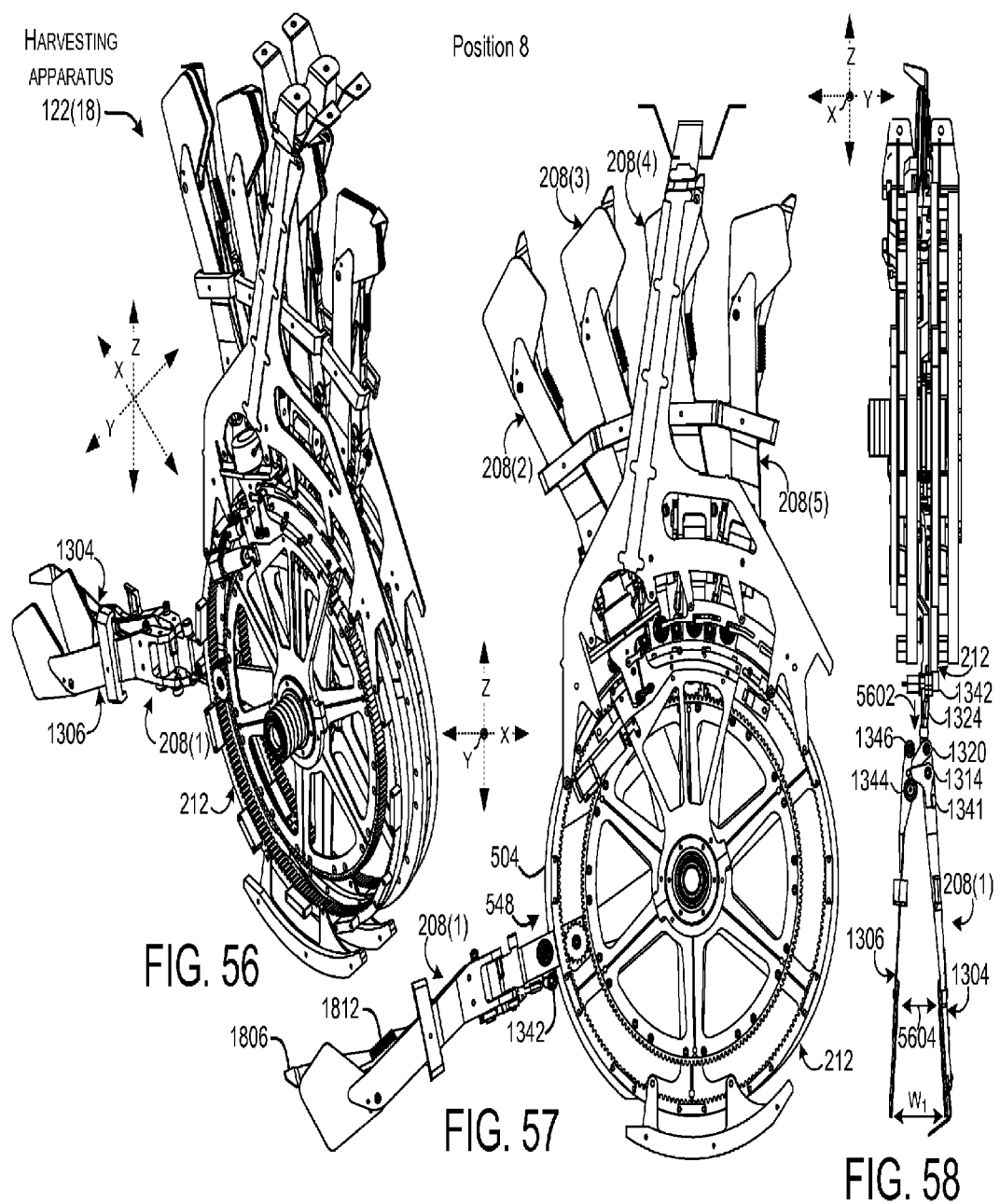

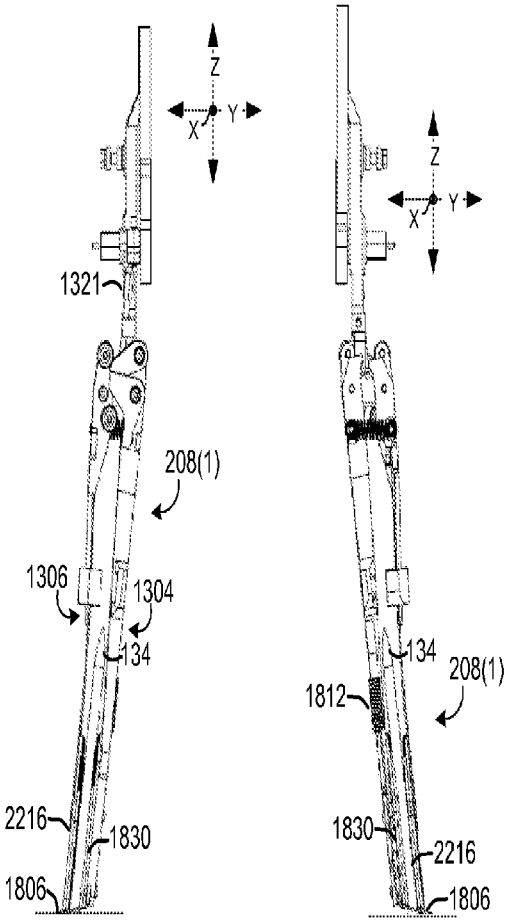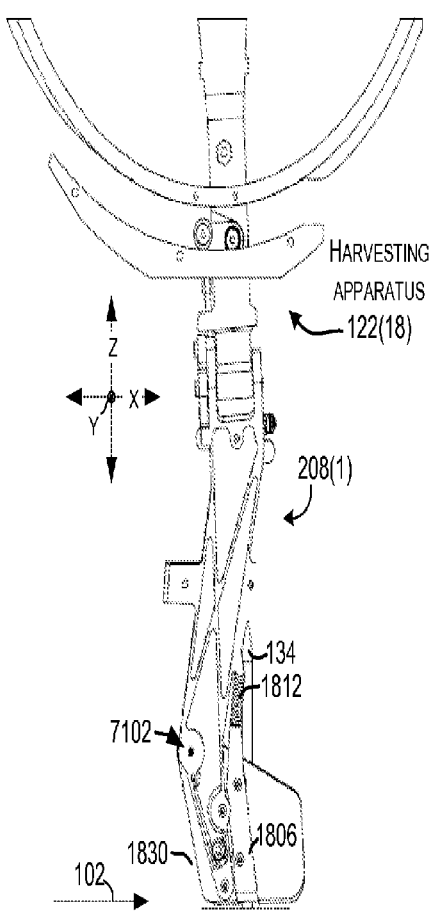
FIG. 77　　FIG. 78　　FIG. 79

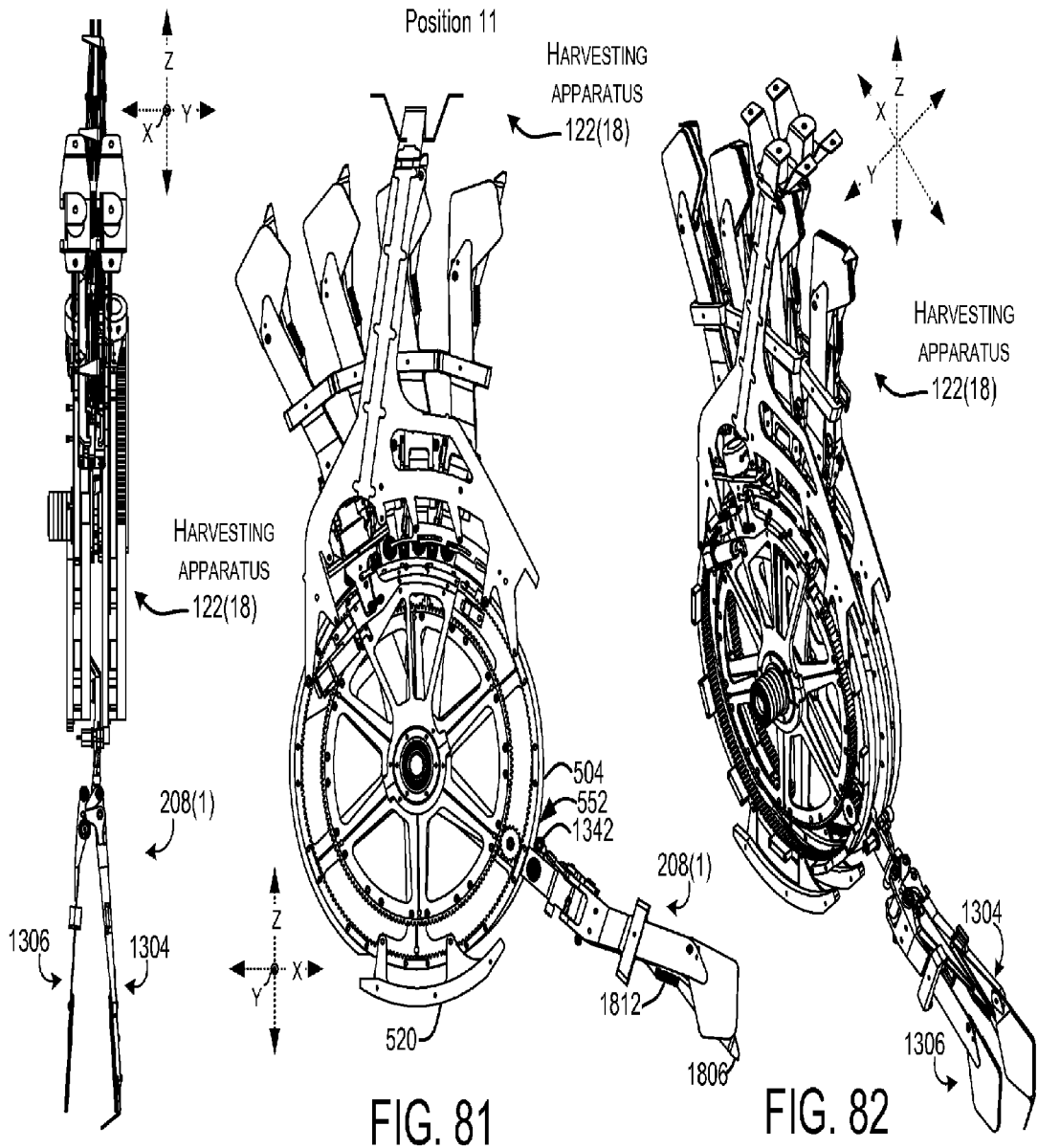

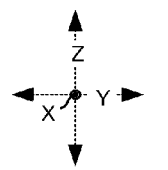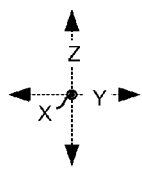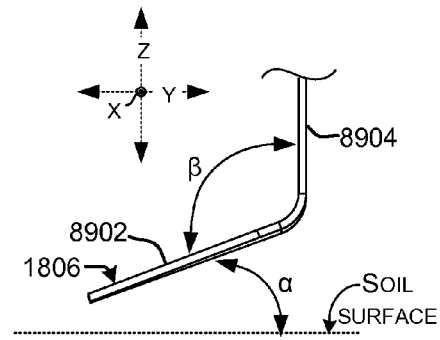
FIG. 89
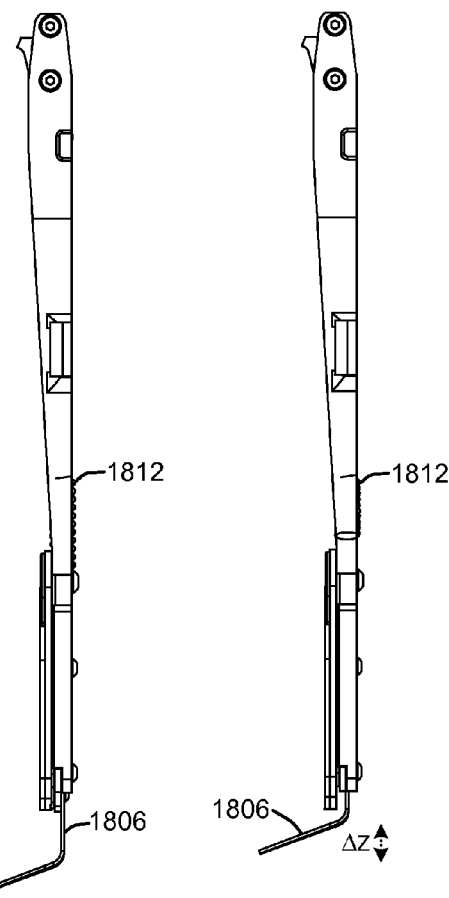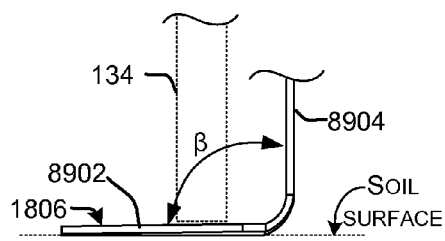
FIG. 90
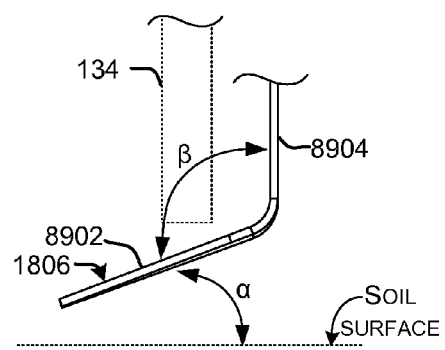
FIG. 87   FIG. 88
FIG. 91

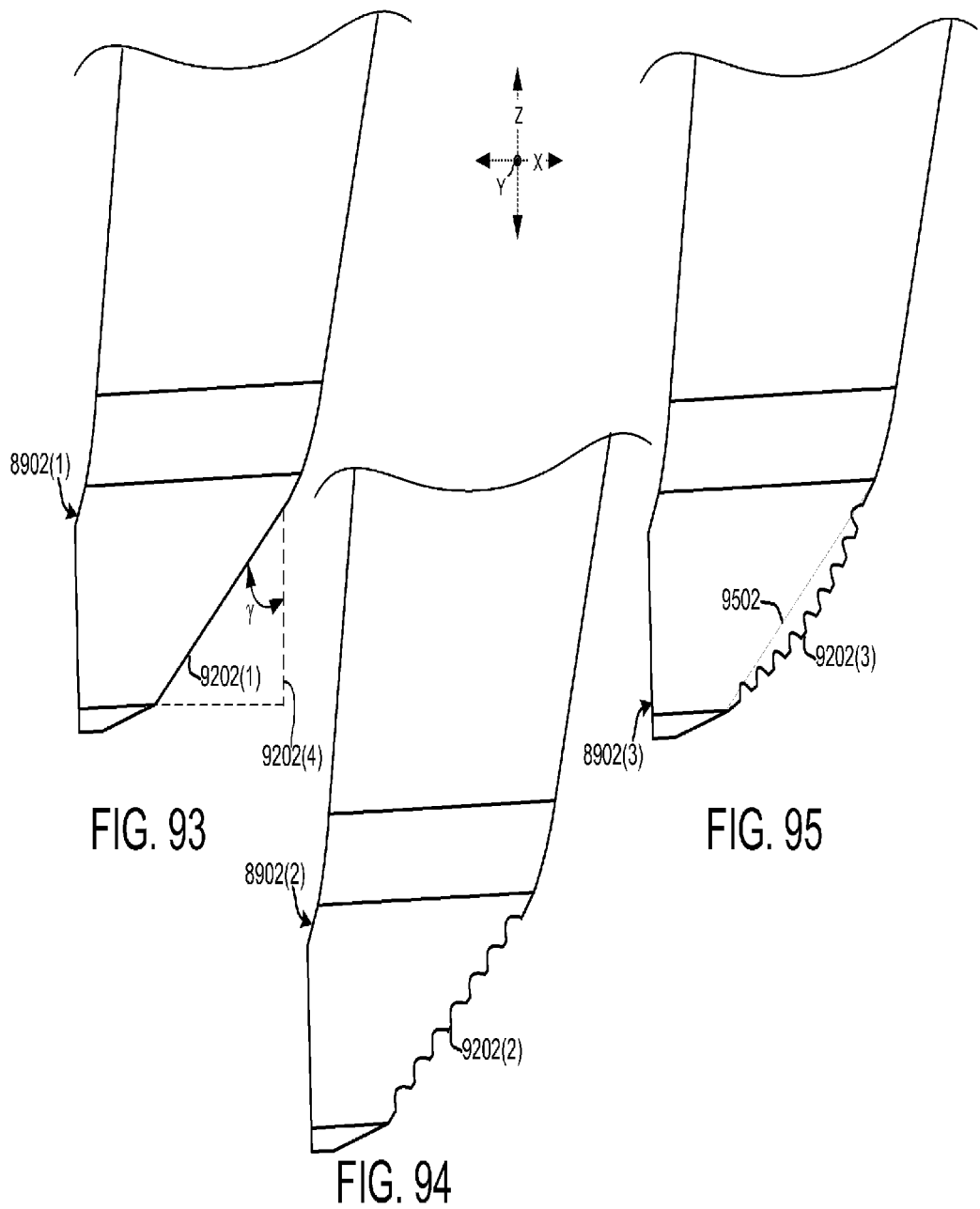

SELECTIVE HARVESTER

PRIORITY

This patent application is a Continuation of and claims priority from U.S. Utility Application No. 12/789,402 filed on May 27, 2010 which is a non-provisional application that claims priority from U.S. Provisional Application No. 61/183,014, filed on Jun. 1, 2009. This patent application is related to co-pending U.S. Utility Application No. 12/789, 410 filed on May 27, 2010. Each of these applications are incorporated by reference herein in their entirety.

BACKGROUND

Many agricultural crops lend themselves to a single harvest per season. For instance grain crops, such as corn and wheat, can be harvested all at once. For these crops, mechanical harvesters, such as combines can make a single pass over the ground and harvest the year's crop. Other crops, such as asparagus, do not lend themselves to single pass harvesting. Instead these crops produce better yields when individual fruits or plants are selectively harvested at an appropriate condition for market. After a period of time, another pass can be made over the ground to harvest additional fruits or plants that are now ready for harvest. This process can be repeated until the season's harvest is completed.

For these types of crops, one aspect of profitability for the grower is to selectively harvest the market ready plants or fruits with as little damage as practicable to the remaining fruits or plants. Stated another way, one harvesting criteria is to successfully harvest as many of the market-ready plants as possible. Another harvest criteria is to reduce collateral damage to the remaining immature plants.

Despite many attempts, mechanical selective harvesting of many of these crops, such as asparagus, has remained elusive. This is borne-out in that the vast majority of crops, such as asparagus, continue to be picked manually. Manual picking is very expensive and often exceeds one-half of the value of the crop to the grower. Further, manually harvesting asparagus is grueling work and is generally performed by seasonal workers. Because of the nature of the work, workers often choose other agricultural work instead of asparagus harvesting. As a result, crops risk going unharvested. Accordingly, growers tend to be reluctant about planting acreage in asparagus. In summary, despite great economic incentive and decades of attempts, no viable selective harvesters have been developed. The present inventive concepts address these and other issues.

SUMMARY

The described implementations relate to selective harvesting of agricultural crops. One implementation relates to an asparagus harvester that can have one or more sets of independently controllable cutter arm assemblies. The cutter arm assemblies can rotate about a common axis to harvest individual asparagus spears. Various other inventive aspects are described below.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced where feasible.

FIGS. 18-20 show elevational views of harvester apparatus components in accordance with some implementations of the present concepts.

FIG. 21 shows an exploded perspective view of the harvester apparatus components of FIGS. 18-20.

FIGS. 27-28 show elevational views of harvester apparatus components in accordance with some implementations of the present concepts.

FIG. 29 shows an exploded perspective view of the harvester apparatus components of FIGS. 27-28.

FIGS. 42-91 show further views of the harvester apparatus components in various relative positions in accordance with some implementations of the present concepts.

FIGS. 93-95 show elevational views of harvester apparatus components in accordance with some implementations of the present concepts.

DETAILED DESCRIPTION

Overview

This patent application pertains to selective harvesting of agricultural crops, such as asparagus. In one case, the selective harvesting can be accomplished via a harvesting machine or "selective harvester". The selective harvester can pass over a swath of land and selectively harvest individual agricultural objects, such as market-ready asparagus spears, while leaving immature spears to continue growing.

In some cases, the selective harvester can include a plurality of independently controllable harvesting apparatus that can be collectively arranged to harvest spears as the harvester travels over the swath of land. Individual harvesting apparatus can include a set of independently controllable cutter arm assemblies and a control mechanism for controlling the cutter arm assemblies.

Briefly, the harvesting apparatus can be maintained in a ready position above the agricultural crops to avoid damaging the asparagus plants. When market-ready asparagus spears are sensed, the control mechanism can cause an individual cutter arm assembly to rotate radially downward to harvest the asparagus spear and then return to the ready position to reduce damaging other spears.

Harvester Examples

Figure 1:
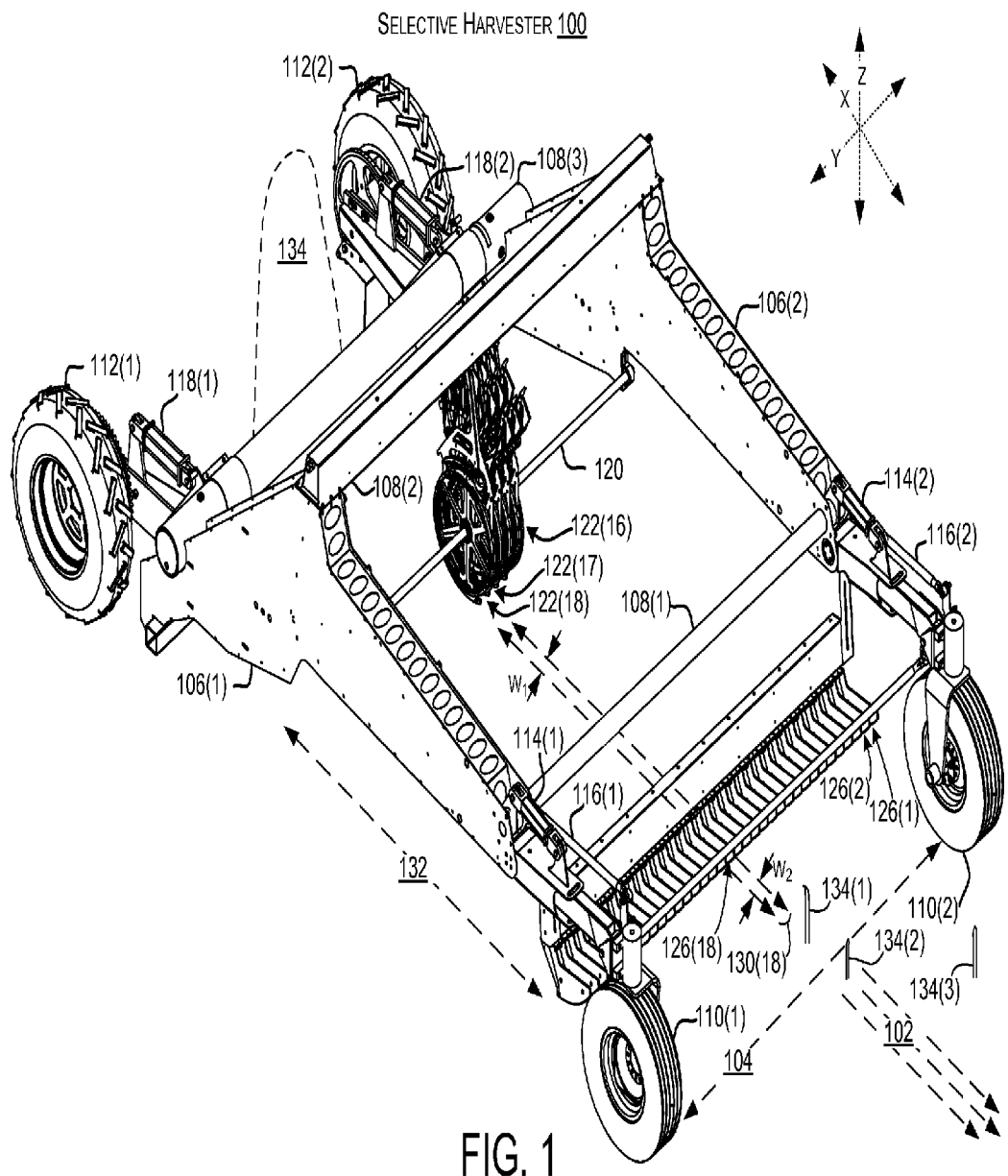
FIG. 1 shows a perspective view of a selective harvester in accordance with some implementations of the present concepts.

FIG. 1 offers an example of a selective harvester 100. The harvester can move in a direction of travel indicated at 102 to selectively harvest asparagus spears along a width indicated at 104. In this case, the harvester is defined by a pair of backbone structures 106(1) and 106(2). One or more structural components can extend between the backbone structures 106(1), 106(2) to maintain a constant distance therebetween. In this particular configuration three structural components are utilized. For descriptive purposes, these structural components are identified as front structural component 108(1), middle structural component 108(2) and rear structural component 108(3). Front wheels 110(1) and 110(2) are secured to front portions of the backbone structures 106(1) and 106(2), respectively. Similarly, rear wheels 112(1) and 112(2) are secured to rear portions of the backbone structures 106(1) and 106(2), respectively. Steering of the harvester 100 can be achieved via the front and/or rear wheels.

In this implementation, selective harvester 100 can be leveled relative to the xyz reference axes during use by controlling two pair of hydraulic cylinders. The first pair of hydraulic cylinders 114(1) and 114(2) are connected between front portions of backbone structures 106(1) and 106(2) and front wheel 110(1) and 110(2) via parallel linkages 116(1) and 116(2), respectively. The second pair of hydraulic cylinders 118(1) and 118(2) are connected between rear portions of backbone structures 106(1) and 106(2) and rear wheels 112(1) and 112(2), respectively. Hydraulic cylinders 114(1), 114(2), 118(1) and 118(2) can be independently controlled via a valve bank (not shown) that is connected to an orientation sensor(s) (not shown), such as a gyroscope, camera, and/or ultrasonic sensor.

In this case, a cutter shaft 120 extends between backbone structures 106(1) and 106(2). A plurality of harvesting apparatus 122 are positioned on cutter shaft 120 and supported from middle structural component 108(2). Supporting the harvesting apparatus 122 from the structural component can reduce or avoid flexing and/or sagging of cutter shaft 120. For instance, in some implementations, at least 50% and in some cases more than 90% of the weight of the harvesting apparatus can be supported by the structural component rather than the cutter shaft.

In this particular implementation, the selective harvester 100 is configured to utilize 32 harvesting apparatuses 122. However, to allow visualization of the cutter shaft 120, only harvesting apparatuses 122(16)-122(18) are visualized (i.e., 122(1)-122(15) and 122(19)-122(32) are removed in FIG. 1). As is illustrated relative to harvesting apparatus 122(18), an individual harvesting apparatus can selectively harvest asparagus spears along a width $w_1$. Collectively, the plurality of harvesting apparatus 122 can harvest the entire harvest width indicated at 104. Of course, the illustrated number of harvesting apparatuses and/or sensors is provided for discussion purposes and is not critical. Other implementations can use more or less harvesting apparatuses and/or sensors than the illustrated configuration.

One or more sensors 126 can be utilized to detect asparagus spears along the harvest width 104 as the harvester moves in the direction of travel 102. In this implementation, there are 32 sensors 126(1)-126(32) (not all of which are designated with specificity). The sensors can collectively sense harvest width 104. In this case, individual sensors are in a one-to-one relationship with individual harvesting apparatus 122. For instance, sensor 126(18) works cooperatively with harvesting apparatus 122(18).

In this case, an individual sensor, such as sensor 126(18) can sense a width $w_2$ that corresponds to a harvest width $w_1$ of an individual harvesting apparatus 122(18). Thus, when extended in the direction of travel, widths $w_1$ and $w_2$ can define a harvest zone 130(18) for an individual harvesting apparatus 122(18) and corresponding sensor 126(18).

The sensors can detect individual spears and determine whether a detected spear satisfies one or more harvest parameters, such as spear height and/or diameter. In one example, the harvest parameters can be selected to determine whether individual spears are market ready. Upon sensing a spear that satisfies the harvest parameter(s), an individual sensor (such as sensor 126(18)) can generate a signal that causes an individual harvesting apparatus (such as harvesting apparatus 122(18)) to harvest an individual sensed spear. This process will be described in more detail below relative to FIG. 2. Note, at this point in the description that, in some harvester configurations, a distance 132 in the x-direction between the sensors (such as sensor 126(18)) and harvesting apparatuses (such as harvesting apparatus 122(18)) is known and utilized to coordinate the selective harvesting.

As mentioned above, this particular configuration employs a sensor 126 for each harvesting apparatus 122 in a one-to-one relationship with 32 sensors and 32 harvesting apparatuses. For example, sensor 126(18) can sense harvest zone 130(18). Harvest zone 130(18) corresponds to width $w_1$ so that as the selective harvester 100 moves along the direction of travel 102, spears sensed in harvest zone 130 (18) pass within width $w_1$ for harvest by harvesting apparatus 122(18). Other implementations can use a different configuration, such as a common sensor that senses harvest width 104 and maps to an individual aligned harvesting apparatus 122.

Selective harvester 100 can include a power or drive unit 134 for propelling the harvester and/or for turning cutter shaft 120. Other implementations may pull or push the harvester with a tractor or other mechanism and/or turn cutter shaft 120 by connecting a power take off (PTO) shaft to the harvester's cutter shaft.

In summary, selective harvester 100 can move along direction of travel 102 to selectively harvest encountered asparagus spears. For purposes of explanation, three asparagus spears 134(1), 134(2), and 134(3) are shown. Assume that asparagus spears 134(1) and 134(2) are aligned with harvester apparatus 122(18) (i.e., are within harvest zone 130(18)). Assume further that asparagus spear 134(3) falls within another harvest zone that is not called out with specificity but that asparagus spear 134(3) can be simultaneously handled in a similar manner to asparagus spears 134(1) and 134(2). As the selective harvester moves forward, asparagus spear 134(1) can pass proximate sensor 126(18) (and/or a sensing region). Assume that asparagus spear 134(1) satisfies the harvest parameters described above. In such a case, a signal can be sent to harvest apparatus 122(18) to cause the harvesting apparatus to harvest asparagus spear 134(1). For instance, if the selective harvester's speed along the direction of travel 102 is relatively constant and known, then harvesting apparatus 122 (18) can pass over asparagus spear 134(1) at a subsequent time Δt after sensor 126(18). Harvesting apparatus 122(18) can be configured to grasp asparagus spear 134(1), cut it and lift it away from the ground for further processing. Assume further, that asparagus spear 134(2) is sensed by sensor 126(18) but does not satisfy the harvest parameter(s). In this case, a harvest signal is not sent to harvesting apparatus 122(18) and the harvesting apparatus (and the overall selective harvester) can pass over asparagus spear 134(2) in a manner that leaves the asparagus spear relatively unharmed. This configuration can allow asparagus spear 134(2) to continue to grow and to potentially be harvested in a subsequent pass by the selective harvester 100, such as a couple of days later. The same processes can simultaneously occur for asparagus spear 134(3) and other spears along the harvest width 104.

Specific harvester components are discussed in more detail below. These components can be manufactured from materials utilized in other agricultural machinery such as wheat combines and corn combines, among others. Metals can be utilized for many components, but other materials, such as polymers and composites, can be employed.

Harvesting Apparatus Examples

Figures 2, 3:
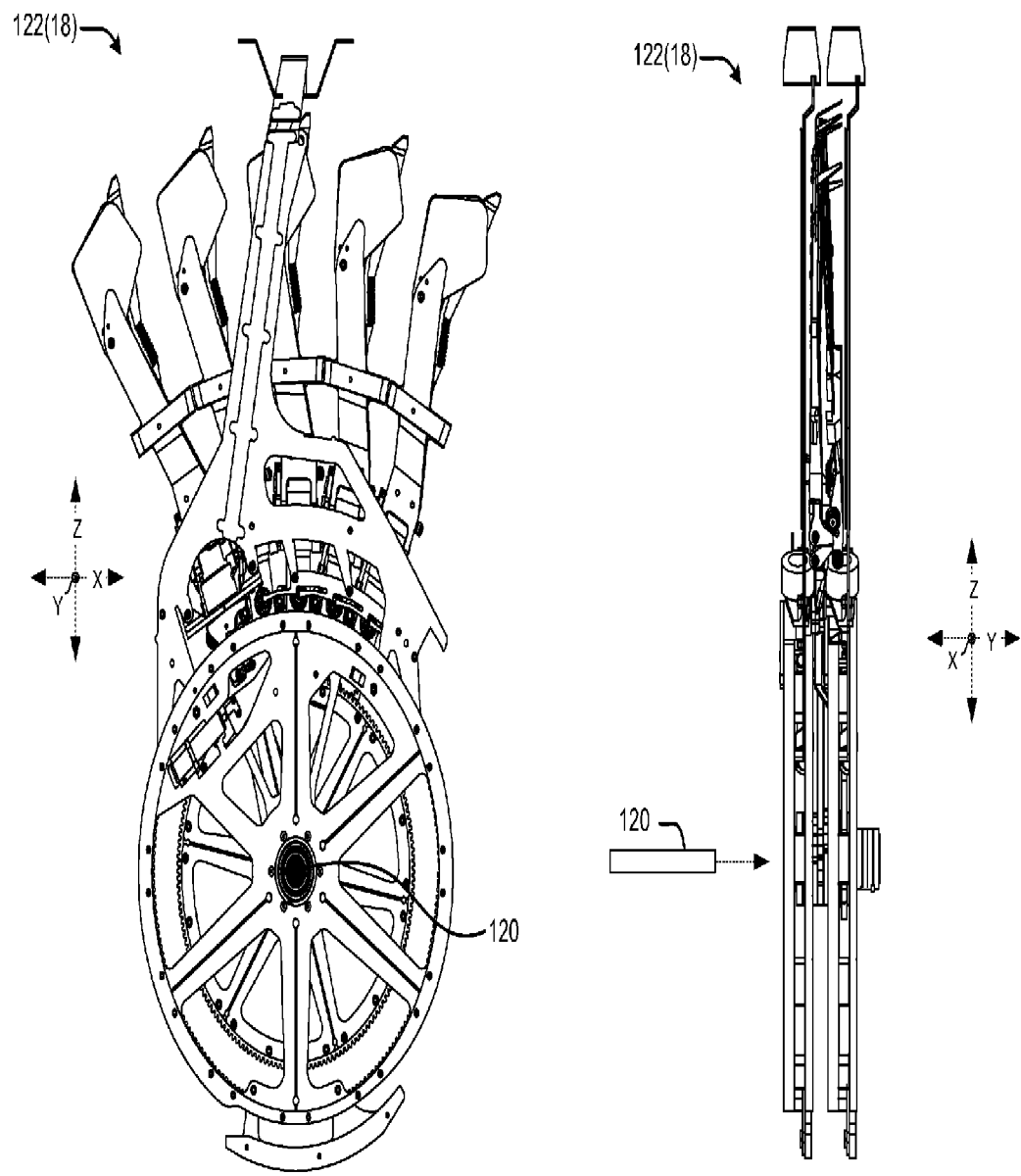
FIGS. 2-3 show elevational views of selective harvester components, namely a harvester apparatus in accordance with some implementations of the present concepts.
Figure 4:
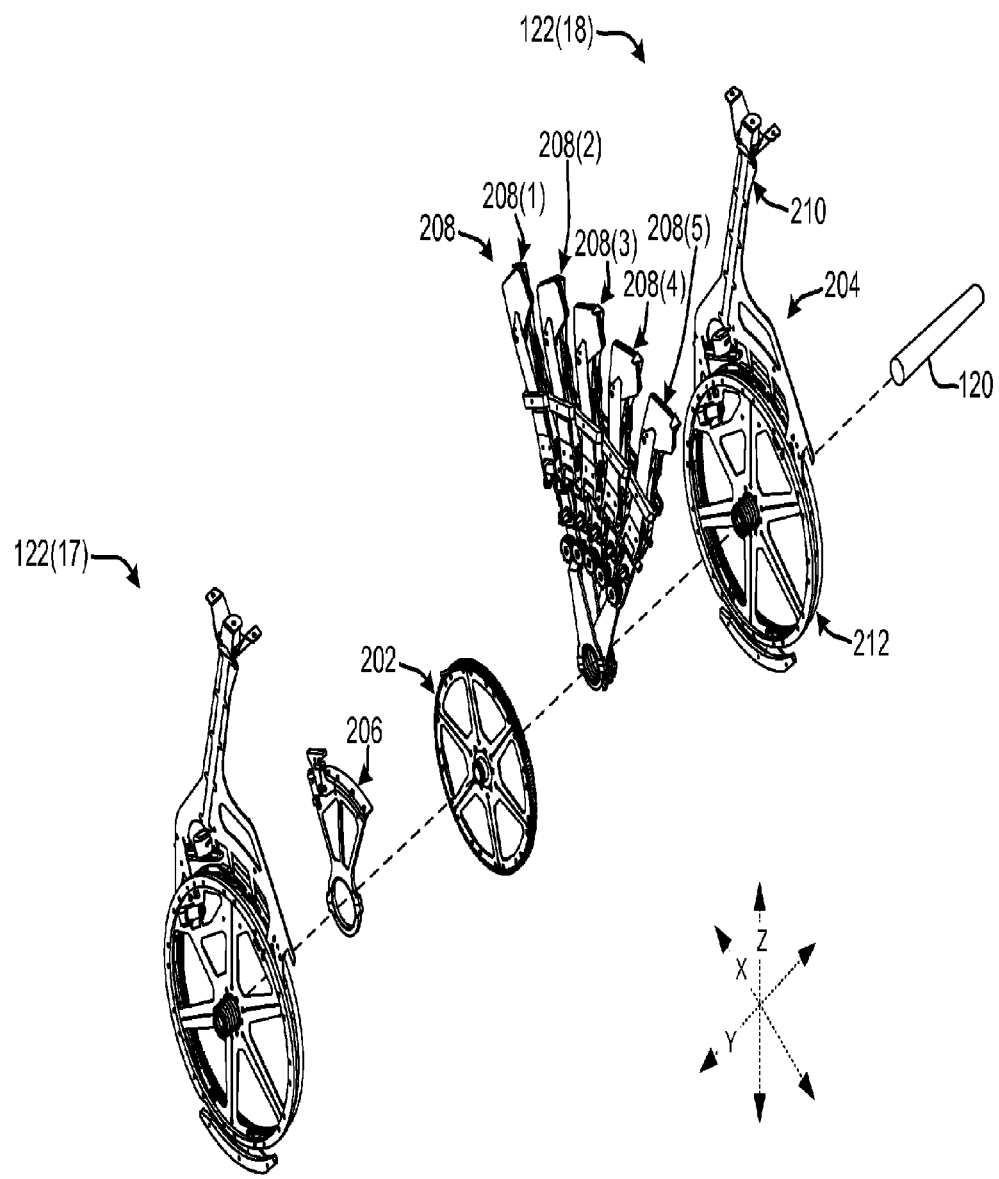
FIG. 4 shows an exploded perspective view of the harvester apparatus shown in FIGS. 2-3.

FIGS. 2-4 collectively illustrate harvesting apparatus 122 (18) in more detail. FIG. 2 is a side elevational view (i.e., transverse cutter shaft 120 of FIG. 1). FIG. 3 is a front elevational view (i.e., parallel the cutter shaft 120). FIG. 4 is a perspective view that is exploded along the cutter shaft 120. In this case, the harvesting apparatus includes a drive wheel assembly 202, a hanger-ring gear assembly 204, an actuator assembly 206, and a plurality of cutter arm assemblies 208. In this example, the harvesting apparatus includes five cutter arm assemblies 208(1), 208(2), 208(3), 208(4), and 208(5). Other implementations can include more or less cutter arm assemblies. For ease of reference, the hanger-ring gear assembly 204 can be thought of as including a hanger assembly 210 and a ring gear assembly 212.

FIG. 4 shows the relative order of the components as they are positioned on the cutting shaft 120. In this case, the hanger-ring gear assembly 204 is positioned on the cutter shaft followed by the cutter arm assemblies 208, the drive wheel assembly 202, and the actuator assembly 206. The components are then repeated for harvesting apparatus 122 (17).

Ring Gear Assembly Examples

Figures 5, 6, 7:
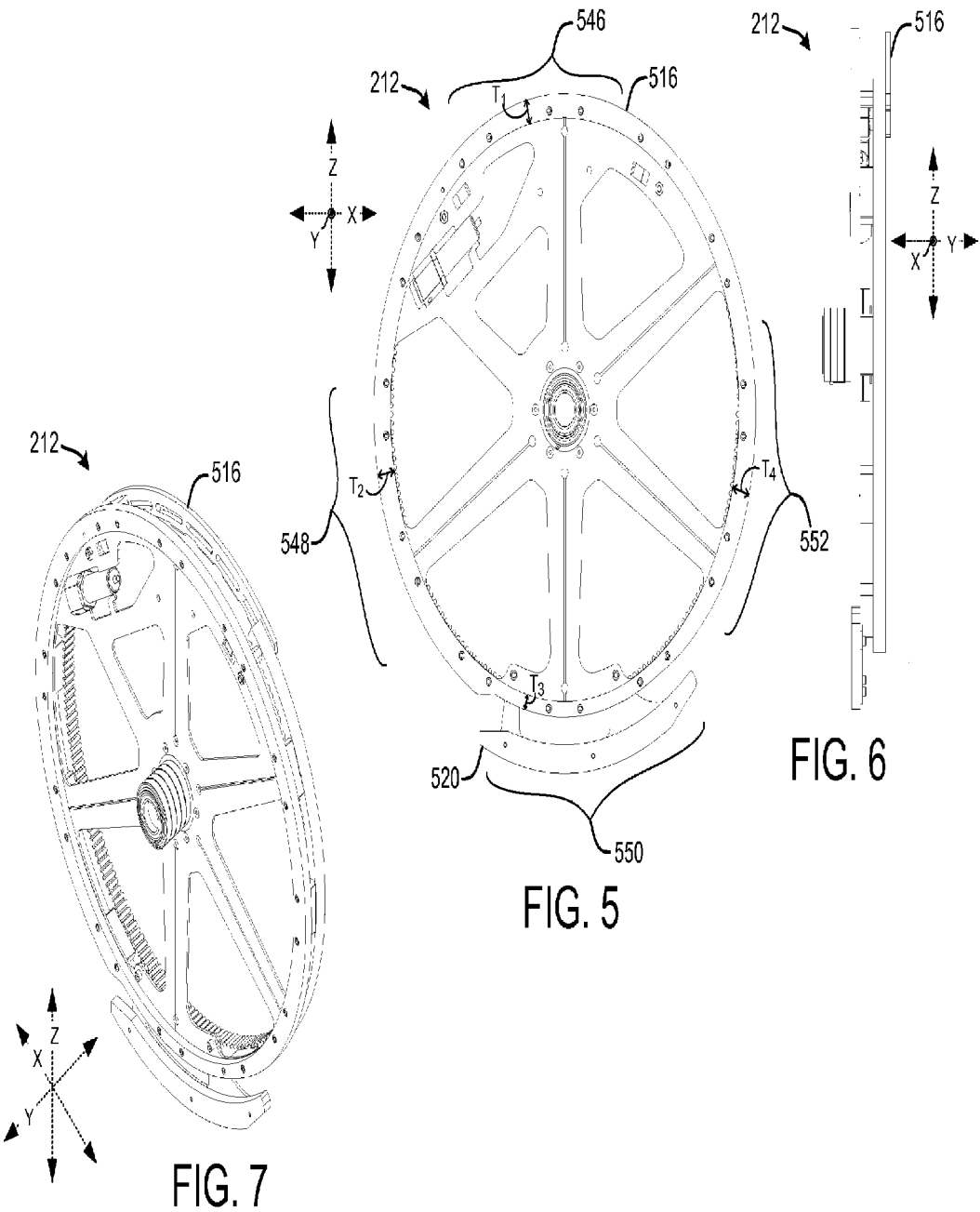
FIGS. 5-6 show elevational views of harvester apparatus components in accordance with some implementations of the present concepts.
FIG. 7 shows a perspective view of the harvester apparatus components shown in FIGS. 5-6.
Figure 8:
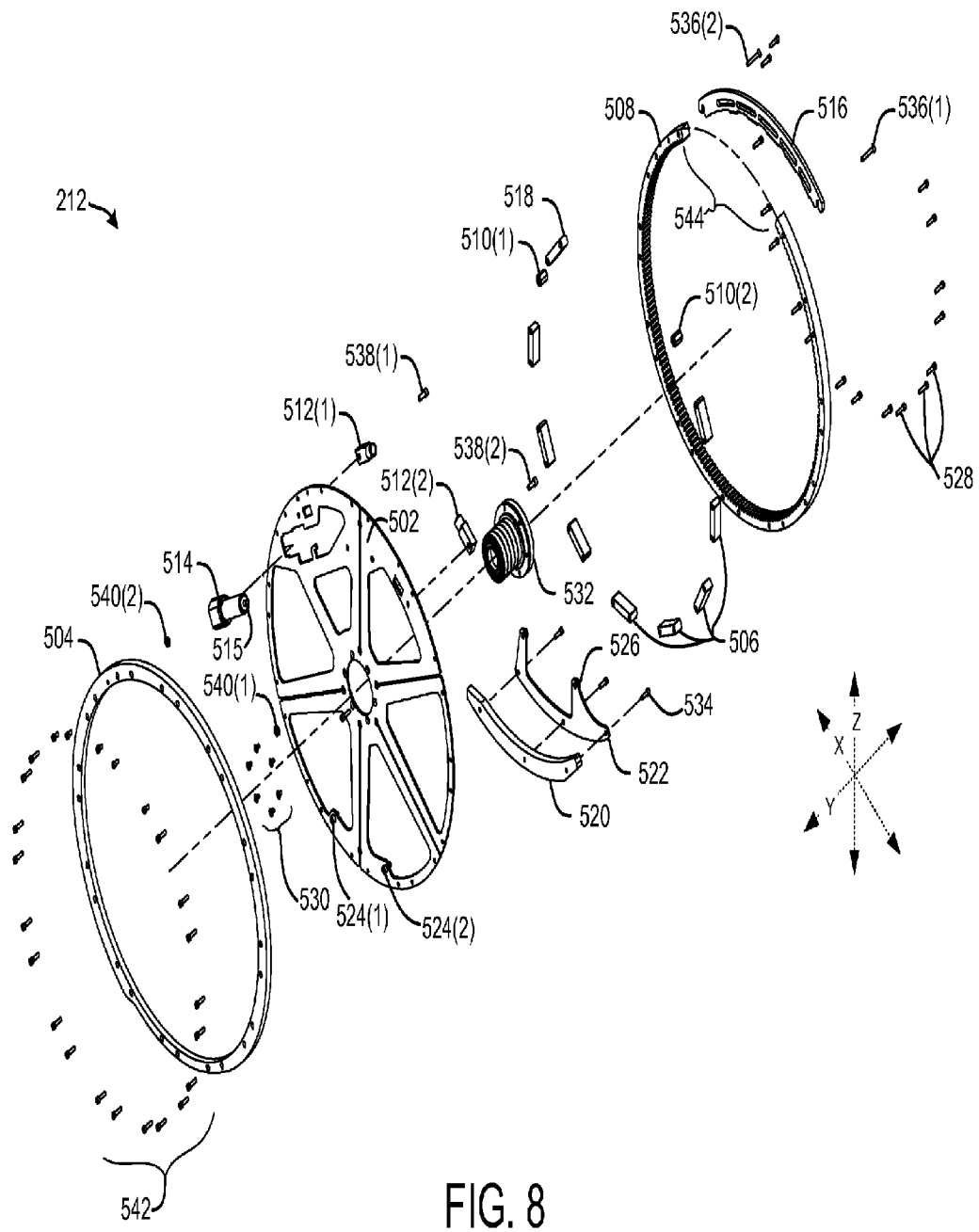
FIG. 8 shows an exploded perspective view of the harvester apparatus components shown in FIGS. 5-6.

FIGS. 5-8 collectively illustrate ring gear assembly 212 in more detail. FIG. 5 is a side elevational view. FIG. 6 is a front elevational view. FIG. 7 is a perspective view. FIG. 8 is a perspective view that is similar to the view of FIG. 7 but that is exploded along the cutter shaft.

In this example, ring gear assembly 212 includes a cam mounting plate 502, a cam 504, a set of eight ring gear mounts 506 (not all of which are designated with specificity), ring gear 508, ring gear mounting standoffs 510(1)-510 (2), front and rear bumper mount assemblies 512(1) and 512(2), and a shock absorber assembly 514 that includes a shock absorber piston 515. The ring gear assembly 212 further includes brake or brake rail 516, long ring gear mounting standoffs 518, a locking cam 520, a locking cam plate 522, hanger mount screws 524(1)-524(2), two hanger mount nuts 526, a set of fasteners, such as rivets 528 (not all of which are designated with specificity), a set of fasteners 530 that in this case entails six screws, a drive wheel hub assembly 532, a set of fasteners 534 in the form of three screws, a set of two fasteners in the form of screws 536(1) and 536(2), another set of fasteners embodied as two screws 538(1) and 538(2), two nuts 540(1) and 540(2) and another set of fasteners 542 in the form of rivets (not all components can be evidenced in each view).

Note that ring gear 508 is not continuous (i.e., it is circular, but does not complete an entire circle). Instead, ring gear 508 defines a gap 544. This gap is occupied by, and in some sense selectively completed by a timing gear, an advancing gear, and a trigger tooth that are introduced below relative to FIGS. 11-12.

While it is somewhat difficult to appreciate from FIGS. 5-8, as indicated in FIG. 5, cam 504 includes a first region indicated generally at 546 that has a medium thickness $T_1$. Moving counter-clockwise, the cam expands to a second region indicated generally at 548 that has a greater thickness $T_2$, then to a third region indicated generally at 550 that has a narrow thickness $T_3$. Continuing in the counter-clockwise direction, the cam again expands in a fourth region indicated generally at 552 that has a thickness $T_4$ that is similar to thickness $T_2$. Finally, the cam returns to thickness $T_1$ and first region 546. Here, thicknesses $T_1$-$T_4$ are measured parallel to the xz-plane. These thicker and narrow regions can provide a camming action as will be explained below relative to FIGS. 56-67.

Hanger Assembly Examples

Figures 9, 10:
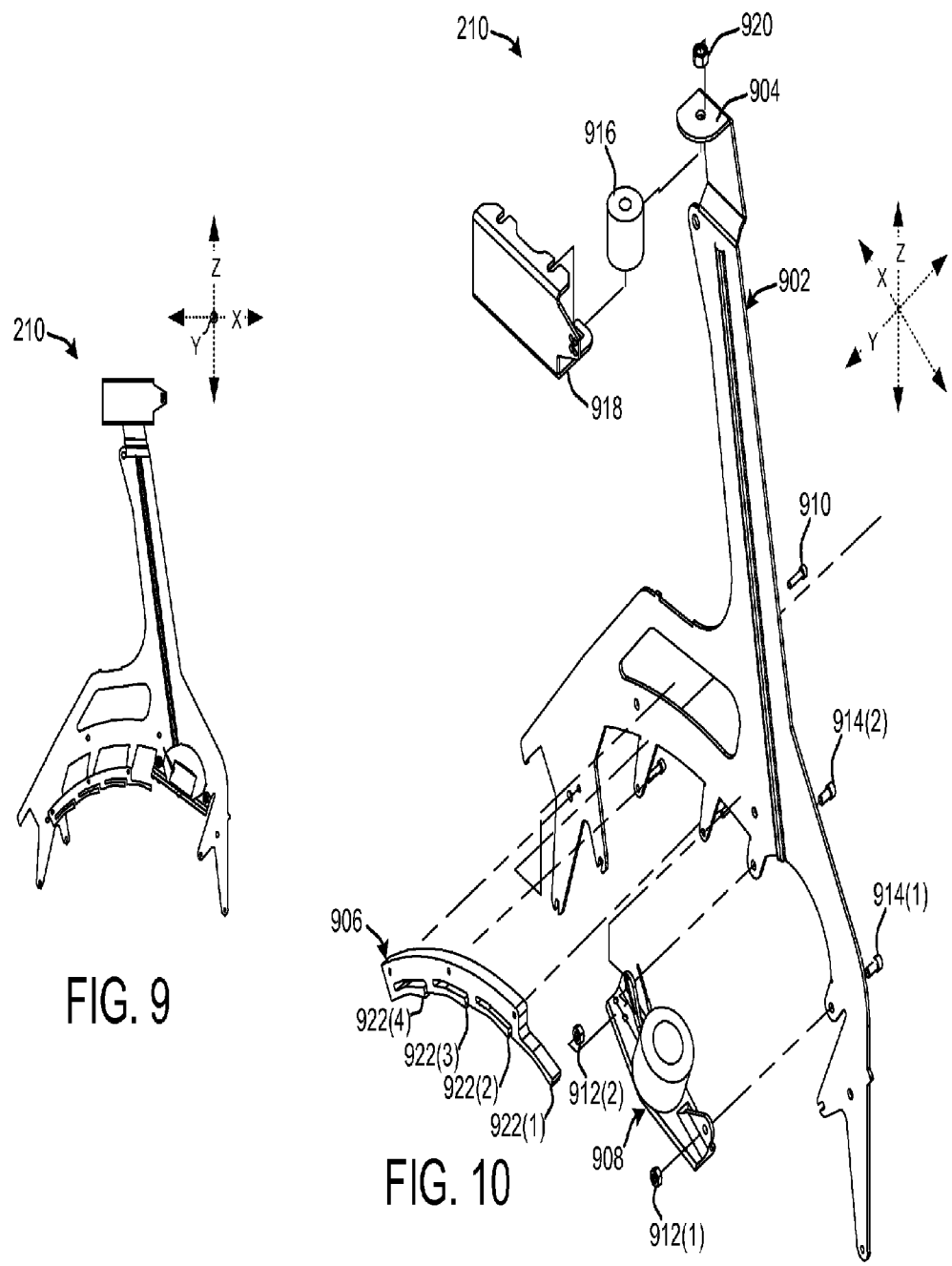
FIG. 9 shows an elevational view of harvester apparatus components in accordance with some implementations of the present concepts.
FIG. 10 shows an exploded perspective view of the harvester apparatus components of FIG. 9.

FIGS. 9-10 collectively illustrate hanger assembly 210 in more detail. FIG. 9 is a side elevational view. FIG. 10 is a perspective view that is exploded along the cutter shaft.

Hanger assembly 210 includes hanger 902, a hanger top edge 904, a trigger ratchet 906, a solenoid assembly 908, a set of trigger ratchet fasteners 910 in the form of three screws, two hanger mount nuts 912(1) and 912(2) for receiving two solenoid mount-hanger bolts 914(1) and 914(2), a hanger rubber bumper 916, a top hanger clip 918, a nut 920, and a dust shield sheet metal (not shown).

Hanger 902 can also include a groove, channel or recess 922 along which a wire(s) can be run to connect solenoid assembly 908 and sensor 122(18)(FIG. 1). Further, in this case, trigger ratchet 906 forms four latch detents 922(1), 922(2), 922(3), and 922(4).

Actuator Assembly Examples

Figures 11, 12:
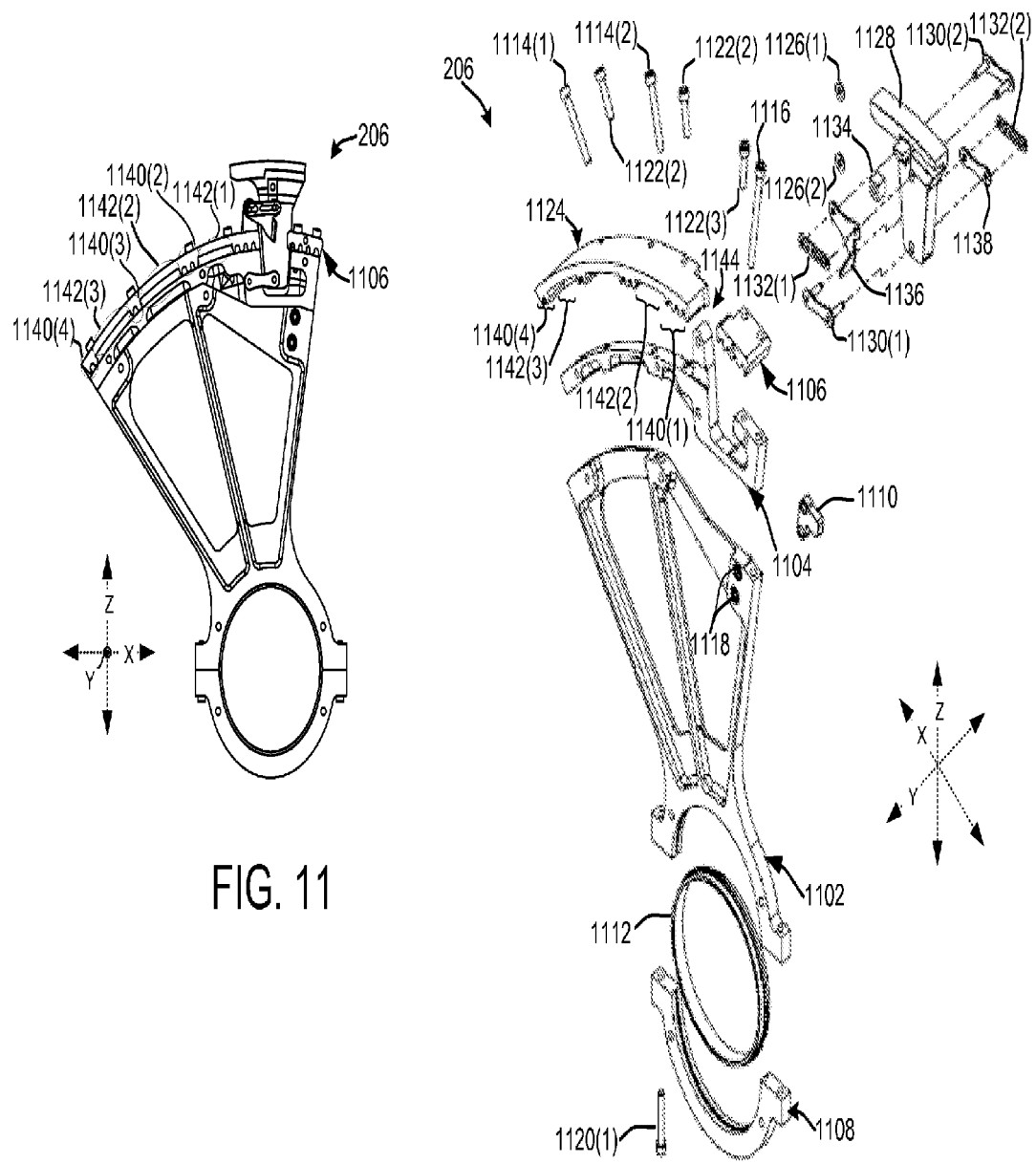
FIG. 11 shows an elevational view of harvester apparatus components in accordance with some implementations of the present concepts.
FIG. 12 shows an exploded perspective view of the harvester apparatus components of FIG. 11.

FIGS. 11-12 collectively illustrate actuator assembly 206 in more detail. FIG. 11 is a side elevational view. FIG. 12 is an exploded perspective view. In this case, actuator assembly 206 includes an actuator lever 'part a' 1102, an actuator lever 'part b' 1104, an advancing gear 1106, an actuator lever 'part c' 1108, a shock absorber striker mount 1110, two trigger bearing fasteners 1114(1) and 1114(2), a fastener 1116, two fasteners 1118, two fasteners 1120(1) and 1120(2), three fasteners 1122(1), 1122(2), and 1122(3), a timing gear 1124, two actuator spacer washers 1126(1) and 1126(2), a trigger 1128, two trigger mounting links 1130(1) and 1130(2), two trigger mounting link keepers 1132(1) and 1132(2), a trigger wear insert or trigger block 1134, a trigger tooth 1136, and a trigger mounting link plate 1138. While not readily apparent from FIGS. 11-12, when assembled, actuator lever 'part b' 1104 is interposed between trigger block 1134 and trigger tooth 1136.

It is worth noting that timing gear 1124 includes geared regions 1140(1), 1140(2), 1140(3), and 1140(4) which are interspaced with gearless regions 1142(1), 1142(2), and 1142(3) (due to space constraints on the drawing page some of these geared and gearless regions are designated on FIG. 12 while others are designated on FIG. 11). There is also a gap or space 1144 between advancing gear 1106 and timing gear 1124. These features will be discussed in more below relative to FIGS. 42-55.

Cutter Arm Assembly Examples

Figures 13, 14, 15, 16, 17:
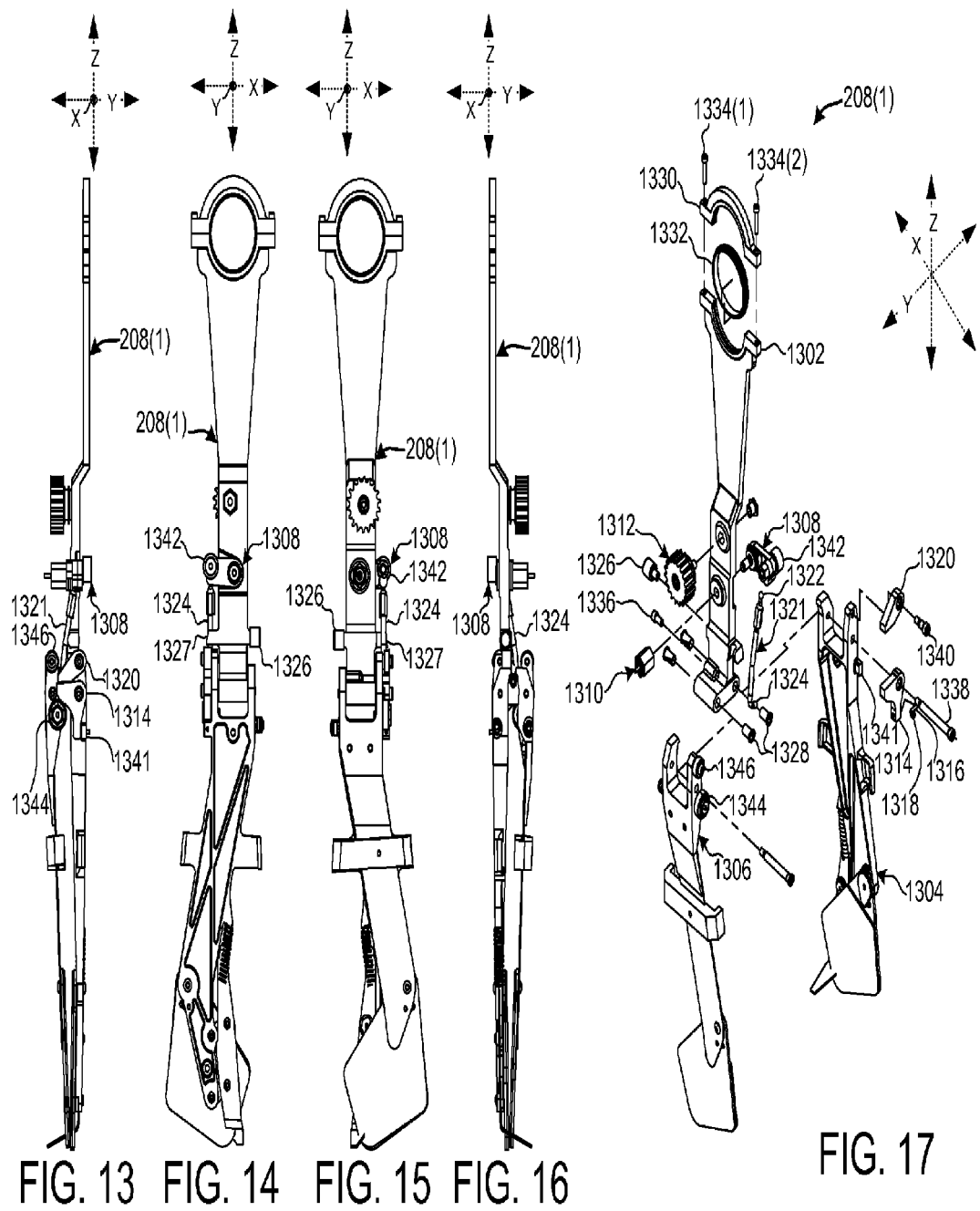
FIGS. 13-16 show elevational views of harvester apparatus components in accordance with some implementations of the present concepts.
FIG. 17 shows an exploded perspective view of the harvester apparatus components of FIGS. 13-16.

FIGS. 13-17 collectively illustrate cutter arm assembly 208(1) in more detail. FIG. 13 is a front elevational view. FIGS. 14-15 are opposing side elevational views of the cutter arm assembly taken transverse the cutter shaft. FIG. 16 is a rear elevational view. FIG. 17 is an exploded perspective view of the cutter arm assembly.

In this case, the cutter arm assembly 208(1) includes a cutter arm mount master 1302, a cutter assembly 1304, a spring arm assembly 1306, a cam follower assembly 1308, a trigger pin assembly 1310, a planetary gear assembly 1312, an opening wedge 1314, an arm adjustment set screw 1316, a hex nut 1318, and a closing or locking wedge 1320. The cutter arm assembly also includes a push rod 1321 that includes a ball end linkage 1322 and a ball end linkage bottom 1324. The cutter arm assembly also includes a rubber bumper or trailing side cutter arm bumper 1326, and a front or leading side cutter arm bumper 1327 (due to space constraints on FIG. 17, leading side cutter arm bumper 1327 is designated on FIGS. 14 and 15, but not on FIG. 17). Cutter arm assembly 208(1) also includes four nyliner bushings 1328 (only two of which are designated with specificity due to constraints of the drawing page), a cutter arm hub end 1330, a cutter arm bearing key 1332, two fasteners 1334, such as hex head bolts, a cutter arm angle limit bolt 1336, a screw 1338, and a screw 1340.

As will be described in more detail below, opening wedge 1314 can engage a contact structure 1341 of cutter assembly 1304 to cause movement of the cutter assembly. While it may not be readily apparent from FIGS. 13-17, opening wedge 1314 defines a socket configured to receive and retain, the 'ball' of ball end linkage bottom 1324. A similar socket in the cam follower assembly 1308 for receiving the ball end linkage 1322 is illustrated in FIG. 29. The cam follower assembly 1308 is discussed in more detail below relative to FIGS. 27-29. Briefly, the cam follower assembly includes a cam follower 1342. Other components of the cam follower assembly are discussed relative to FIGS. 27-29.

Similarly, for discussion purposes here, spring arm assembly 1306 is identified as including an opening bearing 1344. The spring arm assembly is discussed in more detail relative to FIGS. 22-26.

Cutter Assembly Examples

FIGS. 18-21 collectively illustrate cutter assembly 1304 in more detail. FIG. 18 is a side elevational view of the cutter assembly. FIGS. 19-20 are opposing front and rear elevational views of the cutter assembly. FIG. 21 is an exploded perspective view of the cutter assembly.

In this implementation, cutter assembly 1304 includes a cutter arm 1802, a pad spacer washer 1804, a knife 1806, a pad mounting bracket 1808, two knife links 1810, a cutter arm spring 1812, two knife washers 1814, four countersunk flange nuts 1816, two screws 1818, two long knife link bolts 1820, a cutter arm closing spring dowel pin 1822, a cutter arm spring bushing 1824, a screw 1826, a retainer 1828, and a pad 1830.

Spring Arm Assembly Examples

Figure 22:
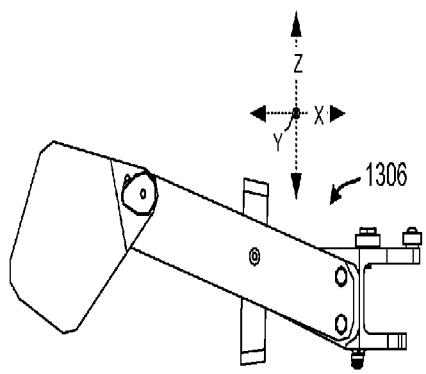
FIGS. 22-24 show elevational views of harvester apparatus components in accordance with some implementations of the present concepts.
Figure 23:
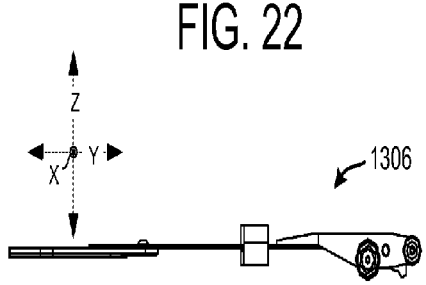
Figure 24:
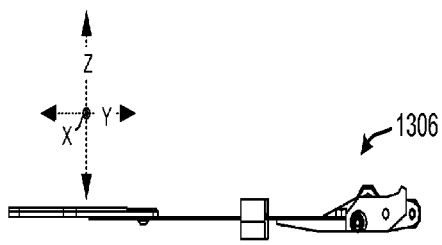
Figure 26:
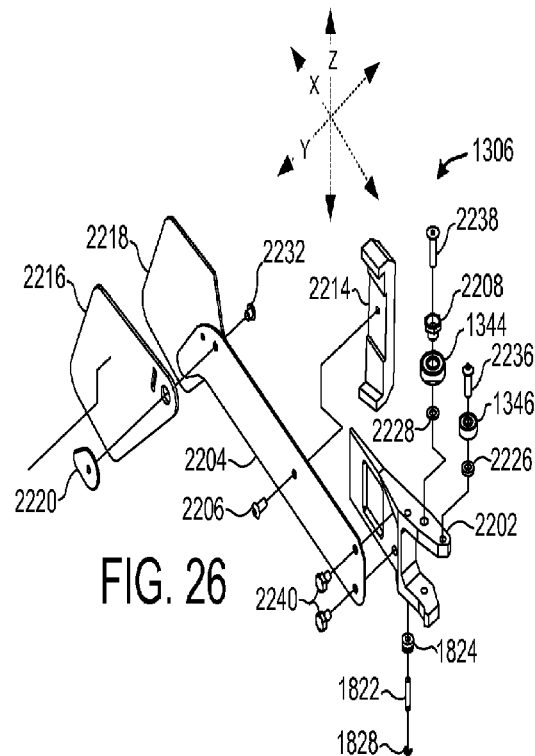
FIG. 26 shows an exploded perspective view of the harvester apparatus components of FIGS. 22-24.
Figure 25:
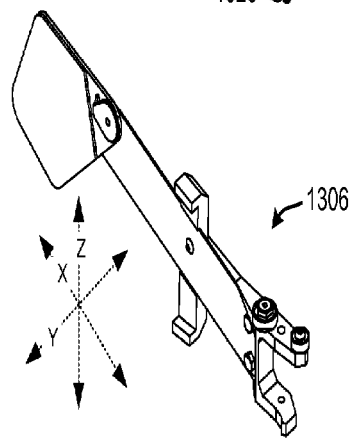
FIG. 25 shows a perspective view of the harvester apparatus components of FIGS. 22-24.

FIGS. 22-26 collectively illustrate spring arm assembly 1306 in more detail. FIG. 22 is a side elevational view. FIGS. 23 and 24 are opposing front and rear elevational views of the spring arm assembly. FIG. 25 is a perspective view of the spring arm assembly. FIG. 26 is an exploded perspective view of the spring arm assembly.

In this case, the spring arm assembly 1306 includes a left arm 2202, a left arm spring plate 2204, a button head 2206, an eccentric bearing mount T-nut 2208, opening bearing 1344, locking bearing 1346, a separator arm 2214, pad 2216, pad 2218, pad mounting bracket 2220, locking bearing washer 2226, opening bearing washer 2228, a spring arm pad screw 2232, a screw 2236, a screw 2238, and two hex bolts 2240. The spring arm assembly also includes the cutter arm closing spring dowel pin 1822, cutter arm spring bushing 1824, and retainer 1828 which were introduced above relative to FIGS. 18-21.

Cam Follower Assembly Examples

FIGS. 27-29 collectively illustrate cam follower assembly 1308 in more detail. FIG. 27 is a side elevational view. FIG. 28 is a front elevational view of the cam follower assembly. FIG. 29 is an exploded perspective view of the cam follower assembly.

In this implementation, the cam follower assembly 1308 includes two center bearing cam followers 2702(1) and 270(2), a modified shoulder bolt trigger pin 2704, a modified washer 2706, a cam follower 1342, a cam follower sleeve 2710, a snap ring 2712, a cam follower arm bearing washer/spacer 2714, a cam follower nut 2716, a socket clamp 2718, and a cam follower arm new degree 2720. The cam follower assembly 1308 also defines a socket 2722 that is configured to receive ball end linkage 1322 (see FIG. 17).

Trigger Pin Assembly Examples

Figure 30:
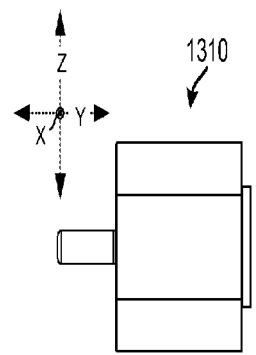
FIGS. 30-31 show elevational views of harvester apparatus components in accordance with some implementations of the present concepts.
Figure 31:
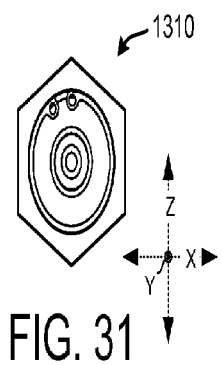
Figure 32:
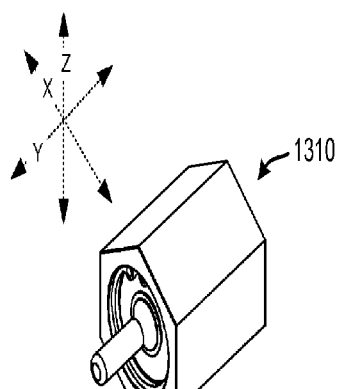
FIG. 32 shows a perspective view of the harvester apparatus components of FIGS. 30-31.
Figure 33:
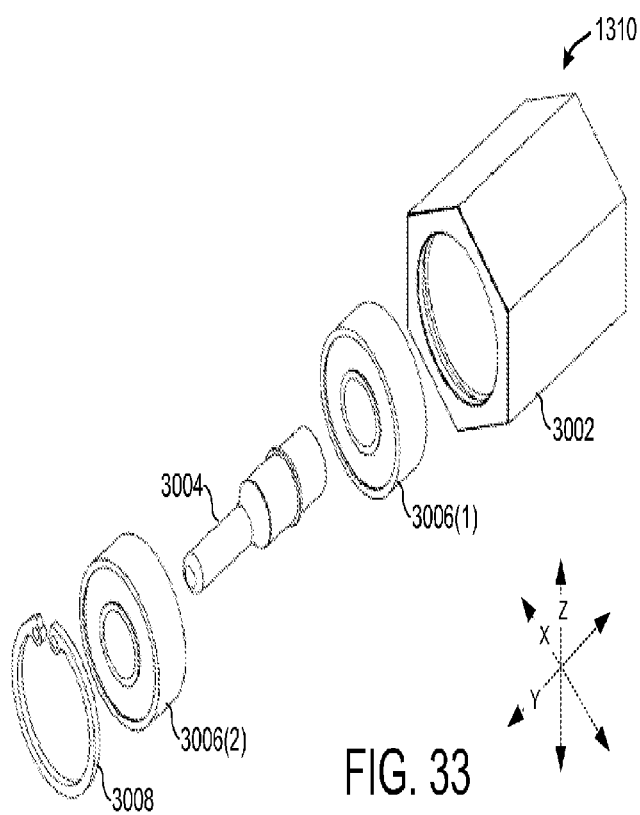
FIG. 33 shows an exploded perspective view of the harvester apparatus components of FIGS. 30-31.

FIGS. 30-33 collectively illustrate trigger pin assembly 1310 in more detail. FIG. 30 is a side elevational view of the trigger pin assembly. FIG. 31 is a front elevational view. FIG. 32 is a perspective view. FIG. 33 is an exploded perspective view of the trigger pin assembly.

In this case, trigger pin assembly 1310 includes a trigger pin housing 3002, a trigger pin 3004, two trigger pin bearings 3006(1) and 3006(2), and an internal snap ring 3008.

Planetary Gear Assembly Examples

Figure 34:
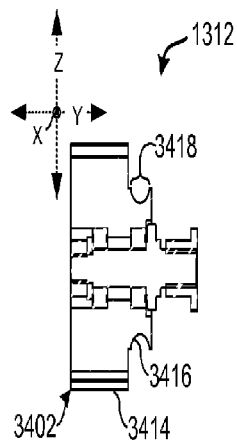
FIG. 34 shows a sectional view of the harvester apparatus components in accordance with some implementations of the present concepts.
Figure 35:
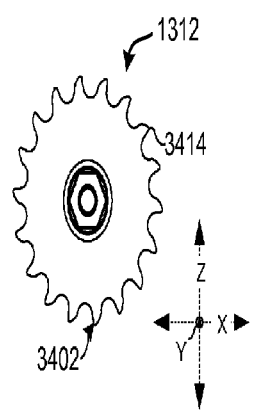
FIG. 35 shows an elevational view of the harvester apparatus components of FIGS. 30-31.
Figure 36:
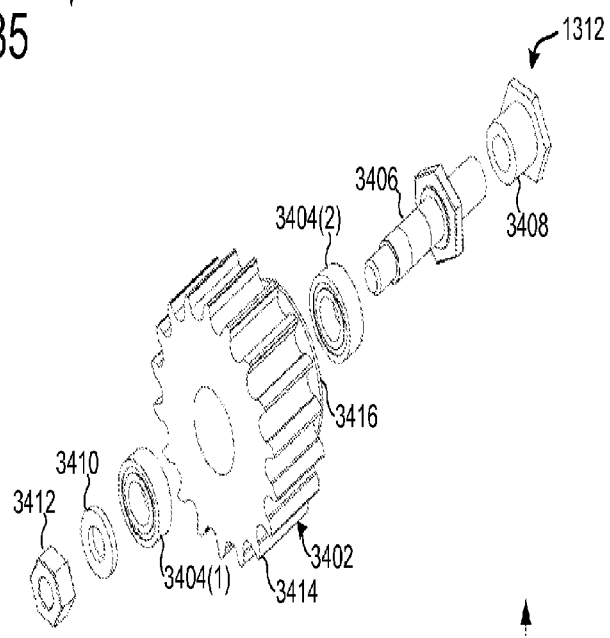
FIG. 36 shows an exploded perspective view of the harvester apparatus components of FIGS. 34-35.

FIGS. 34-36 collectively illustrate planetary gear assembly 1312 in more detail. FIG. 34 is a side elevational view of the planetary gear assembly. FIG. 35 is a front elevational view. FIG. 36 is an exploded perspective view of the planetary gear assembly.

In this case, planetary gear assembly 1312 includes a planetary gear 3402, two bearing models 3404(1) and 3404 (2), a planetary gear stud 3406, a T-nut planetary gear 3408, a planetary gear washer 3410, and a planetary gear nut 3412. Further, planetary gear 3402 can be thought of as including a toothed or geared portion 3414 and a smooth brake portion 3416. As will be described in more detail below relative to FIGS. 42-55, the geared portion is configured to engage the ring gear 508 and the break portion is configured to engage brake rail 516 (see FIGS. 6-8). Specifically, break portion 3416 defines a circumferential surface 3418 for contacting break rail 516.

Drive Wheel Hub Assembly Examples

Figures 37, 38:
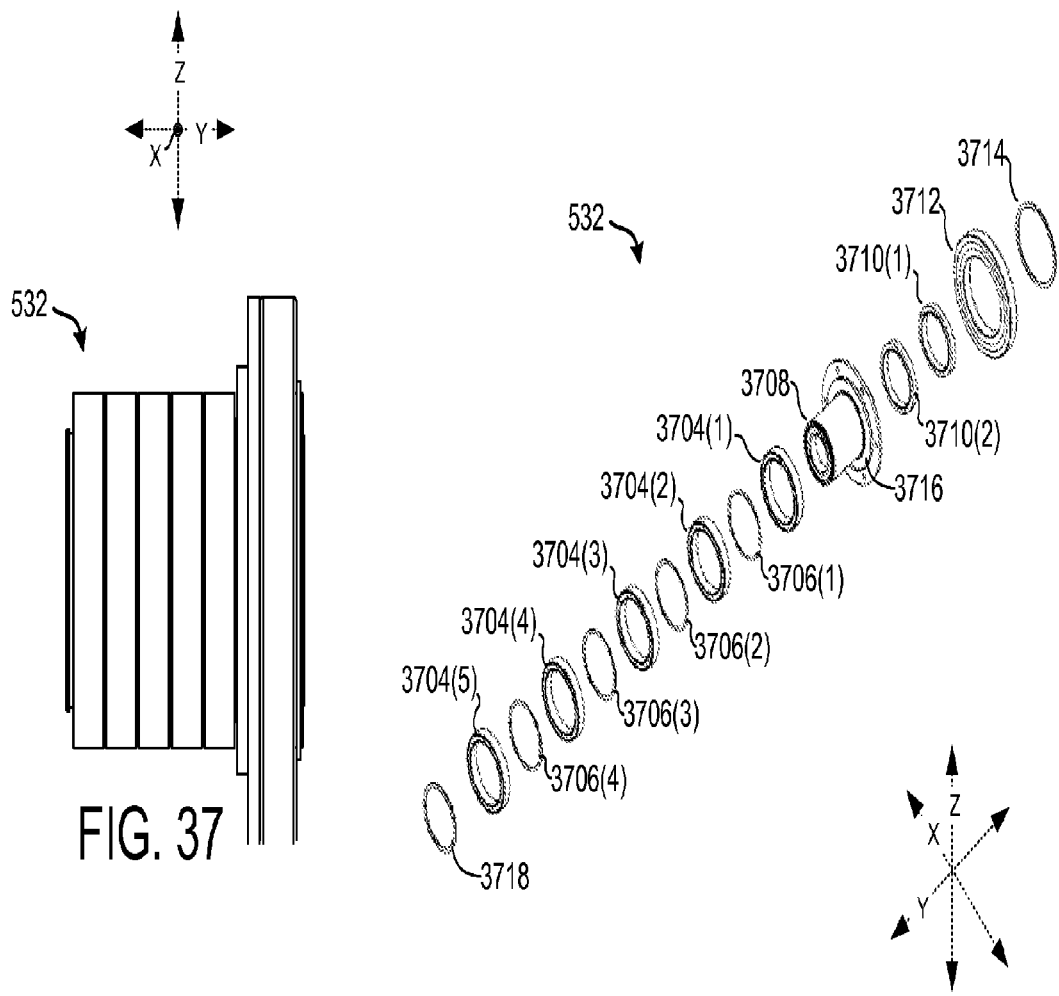
FIG. 37 shows an elevational view of harvester apparatus components in accordance with some implementations of the present concepts.
FIG. 38 shows an exploded perspective view of the harvester apparatus components of FIG. 37.

FIGS. 37-38 collectively illustrate drive wheel assembly 532 in more detail. FIG. 37 is a side elevational view of the drive wheel hub assembly. FIG. 38 is an exploded perspective view.

In this case, drive wheel hub assembly 532 includes five cutter assembly bearings 3704(1)-3704(5), four bearing spacer washer bokers 3706(1)-3706(4), a front shaft bearing 3708, two shaft bearing IKS 3710(1)-3710(2), a trigger arm bearing 3712, a retainer ring smalley 3714, a cutter arm hub 3716, and a retainer ring smalley 3718. Individual bearings 3704(1)-3704(5) receive individual cutter arm assemblies 208(1)-208(5) via cutter arm hub end 1330. Similarly, trigger arm bearing 3712 receives actuator assembly 'part c' 1108.

Considered from one perspective, the cutter arm hub 3716 can be thought of as including a vertical mounting flange that can be fastened to ring gear assembly 212 (FIG. 5). The vertical mounting flange can be interposed between a first horizontal portion and a second horizontal portion. For ease of explanation, these first and second horizontal portions may be thought of as being tubular in some configurations. The front shaft bearing 3708 can be positioned within the first horizontal portion while the set of cutter assembly bearings 3704(1)-3704(5) can be positioned without or around the first horizontal portion.

The two shaft bearings 3710(1) and 3710(2) can be positioned within the second opposing horizontal portion. Trigger arm bearing 3712 can be positioned without or around the second horizontal portion.

Drive Wheel Assembly Examples

Figure 39:
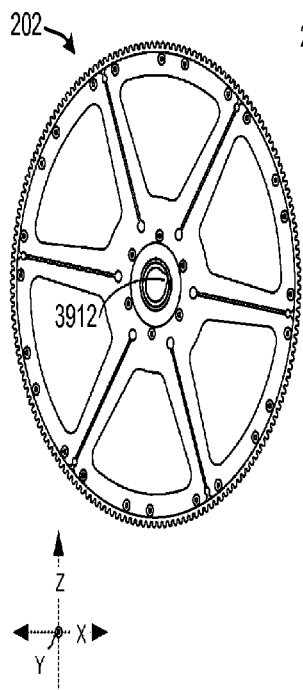
FIGS. 39-40 show elevational views of harvester apparatus components in accordance with some implementations of the present concepts.
Figure 40:
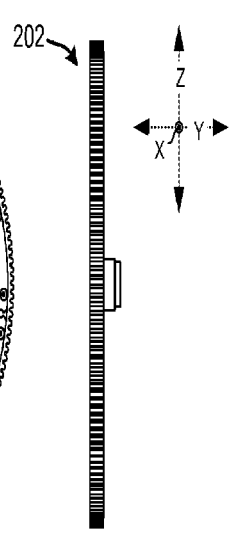
Figure 41:
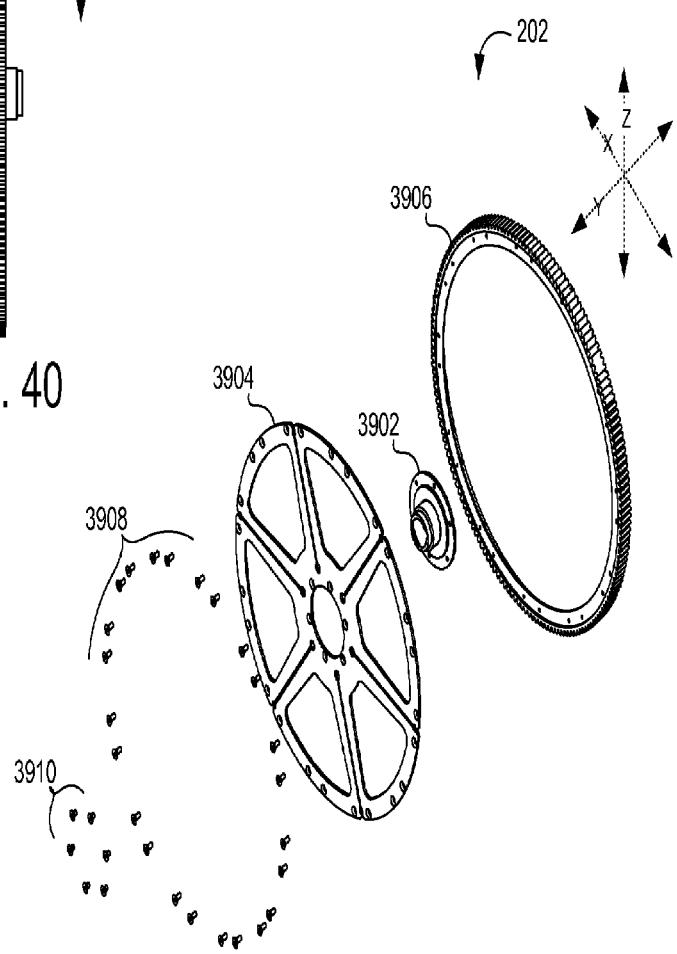
FIG. 41 shows an exploded perspective view of the harvester apparatus components of FIGS. 39-40.

FIGS. 39-41 collectively illustrate drive wheel assembly 202 in more detail. FIG. 39 is a side elevational view of the drive wheel assembly. FIG. 40 is a front elevational view of drive wheel assembly 202. FIG. 41 is an exploded perspective view of the drive wheel assembly.

In this case, drive wheel assembly 202 includes a drive wheel hub 3902, a drive wheel 3904, a drive wheel gear 3906, a first set of fasteners 3908, and a second set of fasteners 3910. The first set of fasteners 3908 serve to fasten the drive wheel gear 3906 to the drive wheel 3904. The second set of fasteners 3910 serve to fasten the drive wheel hub 3902 to the drive wheel 3904.

Drive wheel hub 3902 is received in the back side of drive wheel hub assembly 532 (FIGS. 37-38). Specifically, the drive wheel hub can be received into, and isolated from, cutter arm hub 3716 by two shaft bearings 3710(1) and 3710(2).

The width of the combined drive wheel hub 3902 and drive wheel hub assembly 532 (as measured along the cutter shaft or y-reference axis) generally does not exceed the harvest width $w_1$ of an individual harvester apparatus as discussed relative to FIG. 1. From another perspective the combined width defines the harvest width that the cutter arm assemblies operate within and harvest.

The drive wheel hub 3902 is driven by mechanical energy that is transferred from the cutter shaft to the drive wheel assembly 202 via the drive wheel hub 3902. Toward this end, in some implementations a groove 3912 is formed in drive wheel hub 3902. A corresponding groove can be formed in the cutter shaft 120 (see FIG. 1). During assembly, when an individual harvesting apparatus is positioned at the appropriate point on the cutter shaft, the grooves can be aligned and an expandable key can be inserted into the resulting space. The expanding key can be expanded to fasten the drive wheel hub 3902 and the cutter shaft so that rotation of the cutter shaft rotates the drive wheel hub and thereby the drive wheel.

As mentioned above, drive wheel hub 3902 is driven by the cutter shaft. However, along the combined width, individual bearings 3704(1)-3704(5) can serve to isolate individual cutter arm assemblies 208(1)-208(5) from one another and from the cutter shaft. Similarly, trigger arm bearing 3712 can isolate the actuator assembly and the cutter arm hub can be isolated from the cutter shaft and the drive wheel hub 3902 by bearings 3710(1) and 3710(2) interposed therebetween. Energy from the cutter shaft and drive gear can be selectively transferred to individual cutter arm assemblies, the cutter arm hub and the actuator assembly as described below relative to FIGS. 42-67.

While specific components are illustrated and discussed, other components that can achieve the selective harvest functionality can be utilized in alternative configurations.

Harvesting Examples

FIGS. 42-82 collectively illustrate interactions of previously illustrated components of harvester apparatus 122(18) during the harvesting process.

Figure 42:
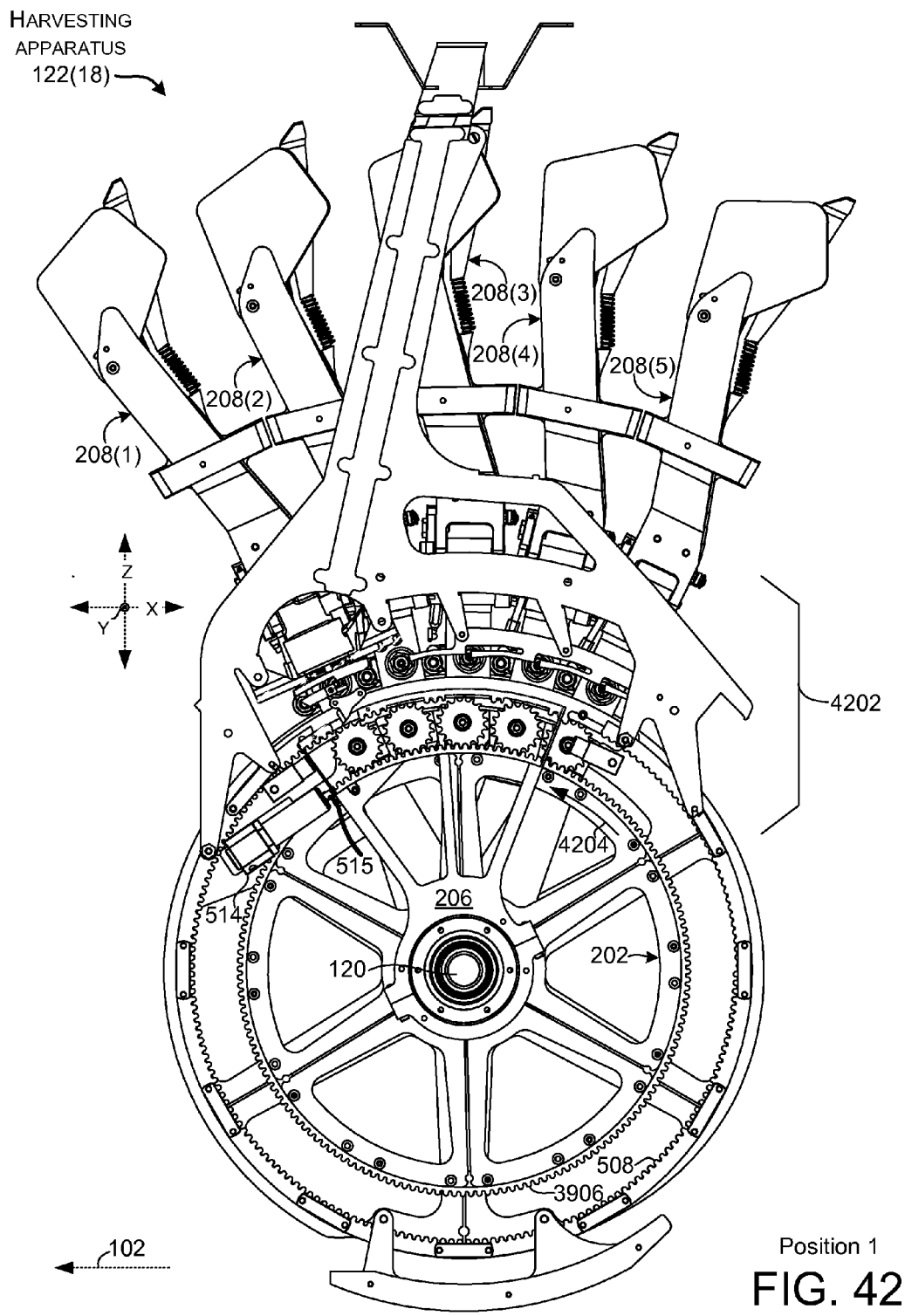
Figure 43:
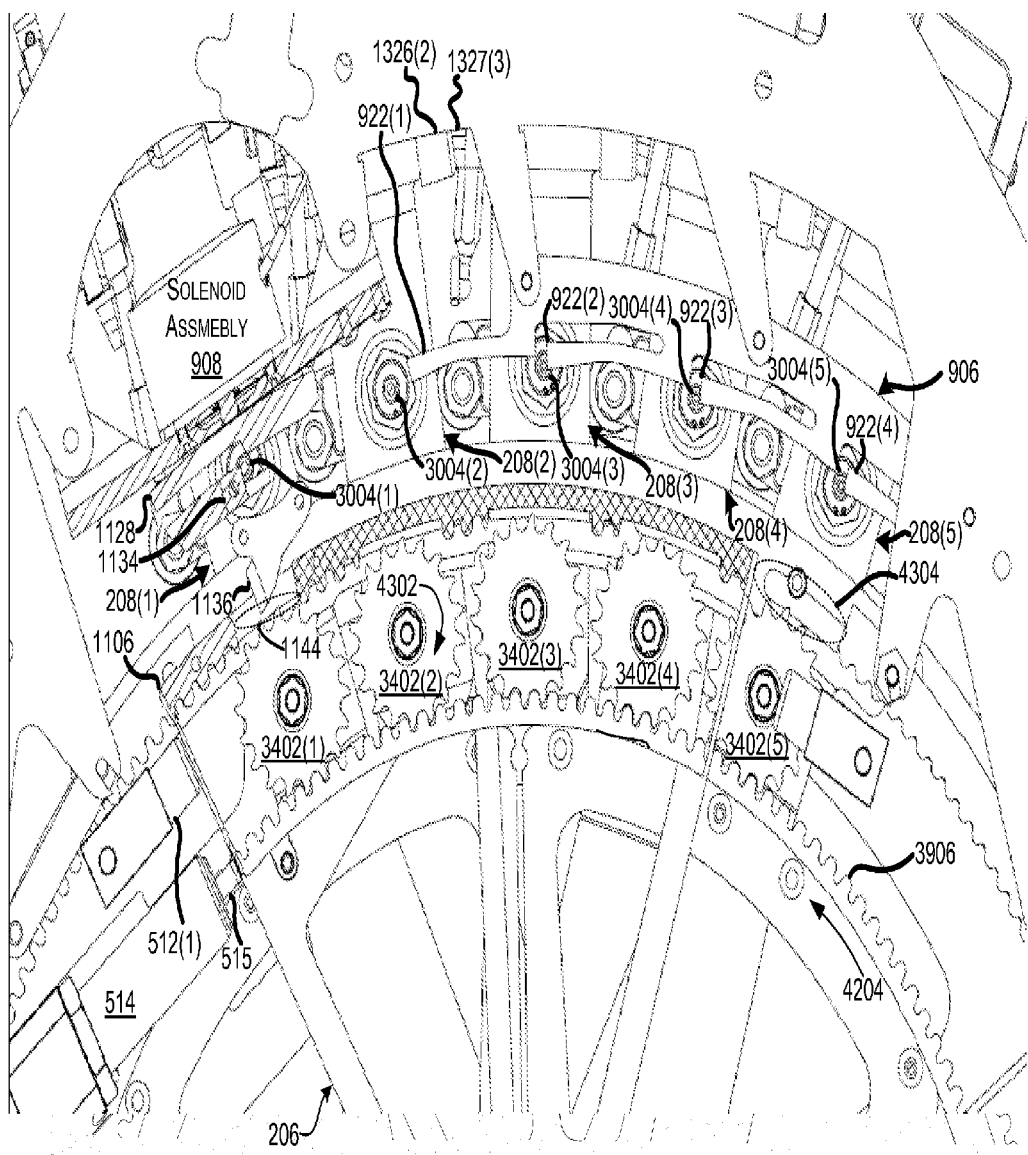
Figure 44:
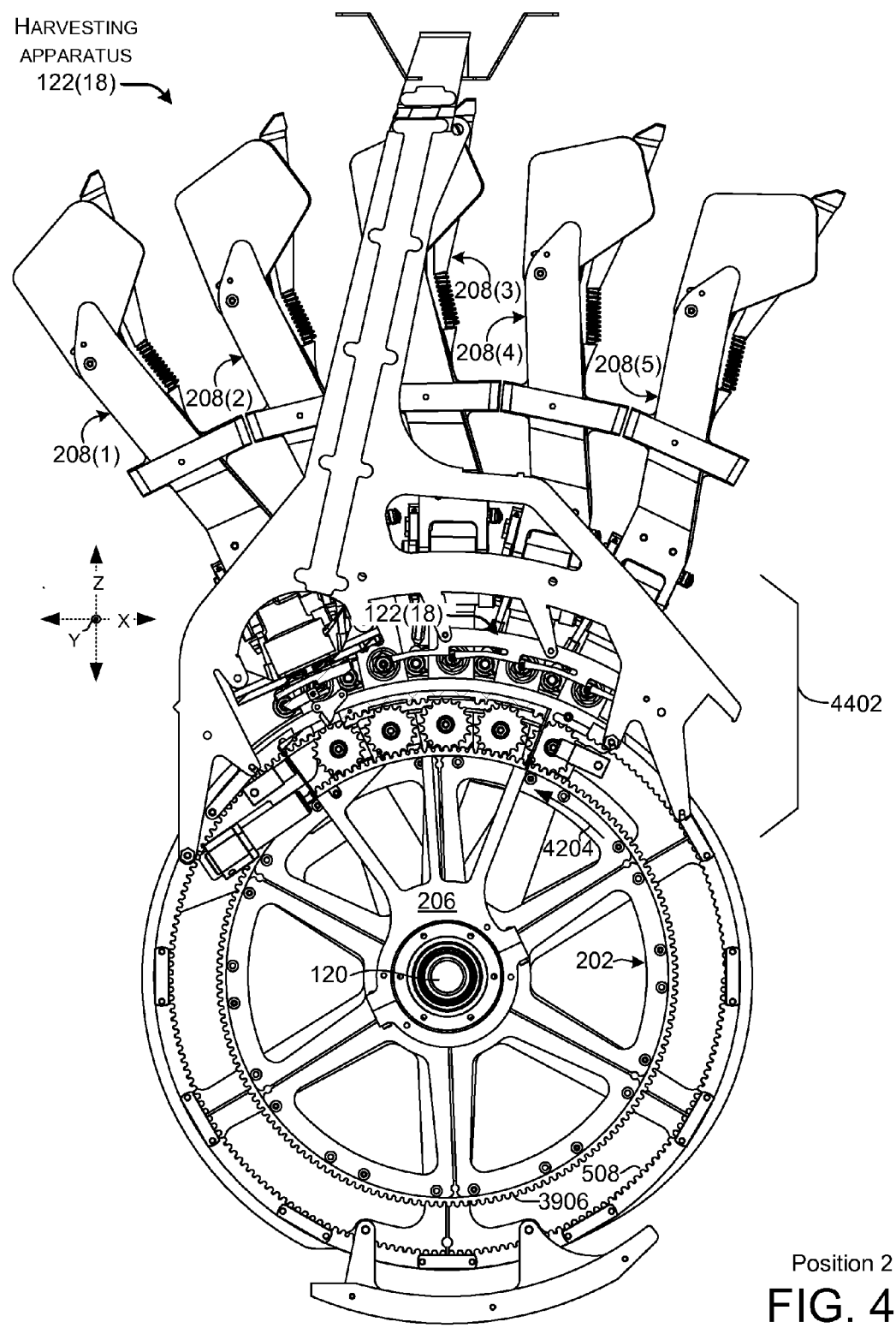
Figure 45:
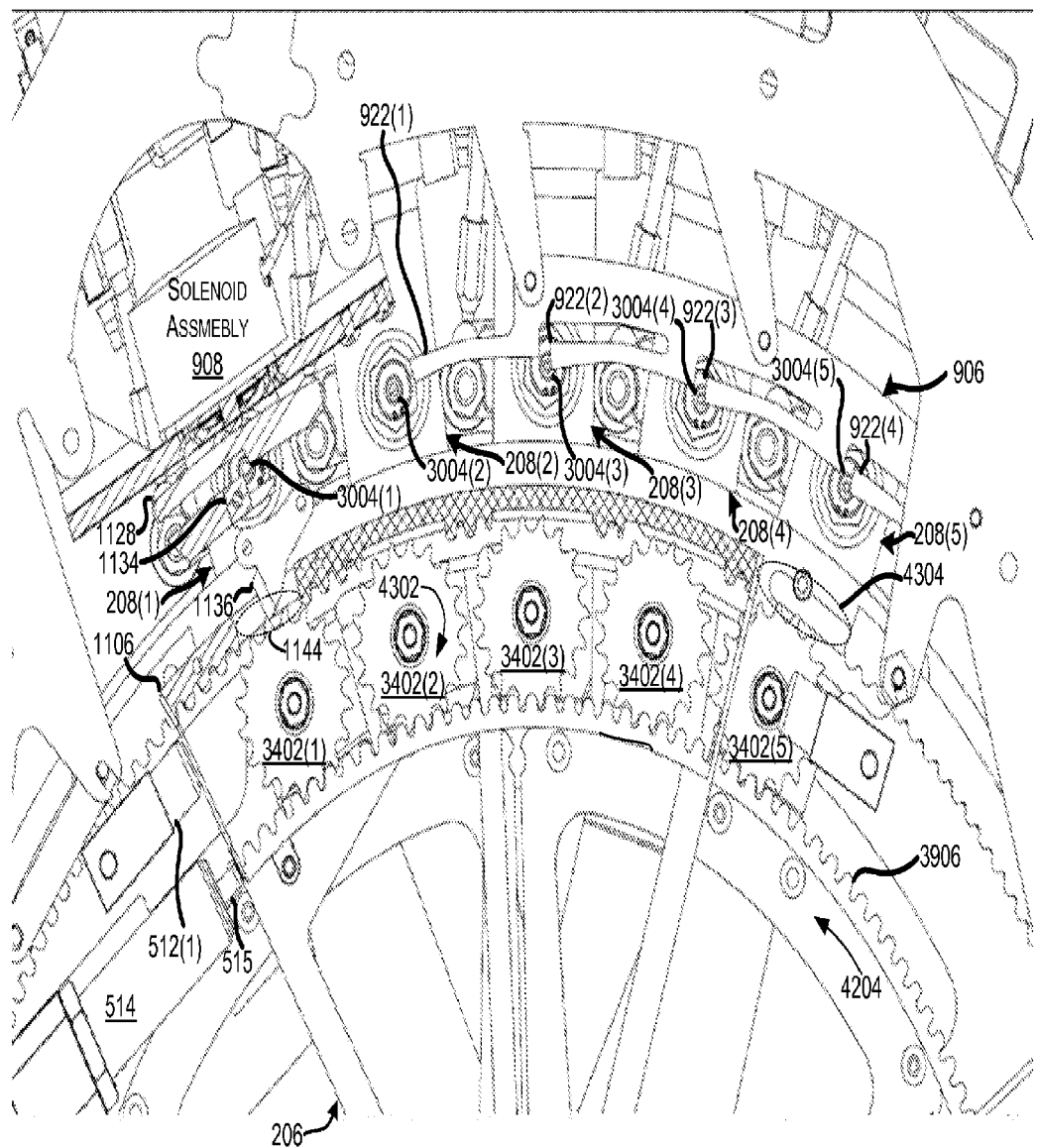
Figure 46:
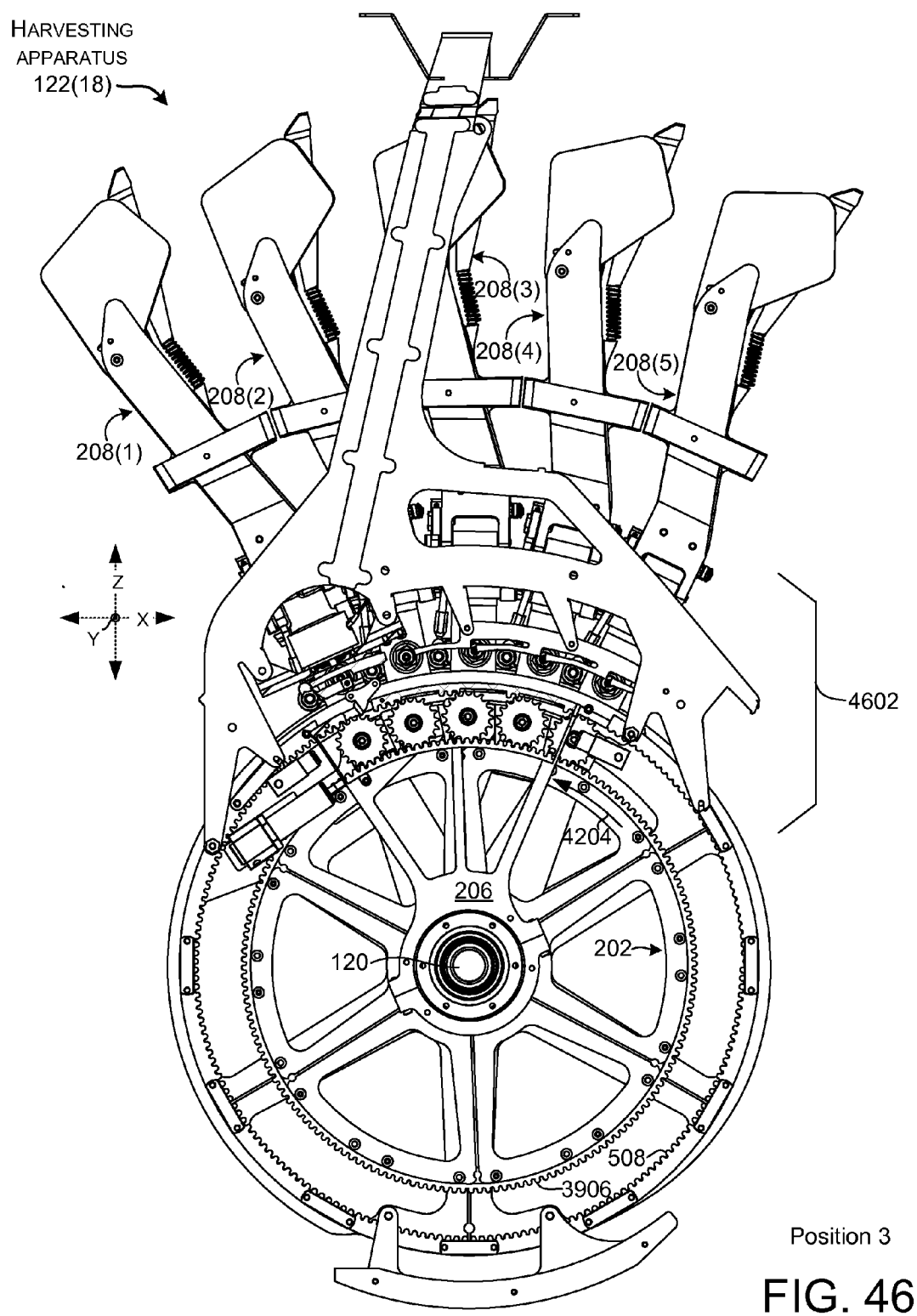
Figure 47:
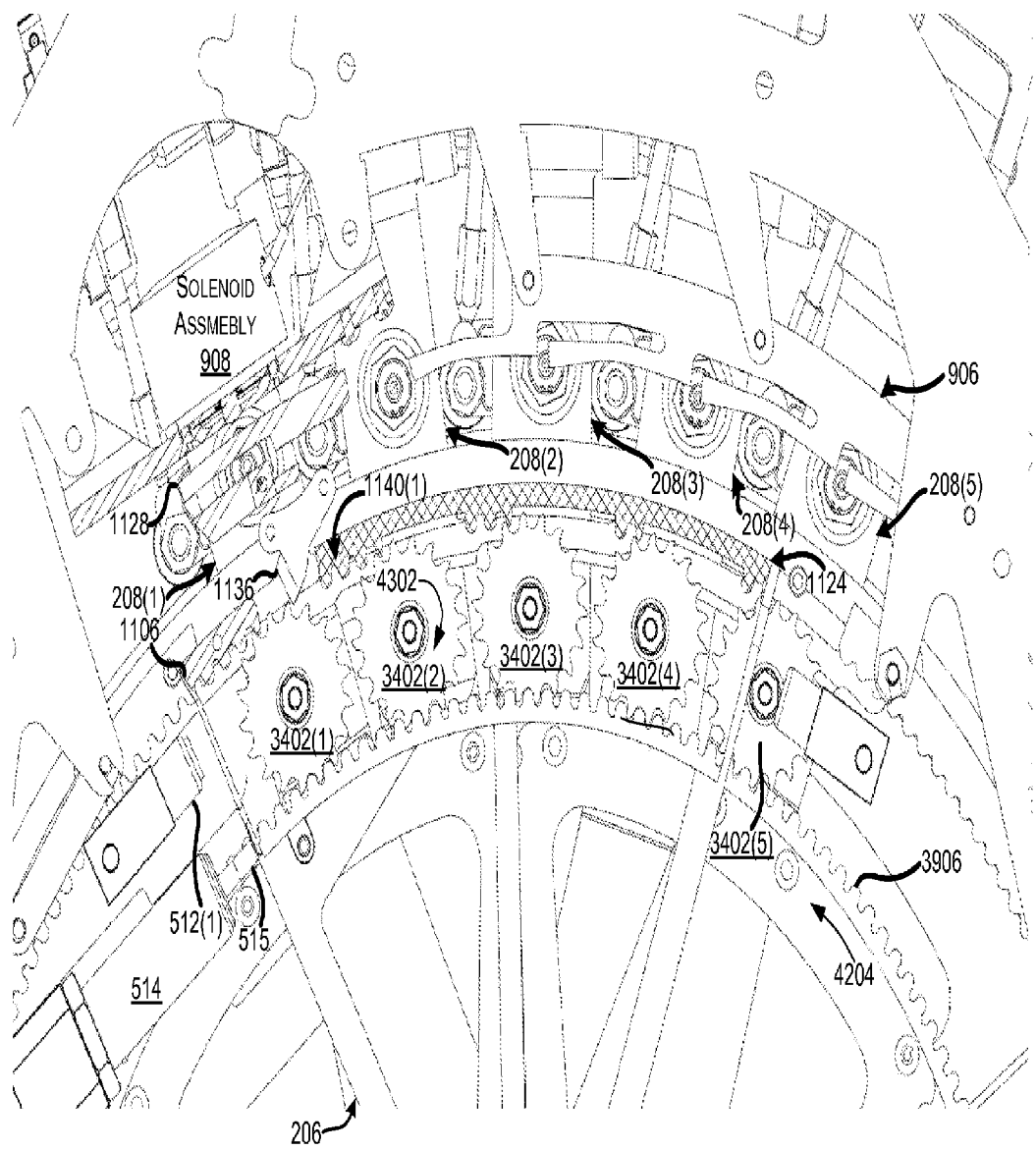
Figure 48:
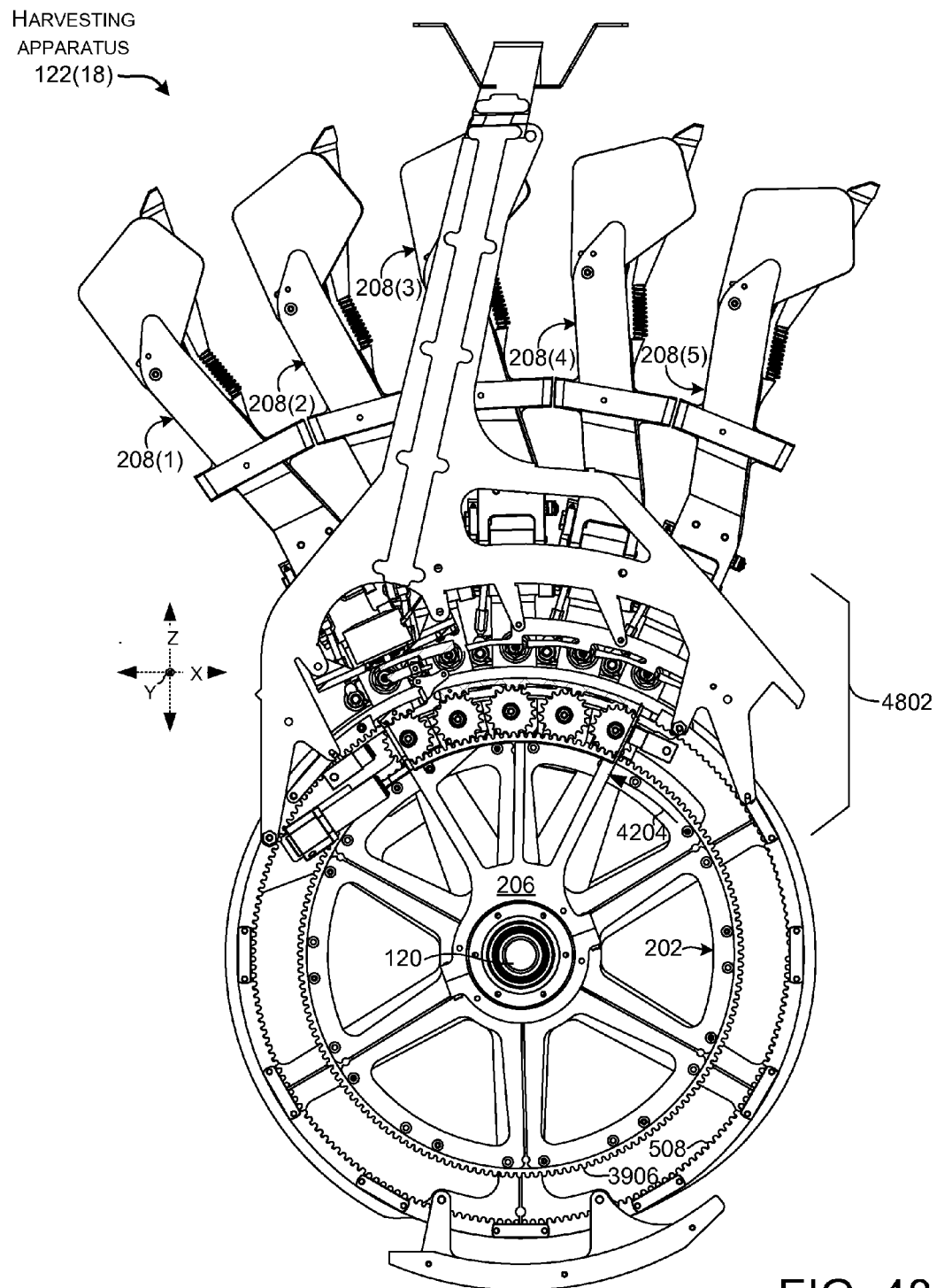
Figure 49:
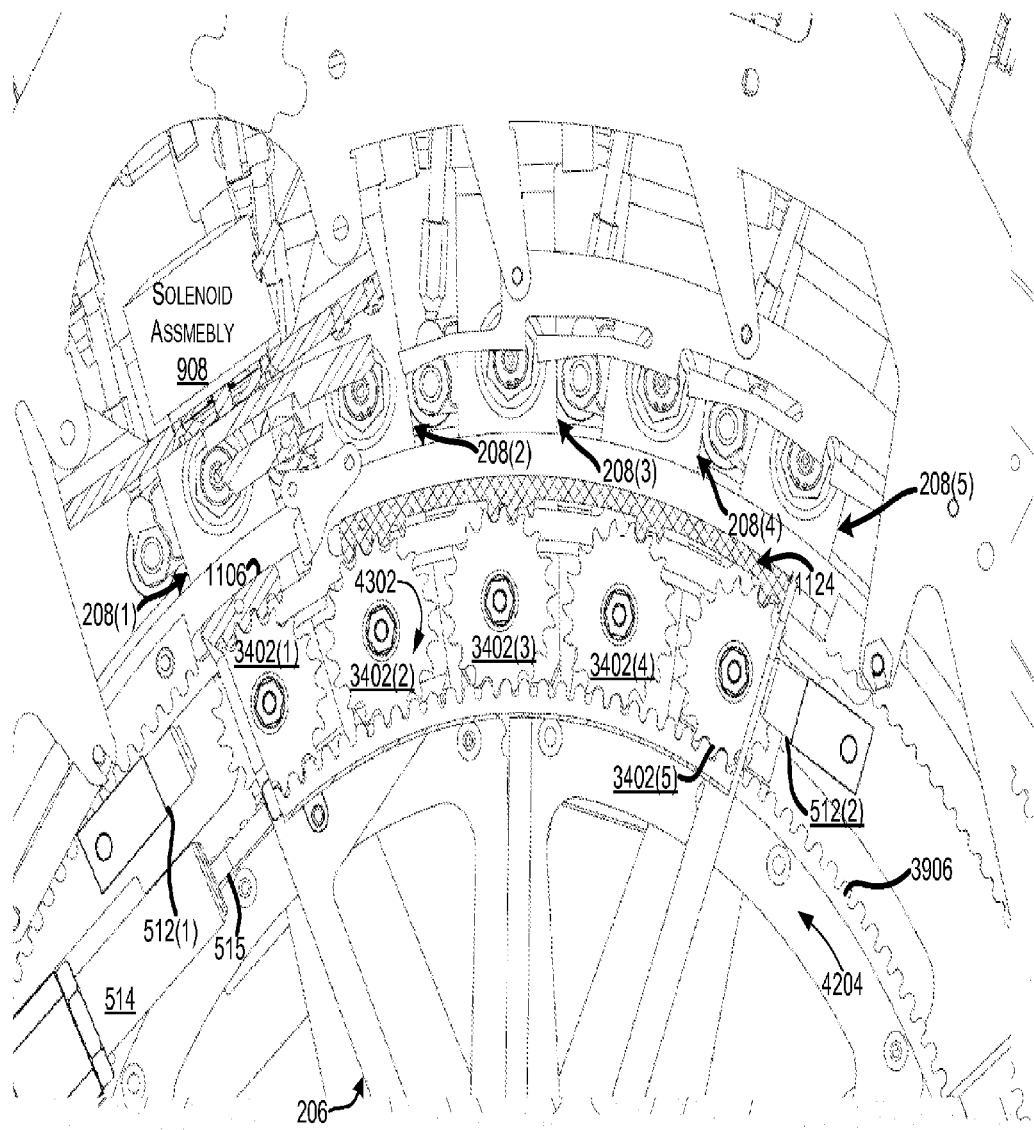
Figure 50:
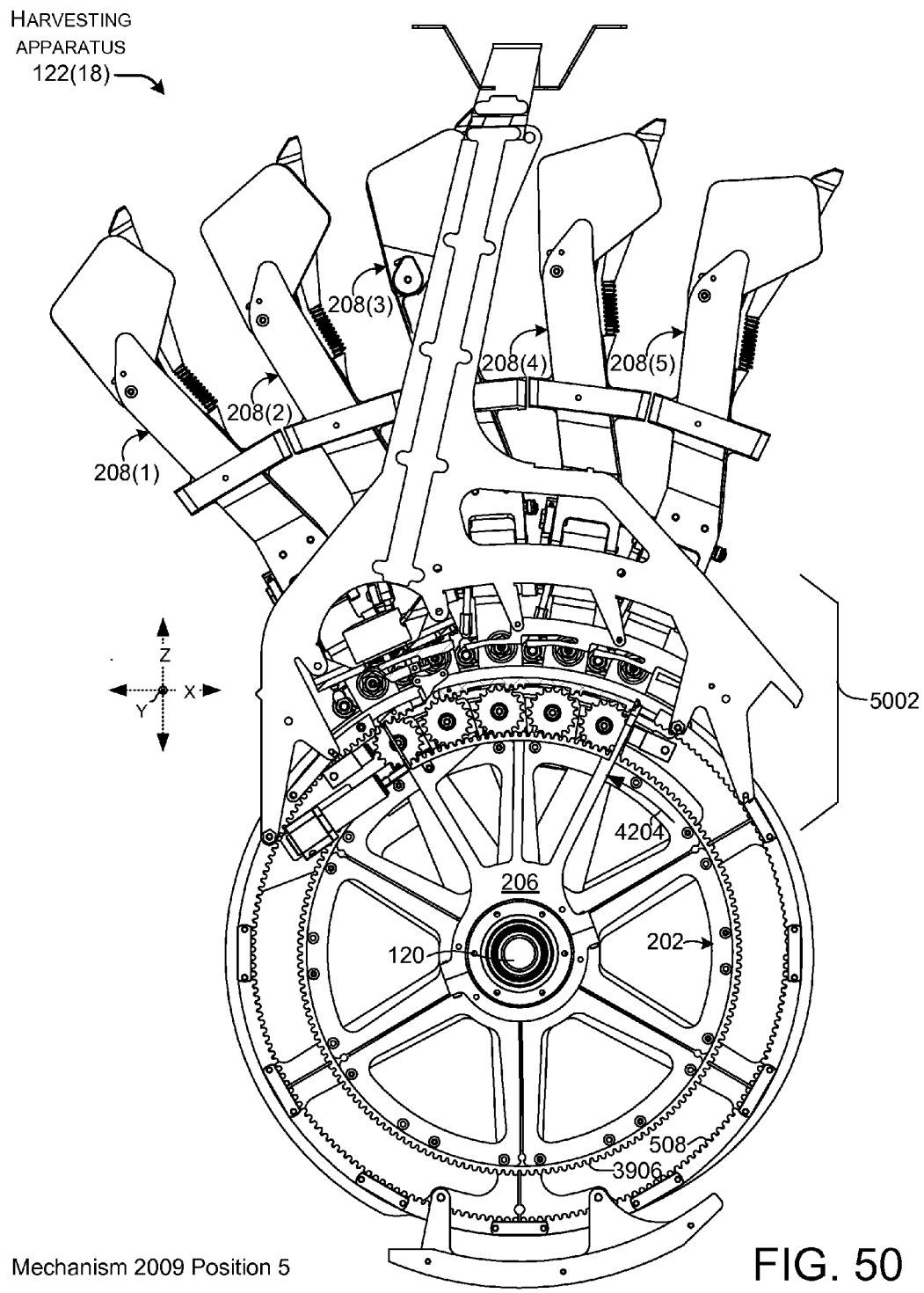
Figure 51:
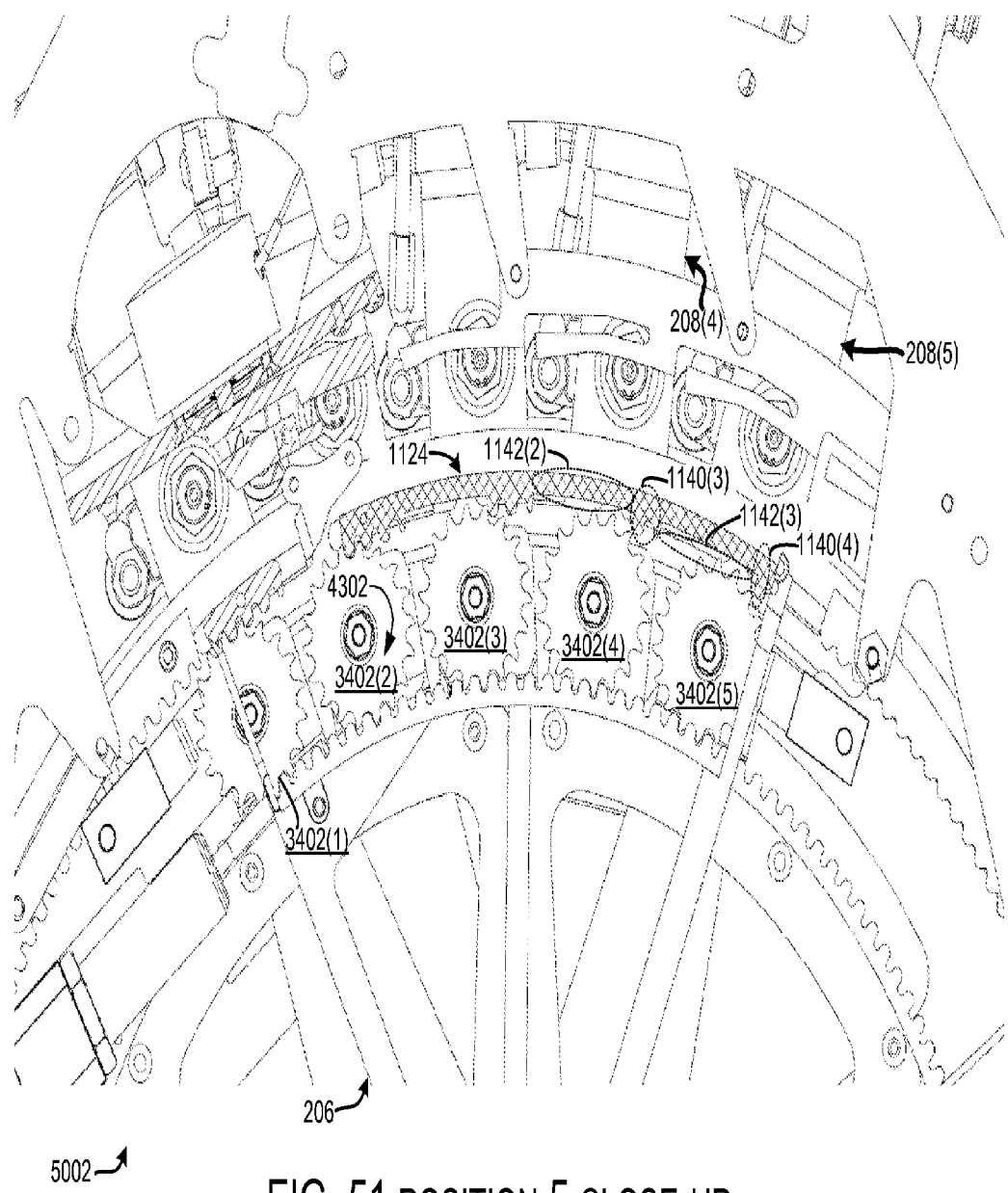
Figure 52:
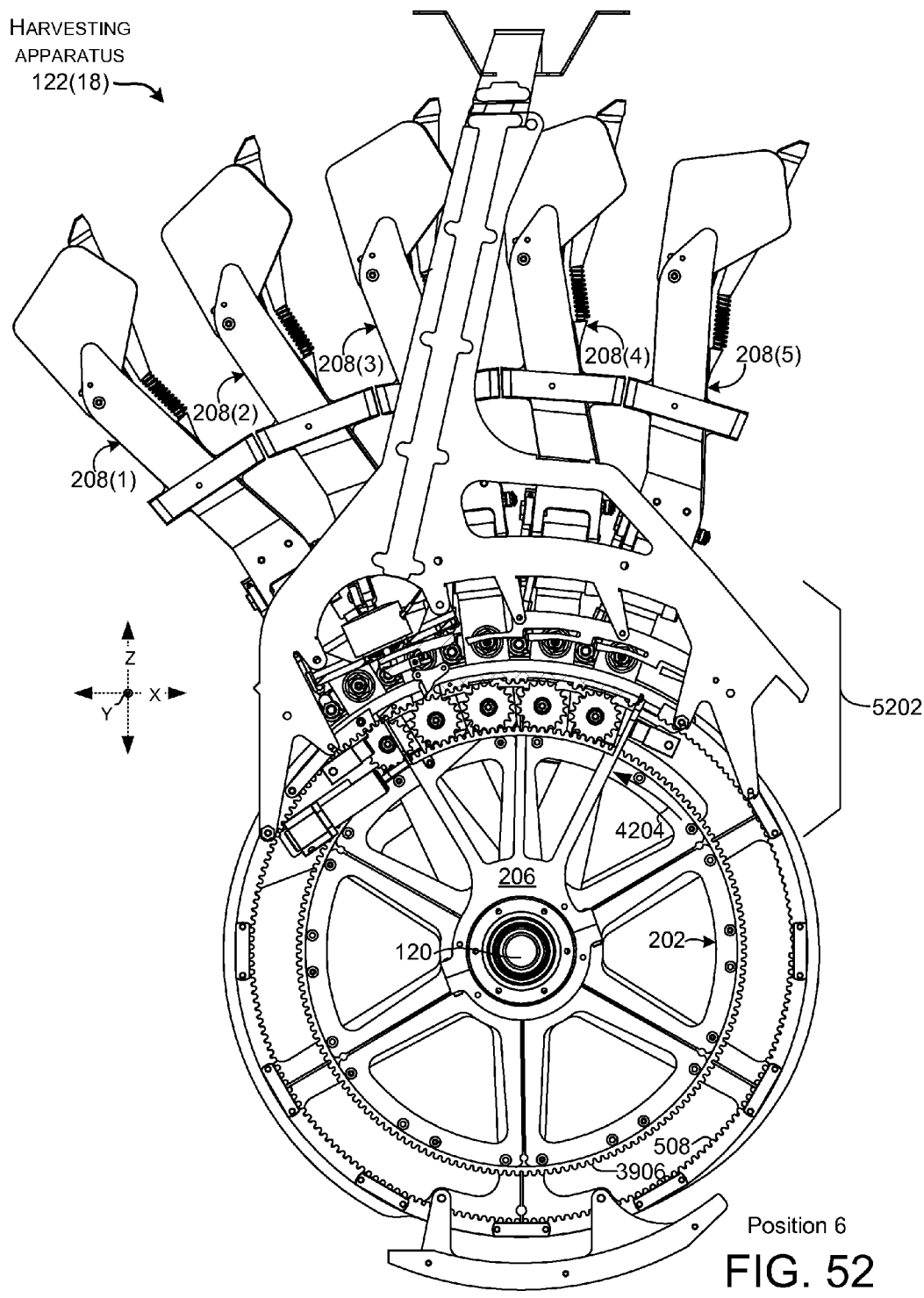
Figure 53:
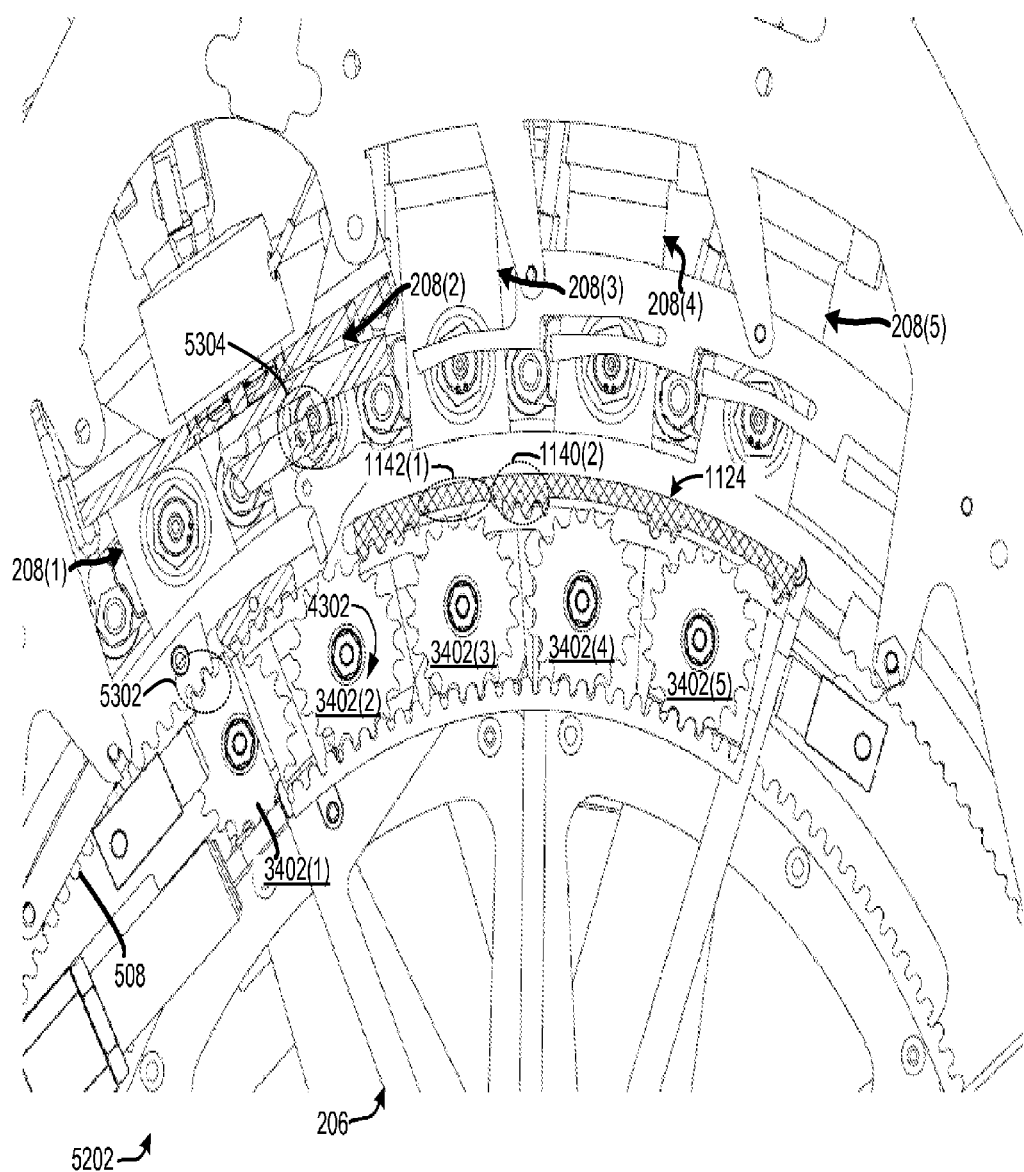
Figure 54:
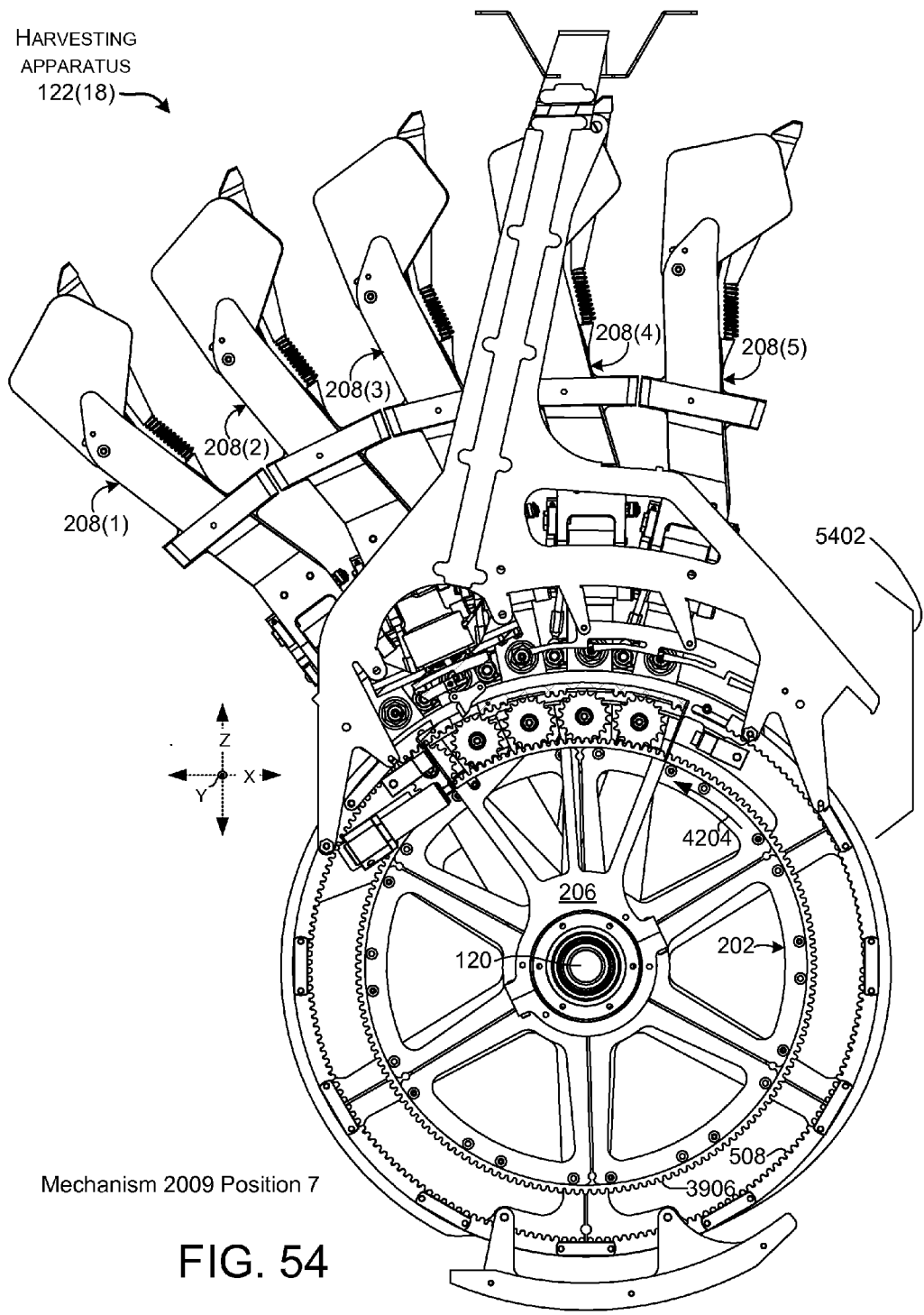
Figure 59:
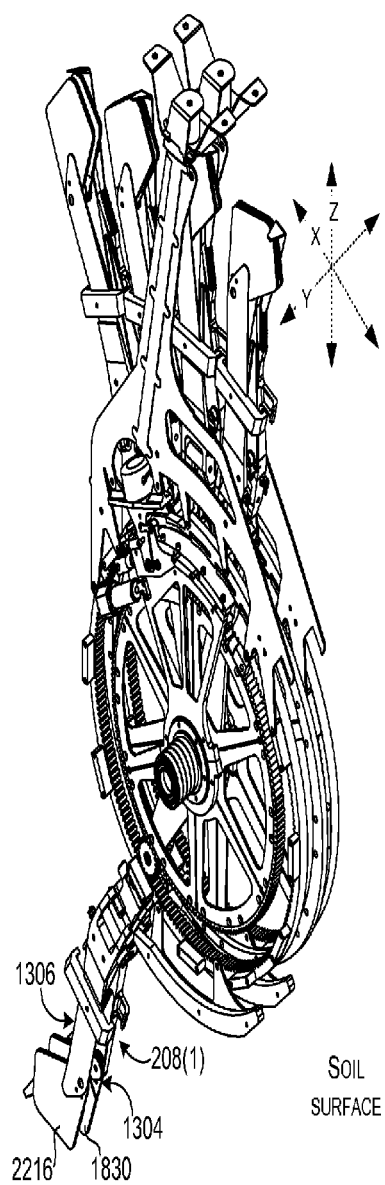
Figure 60:
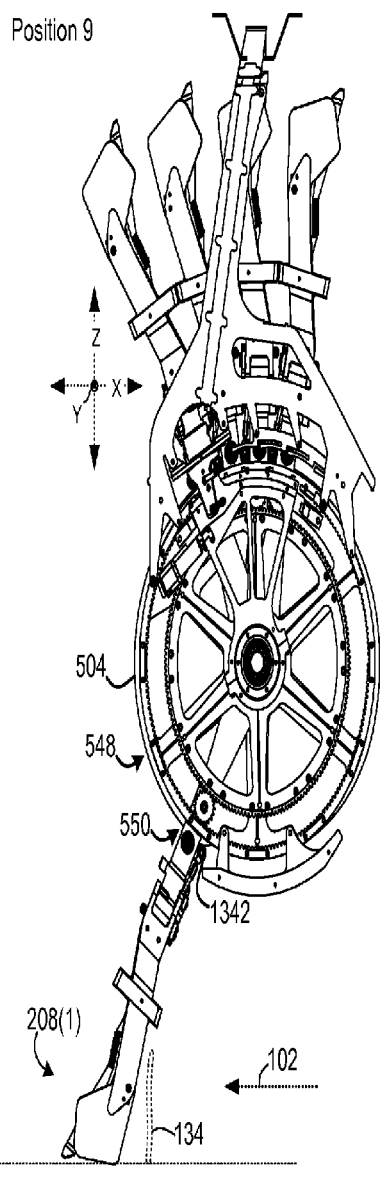
Figure 61:
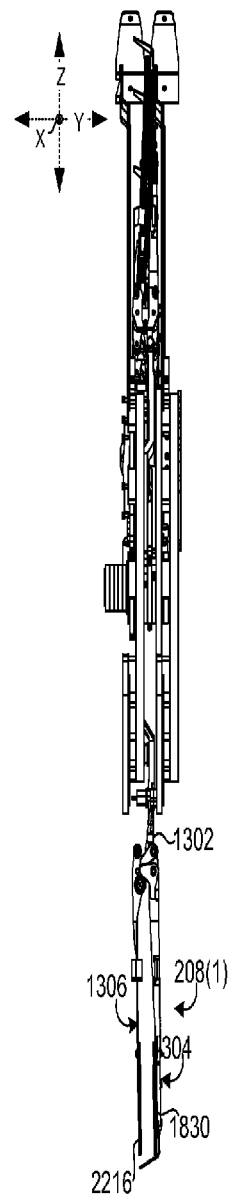
Figure 62:
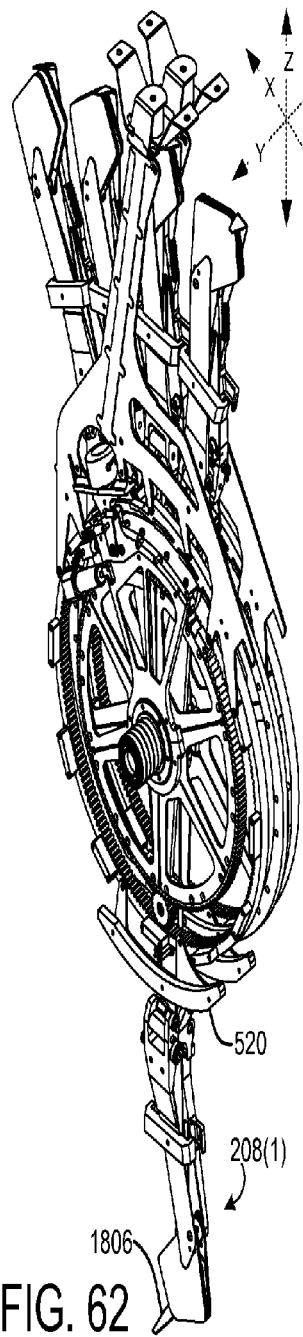
Figure 63:
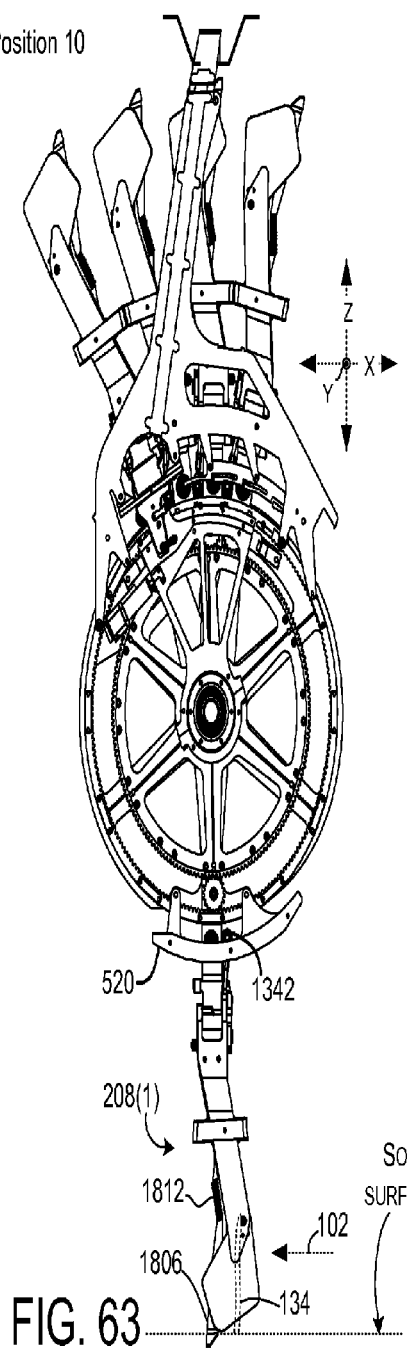
Figure 64:
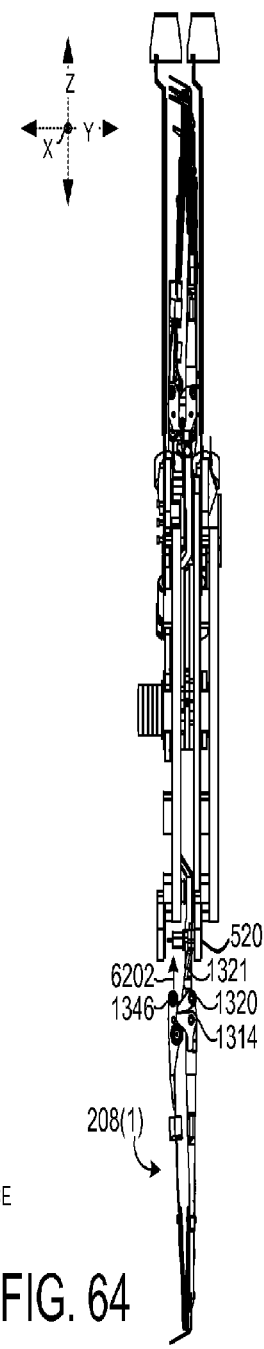

FIG. 42 shows harvesting apparatus 122(18) in a first position. FIG. 43 shows an enlarged view of a portion 4202 of the harvesting apparatus. Similarly, FIGS. 44 and 45 show position 2 in the same manner. Likewise, FIGS. 46 and 47 show position 3, FIGS. 48 and 49 show position 4, FIGS. 50 and 51 show position 5, FIGS. 52 and 53 show position 6, and FIGS. 54 and 55 show position 7. The pattern changes at position 8 which is shown in FIGS. 56-58, position 9 is shown in FIGS. 59-61, and position 10 is shown in FIGS. 62-64. FIGS. 65-79 offer additional views and/or more detail related to the discussion of positions 8-10. Position 11 is shown in FIGS. 80-82.

FIGS. 42-55 generally show an example of how cutter arm assemblies 208(1)-208(5) can be selectively driven with energy from cutter shaft 120 to harvest asparagus spears. In this case, cutter shaft 120 is turning in a counter-clockwise direction. The cutter shaft is mechanically connected to, and drives, drive wheel assembly 202 such that drive wheel gear 3906 is likewise turning in a counterclockwise direction as indicated at 4204. Planetary gears 3402(1)-3402(5) engage, and can be driven by, drive wheel gear 3906 and as such are turning in a clockwise direction as indicated at 4302. Also, for orientation purposes, the direction of travel 102 of the overall selective harvester over the ground is shown on FIG. 42.

Returning specifically now to FIGS. 42 and 43, the first position of harvester apparatus 122(18) can be thought of as being a 'neutral' or 'ready position' awaiting a signal from sensor 126(18) (FIG. 1). In the neutral position, shock absorber piston 515 is retracted. Actuator assembly 206 is at a forward-most position against the shock absorber piston 515. Further, trigger pin 3004(1) engages trigger block 1134 which functions to prevent cutter arm assembly 208(1) from moving forward (i.e., counter-clockwise). The remaining trigger pins 3004(2)-3004(5) engage latch detents 922(1)-922(4) respectively. The latch detents function to prevent the respective cutter arm assemblies 208(2)-208(5) from moving backwards (i.e. clockwise). Also, the cutter arm bumpers of adjacent cutter arms engage one another. For instance, trailing side cutter arm bumper 1326(2) of second cutter arm assembly 208(2) engages leading side cutter arm bumper 1327(3) of third cutter arm assembly 208(3).

In the neutral position, while the planetary gears 3402(1)-3402(5) are being driven by the drive wheel gear 3906, the planetary gears are not engaging ring gear 508, advancing gear 1106, or timing gear 1124. Instead, the planetary gears 3402(1)-3402(4) are aligned with gap 1144 and gearless regions 1142(1), 1142(2), and 1142(3), respectively. (Due to space constraints on FIGS. 42 and 43 illustrated gearless regions 1142(1), 1142(2), and 1142(3) are not designated with specificity, see FIGS. 11-12). Similarly, planetary gear 3402(5) is aligned with a gap 4304 between the ring gear 508 and timing gear 1124. Accordingly, despite being driven by drive wheel gear 3906, gears 3402(1)-3402(5) do not impart radial motion to their respective cutter arm assemblies 208(2)-208(5) in the neutral position.

FIGS. 44-45 are similar to those of FIGS. 42 and 43 respectively except that harvester apparatus 122(18) is now in a second position (i.e., position 2). As with FIGS. 42 and 43, FIG. 45 shows a portion 4402 of the harvesting apparatus shown in FIG. 44. Position 2 occurs responsive to sensor 122(18) (designated FIG. 1) detecting a harvestable asparagus spear. Upon detecting the harvestable asparagus spear the sensor sends a signal to solenoid assembly 908. The signal activates the solenoid assembly thereby moving trigger 1128 downward toward the cutter shaft 120. The downward movement of the trigger includes the trigger block 1134 and the trigger tooth 1136. This downward movement allows trigger pin 3004(1) to clear trigger block 1134. Further, trigger tooth 1136 moves downward into gap 1144 sufficiently to engage teeth of planetary gear 3402(1). Recall that in position 1 planetary gear 3402(1) is being driven by the drive wheel gear 3906, but the planetary gear is spinning freely in gap 1144. Now, in position 2 as the planetary gear 3402(1) engages trigger tooth 1136 the planetary gear imparts a counterclockwise force upon its cutter assembly 202(1).

FIGS. 46-47 are similar to those of FIGS. 42 and 43, respectively except that harvester apparatus 122(18) is now in a third position (i.e., position 3). As with FIGS. 42 and 43, FIG. 47 shows a portion 4602 of the harvesting apparatus shown in FIG. 46. In position 3, planetary gear 3402(1) has pushed against trigger tooth 1136 sufficiently to move cutter arm assembly 208(1) forward (i.e., counterclockwise) to the point where planetary gear 3402(1) engages teeth of advancing gear 1106. The interaction of planetary gear 3402(1) and advancing gear 1106 impart a forward force on cutter arm assembly 208(1) and a corresponding opposite rearward force on actuator assembly 206. Accordingly, cutter arm assembly 208(1) continues to move forward. Actuator assembly 206 starts to move rearward and is aided by extension of spring loaded piston 515 of shock absorber 514. At this point, in addition to planetary gear 3402(1) engaging advancing gear 1106, the remaining planetary gears 3402(2)-3402(5) engage teeth of timing gear 1124. Specifically, planetary gear 3402(2) engages geared region 1140(1) (the other geared regions 1140(2)-1140(4) are not labeled in FIG. 47 due to space constraints, but are labeled on FIGS. 11-12). This results in cutter arm assemblies 208(1)-208(5) moving forward and actuator assembly 206 moving rearward.

FIGS. 48 and 49 are again similar to FIGS. 42 and 43 respectively except that harvester apparatus 122(18) is now in a fourth position (i.e., position 4). FIG. 49 shows a close-up view as indicated at 4802. In the fourth position, rearward movement of the actuator assembly 206 is stopped by rear bumper 512(2). At this point since the actuator assembly 206 cannot move further in the clockwise direction, the planetary gears 3402(1)-3402(5) can be thought of as pushing against a fixed object. As such, the planetary gears can accelerate their respective cutter arm assemblies 208(1)-208(5) to full speed in the counter-clockwise direction.

To summarize, in this configuration, as a result of receiving a signal from the sensor, actuator assembly 206 gradually accelerates the set of cutter arm assemblies 208(1)-208(5) as indicated in positions 2-4.

FIGS. 50 and 51 are again similar to FIGS. 42 and 43 respectively except that harvester apparatus 122(18) is now in a fifth position (i.e., position 5). FIG. 51 shows a close-up view as indicated at 5002. In the fifth position, planetary gears 3402(4)-3402(5) disengage from teeth of the timing gear 1124. Specifically, planetary gear 3402(5) moves clockwise from geared region 1140(4) into gap 1142(3). Similarly, planetary gear 3402(4) moves clockwise from geared region 1140(3) into gap 1142(2). Once the planetary gears 3402(4)-3402(5) disengage from the geared regions there is no further radial force imparted upon respective cutter arm assemblies 208(4)-208(5) in the counter-clockwise direction.

FIGS. 52 and 53 are again similar to FIGS. 42 and 43, respectively except that harvester apparatus 122(18) is now in a sixth position (i.e., position 6). FIG. 53 shows a close-up view as indicated at 5202. In the sixth position, planetary gear 3402(1) of cutter arm assembly 208(1) engages ring gear 508 as indicated at 5302. As such, the planetary gear 3402(1), driven by drive wheel gear 3906 and pushes against fixed ring gear 508. Accordingly, planetary gear 3402(1) continues to move cutter arm assembly 208(1) in a counter-clockwise direction.

Further, in the sixth position, planetary gear 3402(3) of cutter arm assembly 208(3) disengages from teeth of the timing gear 1124. Specifically, planetary gear 3402(3) moves clockwise from geared region 1140(2) into gap 1142(1).

Further still, recall that individual planetary gears 3402(1)-3402(5) include a brake portion 3416 (see FIGS. 6-8). The brake portion is configured to engage brake rail 516. In position 6, the brake portions of planetary gears 3402(2)-3402(5) engage brake rail 516 which begins a gradual de-acceleration process of respective cutter arm assemblies 208(2)-208(5). Further, trigger pin 3004(2) (not designated due to space constraints) contacts trigger block 1134 as indicated at 5304 (the trigger pin and trigger block are not designated in these FIGS. due to space constraints). Recall that the trigger block is a component of the actuator assembly 206. Further, recall that the actuator assembly is in a rearward position. The trigger pin 3004(2) contacts trigger block 1134 and (along with the above mentioned brake rail contact) moves the actuator assembly 206 forward (i.e., counter-clockwise). The actuator assembly, of course, has mass and thereby inertia. Accelerating the actuator assembly forward causes deceleration (i.e., slowing) of cutter arm assemblies 208(2)-208(5).

FIGS. 54 and 55 are again similar to FIGS. 42 and 43, respectively except that harvester apparatus 122(18) is now in a seventh position (i.e., position 7). FIG. 55 shows a close-up view as indicated at 5402. In position 7, cutter arm assemblies 208(2)-208(5) continue their deceleration as they move actuator assembly 206 forward until it contacts front bumper mount assembly 512(1).

The front bumper mount assembly 512(1) can be compressible to provide some shock absorption or 'cushion'. Lacking another signal from the sensor to solenoid assembly 908, forward movement of cutter arm assemblies 208(2)-208(5) and actuator assembly 206 stops once the front bumper mount assembly 512(1) is compressed. Considered another way, lacking another signal (caused by sensing another harvestable asparagus spear in close proximity to the first) within a predetermined period of time the second and subsequent cutter arm assemblies are decelerated and stopped.

Also, at this point, rearward travel of trigger pins 3004(3)-3004(5) is limited by latch detents 922(1)-922(3), respectively. Alternatively, if the sensor senses another harvestable asparagus spear and sends another signal to the solenoid assembly 908, then forward movement of the actuator assembly 206 is stopped by the front bumper mount assembly 512(1), but the cutter assemblies can continue their forward movement as described above relative to FIGS. 42-53 except that each cutter arm assembly 208(2)-208(5) has moved up one position or place.

Stated another way, as cutter arm assembly 208(1) moves away from the actuator assembly 206 around ring gear 508, the process can be repeated except that cutter arm assembly 208(2) moves forward to take the position or place previously occupied by cutter arm assembly 208(1). Similarly, cutter arm assembly 208(3) moves forward to take the position or place previously occupied by cutter arm assembly 208(2), cutter arm assembly 208(4) moves forward to take the position or place previously occupied by cutter arm assembly 208(3) and cutter arm assembly 208(5) moves forward to take the position or place previously occupied by cutter arm assembly 208(4). The place or position previously occupied by cutter arm assembly 208(5) is temporarily vacant until cutter arm assembly 208(1) completes its journey around ring gear 508 described below.

In summary, after the acceleration of positions 2-4, the performance of actuator assembly 206 depends on receipt of a subsequent signal(s). If no subsequent signal is received, the actuator assembly 206 gradually decelerates and stops the remaining cutter arm assemblies 208(2)-208(5). Once the remaining cutter arm assemblies 208(2)-208(5) come to a stop, the process can be repeated as in position 1 with each of these cutter assemblies moving up one place. Alternatively, if a subsequent signal(s) is received while remaining cutter arm assemblies 208(2)-208(5) are still moving, these remaining cutter arm assemblies can be reaccelerated by the actuator assembly 206.

FIGS. 42-55 when considered collectively describe an example of a clutch or control assembly that is configured to control individual cutter arm assemblies 208(1)-208(5) based upon signals received from the sensor. In this case, actuator assembly 206 functions as the clutch assembly. In this example, mechanical force for driving the cutter arm assemblies 208(1)-208(5) is provided by cutter shaft 120 via the drive gear 3906. Actuator assembly 206 functions to selectively impart radial motion to cutter arm assemblies 208(1)-208(5) with the mechanical force based upon signals received from sensor 126(18) (FIG. 1). For instance, position 1 shows the cutter arm assemblies 208(1)-208(5) in a neutral or ready position where the actuator assembly is not imparting radial motion to the cutter assemblies.

Positions 2-4 show actuator assembly 206 imparting radial motion to the cutter arm assemblies 208(1)-208(5) via activation of solenoid assembly 908. In Positions 5-7 cutter arm assembly 208(1) continues its radial motion and leaves the control of actuator assembly 206, while the remaining cutter arm assemblies 208(2)-208(5) are individually decoupled from the mechanical force of the cutter shaft. During this period, either the actuator assembly 206 receives another signal and again imparts radial motion on cutter arm assemblies 208(2)-208(5), or actuator assembly 206 returns them to the neutral or ready position.

Further, actuator assembly 206 offers two noteworthy features in the manner in which it imparts or does not impart radial motion to the cutter arm assemblies 208(1)-208(5). First, upon receipt of a sensor signal, actuator assembly 206 imparts radial motion upon multiple cutter arm assemblies. For instance, in position 2, the actuator assembly 206 imparts radial motion upon all of the cutter arm assemblies 208(1)-208(5) under its control.

Imparting motion to multiple cutter arm assemblies rather than just the leading cutter assembly 208(1) can allow harvesting apparatus 122(18) to harvest relatively closely spaced asparagus spears. For instance, consider a scenario where the sensor detects a first asparagus spear and then another asparagus spear a couple of inches later. Upon detection of the first spear a signal is sent to the actuator assembly's solenoid assembly 908 (i.e., position 2). In this configuration, the actuator assembly causes all of the cutter arm assemblies 208(1)-208(5) to begin moving radially. The first cutter arm assembly 208(1) continues moving radially to harvest the first asparagus spear. When the second signal is received, the second cutter arm assembly is already moving radially. A second activation of the solenoid assembly can send the second cutter arm assembly 208(1) after the first cutter assembly 208(1) with less delay than if the second cutter assembly 208(2) had been stationary when the second sensor signal was received by the actuator assembly 206. Stated another way, since the second cutter arm assembly 208(2) is already moving when the second sensor signal is received, the second cutter arm assembly 208(2) can be separated from the first cutter arm assembly 208(1) by fewer radians than if the second cutter arm assembly 208(2) had been stationary. This example is explained in the context of two asparagus spears sensed in close proximity to one another. However, this feature is also applicable to situations where 3, 4, or 5 or more asparagus spears are sensed in close proximity to one another.

Another feature of interest that is offered by actuator assembly 206 is the rate of acceleration and deceleration of the cutter arm assemblies 208(1)-208(5) during operation. Relatively sudden acceleration and/or deceleration can result in components experiencing high peak forces. High peak forces contribute to equipment failure, especially over multiple thousands of cycles. In contrast, actuator assembly 206 offers relatively gradual acceleration and deceleration of the cutter arm assemblies 208(1)-208(5). For instance, as described above, acceleration of cutter arm assemblies 208(1)-208(5) begins in position 2. The peak acceleration of the cutter arm assemblies 208(1)-208(5) is lessened in that in order to move forward in a counter-clockwise direction, they exert a force on the actuator assembly 206 thereby pushing it backwards. Not until position 4 where the actuator assembly 206 is stopped from further rearward travel do the cutter arm assemblies 208(1)-208(5) experience full acceleration. Stated another way, the cutter arm assemblies 208(1)-208(5) can be gradually accelerated between positions 2 and 4.

Similarly, deceleration of the cutter arm assemblies 208(2)-208(5) begins when their respective planetary gears 3402(2)-3402(5) engage brake rail 516 of actuator assembly 206. The trigger pin 3004(2) contacts trigger block 1134 and moves the actuator assembly 206 forward (i.e., counterclockwise). Accelerating the actuator assembly forward causes deceleration (i.e., slowing) of the cutter arm assembly 208(2) (and thereby cutter arm assemblies 208(3)-208(5)).

In position 7, cutter arm assemblies 208(2)-208(5) continue their deceleration as they move actuator assembly 206 forward until it contacts and compresses front bumper mount assembly 512(1). Thus, actuator assembly 206 offers an example of a clutch mechanism that selectively and independently controls the cutter arm assemblies 208(1)-208(5) in a manner that allows successful harvesting of relatively closely spaced asparagus spears while decreasing peak forces upon the cutter arm assemblies 208(1)-208(5).

FIGS. 56-58 show harvester apparatus 122(18) in an eighth position (i.e., position 8). FIG. 56 is a perspective view of position 8, FIG. 57 is a side elevational view, and FIG. 58 is a front elevational view of position 8. Recall from FIGS. 5-8 that ring gear assembly 212, includes a cam 504 that varies in thickness along its circumference. Further recall from FIGS. 13-17 that cutter arm assembly 208(1) includes a cam follower 1342.

The cam follower 1342 follows the thickness of the cam as cutter arm assembly 208(1) radially progresses around the circumference. As the cam follower 1342 experiences increasing thickness of region 548 of cam 504, the cam forces the cam follower 1342 outward as indicated by arrow 5602. This outward movement of cam follower 1342 is transferred through the pushrod's ball end linkage bottom 1324 to opening wedge 1314. The outward pressure on the opening wedge pushes the opening wedge against contact structure 1341. A curved surface of the opening wedge contacts and forces opening bearing 1344 (and hence spring arm 1306) to move at a right-angle to arrow 5602 as indicated at 5604. Arrow 5604 extends parallel to the y-reference axis. Opening wedge 1314 also pushes against the contact structure 1341 of the cutter arm causing the cutter arm to open in an opposite direction as the spring arm. Thus, the force from cam 504 is translated in a manner that causes cutter assembly 1304 and spring arm assembly 1306 to move away from one another (i.e., open) as indicated at 5604.

Thus, position 8 shows that the cutter assembly 1304 and spring arm assembly 1306 are opened to a width $w_1$ (introduced FIG. 1) as cutter arm assembly 208(1) approaches the harvest zone. This explanation can be applied to the remaining cutter assemblies 208(2)-208(5). Thus, each of the cutter assemblies is capable of harvesting asparagus spears within width $w_1$. In summary, cam 504 and cutter arm assembly 208(1) function to open the cutter assembly 1304 and spring arm assembly 1306 and hold them open so that asparagus spears in the harvest zone pass between the cutter assembly 1304 and spring arm assembly 1306 rather than on the outside of one of them.

Note further, that at this point cutter arm spring 1812 resiliently biases cutter knife 1806 in an outward direction (i.e., away from cutter shaft 120). This aspect will be discussed in more detail below relative to position 9.

FIGS. 59-61 show harvester apparatus 122(18) in a ninth position (i.e., position 9). FIG. 59 is a perspective view of position 9, FIG. 60 is a side elevational view, and FIG. 61 is a front elevational view of position 9. For orientation purposes, the surface of the ground or soil and a harvestable asparagus spear 134 are shown in FIG. 60 along with the direction of movement 102 of the selective harvester. These features are not shown relative to FIGS. 59 and 61 to avoid obstructing components of cutter arm 208(1).

In position 9, the sensed asparagus spear 134 is just about to pass between the cutter assembly 1304 and spring arm assembly 1306. At this point, cam 504 transitions from thicker region 548 to thinner region 550. Accordingly, the cam follower 1342 is no longer forced outward and thus the cutter assembly 1304 and spring arm assembly 1306 are no longer held 'open' as in position 8 described above. This can be thought of as a 'floating' position.

In this floating position, the cutter assembly 1304 and spring arm assembly 1306 can begin to close toward each other until one or both contact the asparagus spear. Further, the cutter assembly 1304 and spring arm assembly 1306 can swing independently of one another relative to (i.e., parallel to) the y-reference axis. In this case, the cutter assembly 1304 is hingedly attached to the arm mount master 1302 (see FIGS. 13-17). Spring arm assembly 1306 is also hingedly attached to the arm mount master 1302 (see FIGS. 13-17). Thus, the cutter assembly 1304 and the spring arm assembly 1306 can each move or swing inwardly independently of one another. If one of the cutter assembly 1304 and the spring arm assembly 1306 contacts the asparagus spear, the other can continue to move inwardly until also contacting the spear. Thus, the asparagus spear can be grasped between the cutter assembly 1304 and the spring arm assembly 1306. Specifically, the asparagus spear is grasped between pad 1830 of cutter assembly 1304 and pad 2216 of spring arm assembly 1306 (see FIGS. 18-25).

Recall that in the discussion of FIG. 1 a distance 132 between the sensed area and the harvesting apparatus was introduced. The discussion relative to FIGS. 2-61 illustrate that a rotation of the cutter shaft and/or the gear ratios selected for the above components can allow the cutter arm assembly to be rotated at a rate so that the sensed asparagus spear is grasped between the pads 1830 and 2216 below the cutter shaft. Stated another way, upon sensing an asparagus spear, the time that the selective harvester takes to travel distance 132 matches the time that a cutter arm assembly takes to rotate to a position proximate to the soil and the spear.

FIGS. 62-64 show harvester apparatus 122(18) in a tenth position (i.e., position 10). FIG. 62 is a perspective view of position 10, FIG. 63 is a side elevational view, and FIG. 64 is a front elevational view of position 10. In a similar manner to position 9, asparagus spear 134, the ground surface and the direction of movement 102 are shown relative to FIG. 63.

In position 10, the sensed asparagus spear 134 should now be grasped (and/or in the process of being grasped) between the cutter assembly 1304 and spring arm assembly 1306. At this point, the cutter assembly 1304 and spring arm assembly 1306 are then locked together as they grasp the spear. Specifically, cam follower 1342 contacts locking cam 520. The locking cam forces the cam follower upward or inward as indicated by arrow 6202. Inward movement of the cam follower is transferred through pushrod 1321 to opening wedge 1314. Thus, the inward or upward movement of the cam follower 1342 pulls upwardly on the opening wedge 1314. The opening wedge then forces locking wedge 1320 upward. In this view the locking wedge is just starting to engage locking bearing 1346. As the locking wedge 1320 moves upward the front surface of the locking wedge serves to block the inward movement of the locking bearing 1346 and thereby locks the cutter assembly 1304 and spring arm assembly 1306 together.

Further, as cutter assembly 208(1) continues to move radially, cutter knife 1806 begins to contact the surface of the soil (and may pass through the surface into the soil). Recall from the discussion of position 8 that, in some implementations, cutter arm spring 1812 resiliently biases cutter knife 1806 in an outward direction (i.e., away from cutter shaft 120). Contact with the soil surface can overcome this resilient bias and force the cutter knife upward or inward toward the cutter shaft. Shortly thereafter, and while in the upward position, the cutter knife can contact and sever the asparagus spear 134 at or below the soil surface. The discussion of this aspect will continue relative to position 11.

Figure 65:
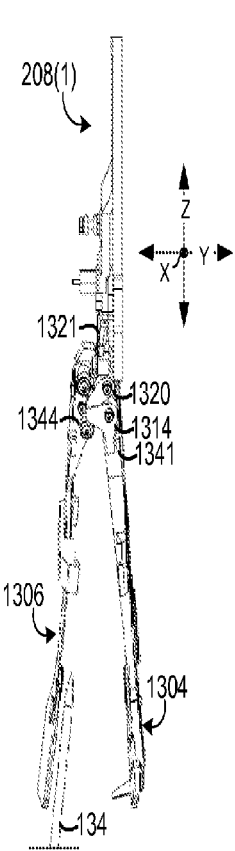
Figure 66:
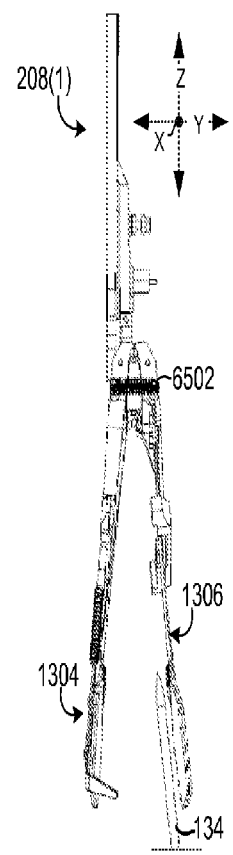
Figure 67:
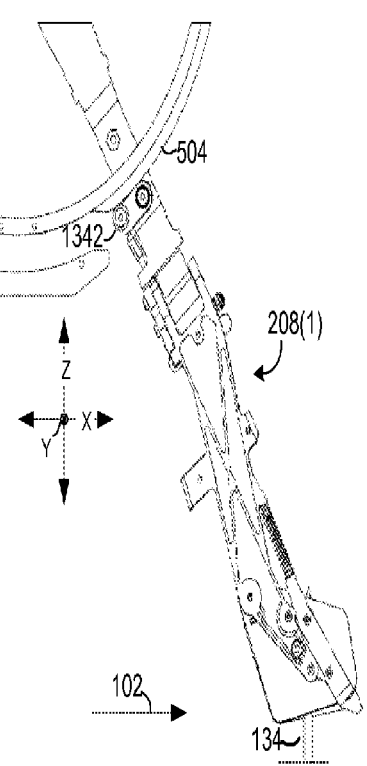
Figures 68, 69, 70:
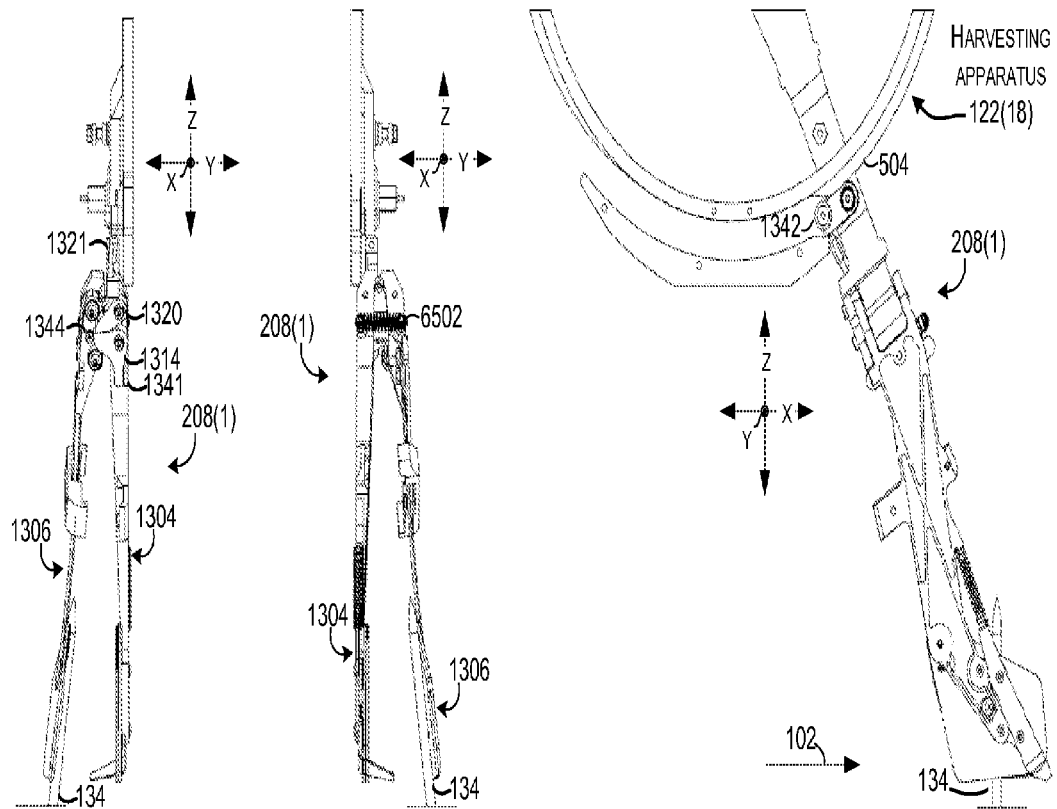
Figure 71:
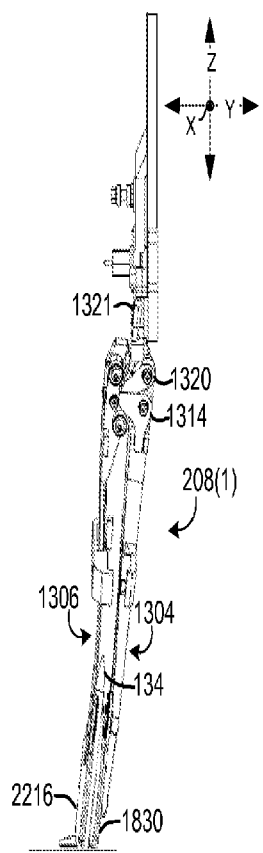
Figure 72:
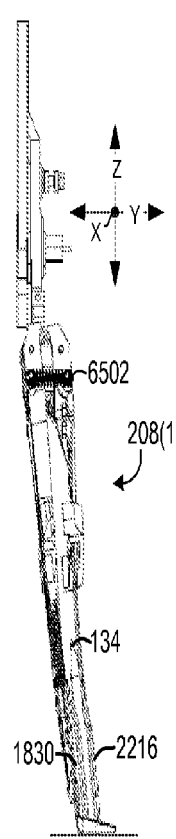
Figure 73:
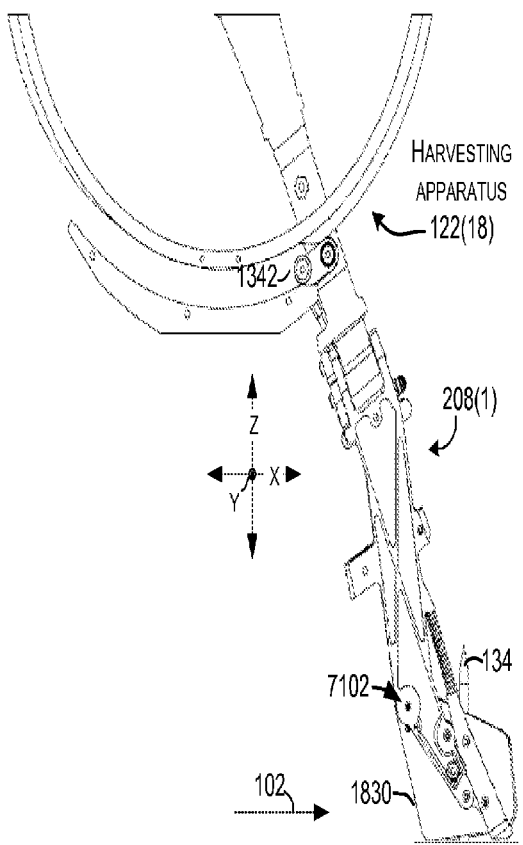
Figure 74:
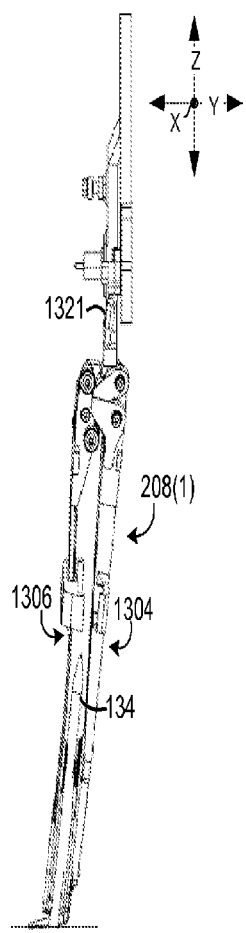
Figure 75:
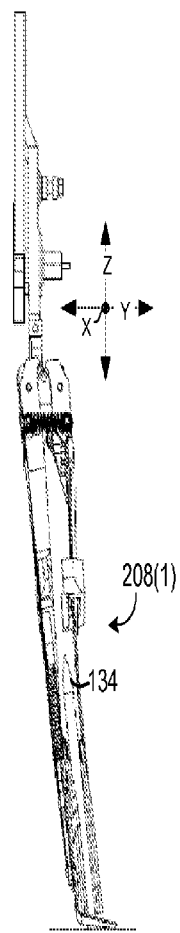
Figure 76:
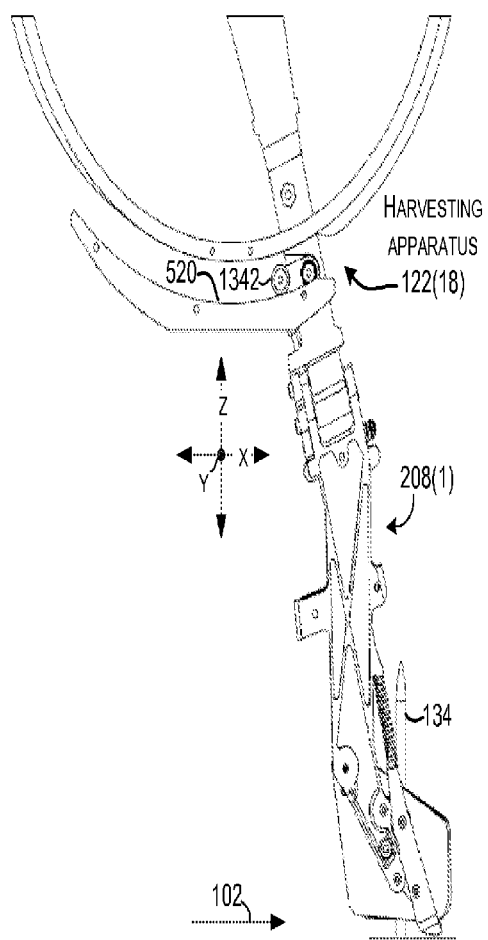

FIGS. 65-79 show slightly different views of harvester apparatus 122(18) in an attempt to illustrate features that might not be apparent in the previous FIGS. For ease of discussion, FIGS. 65-67 can be thought of as showing cutter assembly 208(1) at the advanced stages of position 8 described above. FIGS. 68-70 are similar to position 9. FIGS. 71-73 are between positions 9 and 10. FIGS. 74-76 are similar to early position 10. FIGS. 77-79 are similar to position 10. Note, that direction of movement 102 of the selective harvester is again provided for orientation purposes.

FIGS. 65-67 show a cam driven open position where cutter assembly 1304 and spring arm assembly 1306 are held away from one another by cam 504. Pushrod 1321 transfers force from cam follower 1342 to opening wedge 1314. This force causes spring arm 1306 to open. Similarly, the opening wedge is forced against contact structure 1341. This outward force overcomes a resilient inward bias created by spring 6502 and causes the spring to extend. At this point, neither of the cutter assembly 1304 and spring arm assembly 1306 has contacted asparagus spear 134.

FIGS. 68-70 show cam follower 1342 disengaging from cam 504 and starting to 'float'. Thus, force is no longer applied by the opening wedge 1314 to overcome the inward bias of spring 6502. As such, the spring starts to pull the cutter assembly 1304 and spring arm assembly 1306 toward one another. In this example, inward movement of spring arm assembly 1306 is stopped by contact with asparagus spear 134 while cutter assembly 1304 continues its inward movement.

In this illustrated floating position, there is little or no tension/force on push rod 1321 so the opening wedge 1314 is free to move or can be considered 'loose'. Stated another way, each of cutter assembly 1304 and spring arm assembly 1306 can move independently of the other, parallel to the y-reference axis. Such a configuration can allow the cutter assembly 1304 and the spring arm assembly 1306 to 'center' on the asparagus spear 134 rather than upon a preset location. In summary, in this example, cutter assembly 1304 and the spring arm assembly 1306 move toward one another until spring arm assembly 1306 contacts asparagus spear 134. The asparagus spear stops spring arm assembly 1306 (relative to the y-reference axis). The cutter assembly 1304 is free to continue its inward movement until it too contacts the asparagus spear. Considered from another perspective, cutter assembly 208(1) is free to pivot relative to the y-reference axis such that the cutter assembly can center itself upon the asparagus spear 134.

Continuing with the float position, FIGS. 71-73 show the cutter assembly 1304 has continued its inward movement until the asparagus spear 134 is grasped between the spring arm assembly 1306 and cutter assembly 1304 via the force imparted by spring 6502. Specifically, the asparagus spear is grasped between pad 2216 of the spring arm assembly 1306 and pad 1830 of the cutter assembly 1304. (Of course, other implementations can utilize other contact elements besides pads). The pads can rotate to reduce or avoid rubbing or damaging the asparagus spear. In some implementations, the harvester apparatus 122(18) can be thought of as briefly rotating around an axis passing through the pads parallel to the cutter shaft (i.e., parallel to the y-reference axis). For instance, such an axis can extend into and out of the printed page upon which FIGS. 71-73 appear at point 7102.

FIGS. 74-76 are similar to FIGS. 71-73 except that the cam follower 1342 is engaging or contacting locking cam 520. The locking cam forces the cam follower upward or inward. This upward movement is transferred downward via pushrod 1321 to lock the spring arm assembly 1306 and cutter assembly 1304 together around the asparagus spear.

FIGS. 77-79 show a subsequent point where the pads 1830 and 2216 continue to rotate around the axis indicated at point 7102 until the cutter knife 1806 severs or cuts the asparagus spear 134. The cutter knife 1806 is configured to absorb impact imparted by contact with the ground. In this case, the cutter knife is spring loaded via cutter arm spring 1812. As discussed above, and in the discussion below relative to position 11, this spring loaded feature can also offer other potential advantages. As will be described in more detail below relative to FIGS. 89-91, the shape of the cutter knife can also absorb impact energy.

FIGS. 80-82 show position 11. Recall that in position 10, the cam follower 1342 was contacting locking cam 520 which kept the spring arm assembly 1306 and cutter assembly 1304 locked together around the asparagus spear. Also recall that, as the cutter knife contacted the soil in position 10, the cutter knife 1806 was forced upward and the cutter arm spring 1812 was compressed. Subsequently, between positions 10 and 11 the cutter knife ceases contact with the soil and cutter arm spring 1812 again resiliently biases the cutter knife outward. The asparagus spear 134 is locked between the pads of the cutter assembly 1304 and the spring arm assembly 1306 so the outward movement of the cutter knife 1806 separates the cutter knife from the asparagus spear.

Further, between position 10 and position 11 the cutter arm assembly 208(1) proceeds to a point where the cam follower 1342 disengages from the locking cam 520. In position 11, the cutter arm assembly 208(1) proceeds to a point where the cam follower is forced outward by a wide or thick portion 552 of cam 504. The cam forces the cam follower downward and thereby opens the spring arm assembly 1306 and cutter assembly 1304 in a similar manner to that explained above relative to FIGS. 56-58. This motion then releases the asparagus spear 134 in a collection zone (not specifically designated). As mentioned above, cutter knife 1806 has already moved away from the asparagus spear, so any tendency of the asparagus spear to stick to the cutter knife is reduced or eliminated. Otherwise, fibers of the asparagus spear may be stuck to the cutter knife and cause the spear to dangle from the cutter knife rather than falling away. This knife movement may be more readily apparent from FIGS. 83-88 discussed below.

In the collection zone, the released asparagus spear 134 can fall into a strategically placed collection mechanism (not specifically shown). The collection mechanism can simply be a box placed behind the cutter arm assemblies 208. In another case, the collection mechanism may have a conveyer mechanism, such as a conveyer belt that moves the harvested asparagus spears to another region of the selective harvester or off of the selective harvester.

Knife Examples

Figure 83:
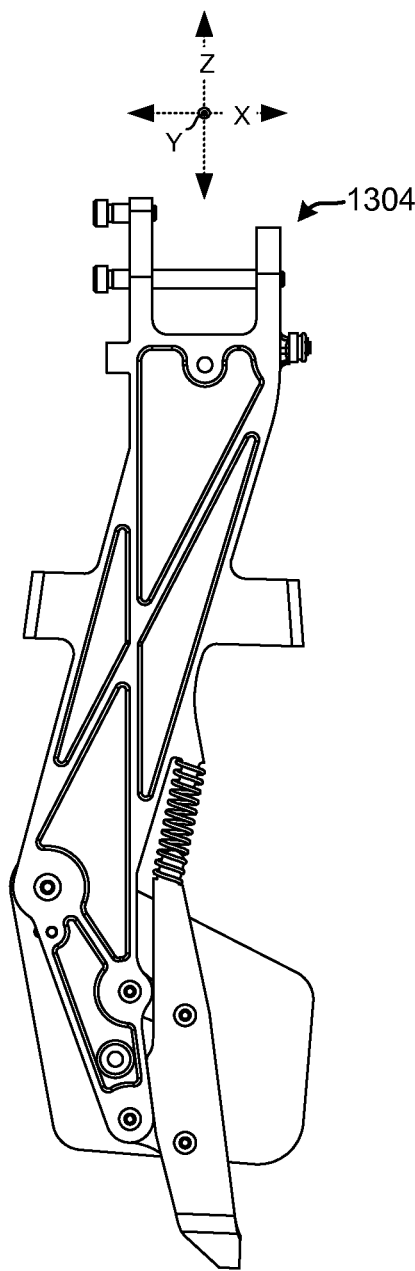
Figure 84:
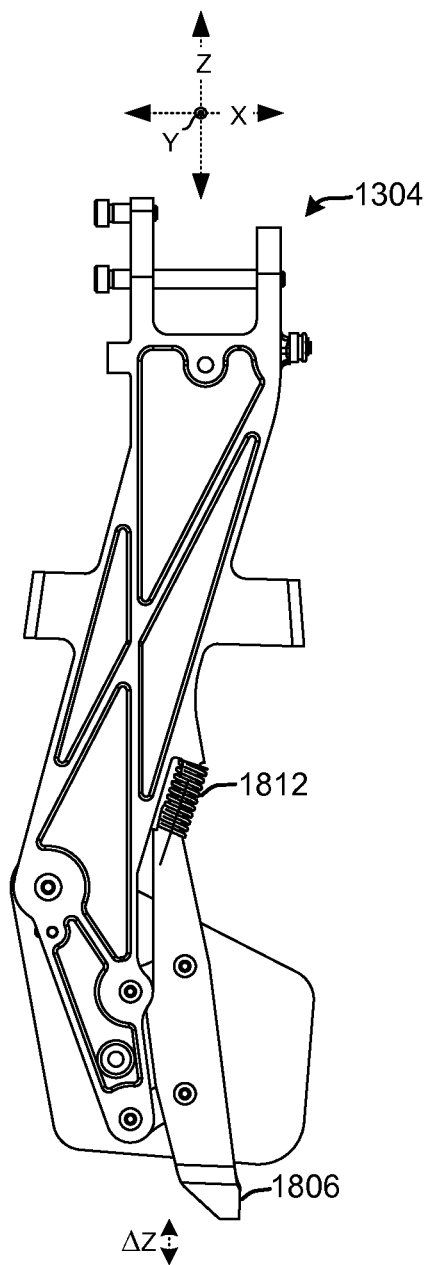
Figure 85:
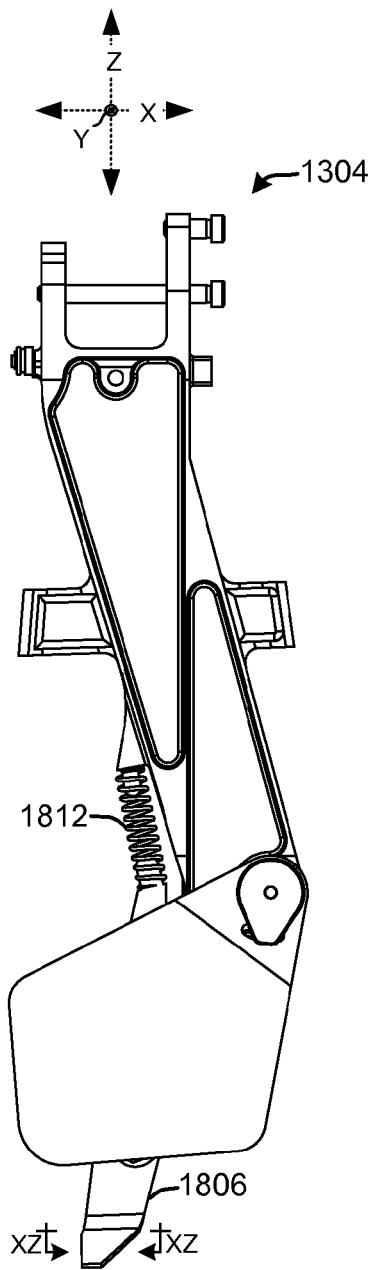
Figure 86:
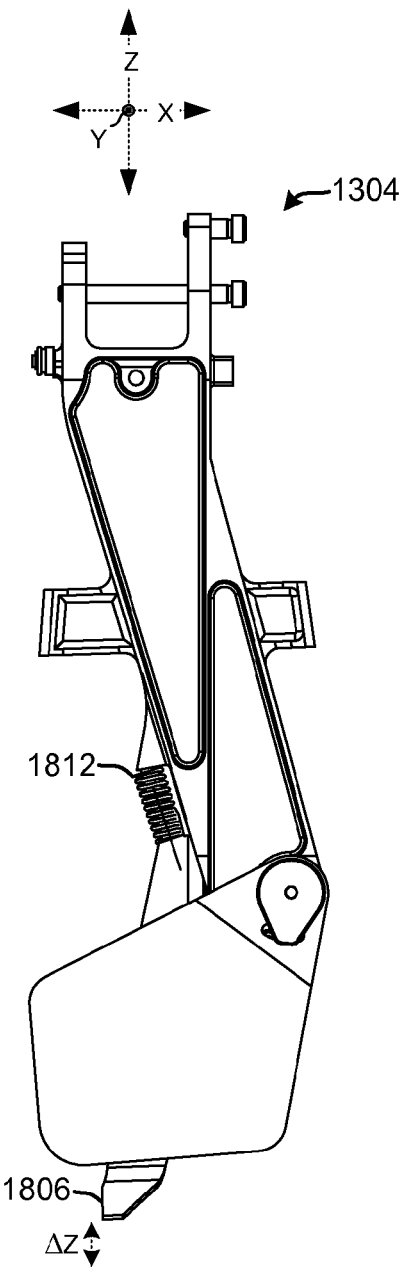

FIGS. 83-88 collectively illustrate knife positions and movement during the harvesting process relative to cutter assembly 1304. FIGS. 83, 85, and 87 show cutter knife 1806 in a downwardly biased orientation produced by cutter arm spring 1812 acting upon the cutter knife. FIGS. 84, 86, and 88 show the same orientations as FIGS. 83, 85, and 87, respectively except that the downward bias of cutter arm spring 1812 has been overcome by contact with the soil which can temporarily force the cutter knife upward by a distance $\Delta z$.

FIGS. 89-95 show additional cutter knife features. FIGS. 89-91 are similar in orientation to FIGS. 87-88 but focus upon the cutter knife 1806. In this case, as indicated in FIG. 90, unless acted upon by the soil, in some implementations, a cutting portion 8902 of the cutting knife is not parallel with the surface of the soil. Instead, the cutting portion can be thought of as forming an acute angle $\alpha$ relative to the soil or an obtuse angle $\beta$ relative to a vertical portion 8904 of the cutting knife (and/or the cutter arm assembly generally). Contact with the soil surface during the harvesting process can flex or bend the cutter knife such that the cutting portion 8902 is parallel with the ground and/or forms a right angle $\beta$ with the vertical position 8904 when contacting and severing asparagus spear 134. This feature can allow the cutter knife 1806 to absorb shock associated with contacting the soil. Further, as can be evidenced from FIG. 91, upon cycling upward away from the soil, cutter knife 1806 can return to the original configuration described relative to FIG. 89. Accordingly, since the asparagus spear is grasped in a manner described above, this feature allows the cutter knife to pull away from the harvested asparagus spear 134 after cessation of contact with the soil. Stated another way, the spear is held by the pads and as contact with the ground ceases the cutter knife can flex away and create separation from the base of the spear. It should be recognized that other cutter knife configurations can be used in various implementations. Further, while the above discussion describes features which allow the cutter knife to absorb impact from contacting the soil, the cutter knife does not need to contact the soil for the harvester apparatus to function.

Figure 92:
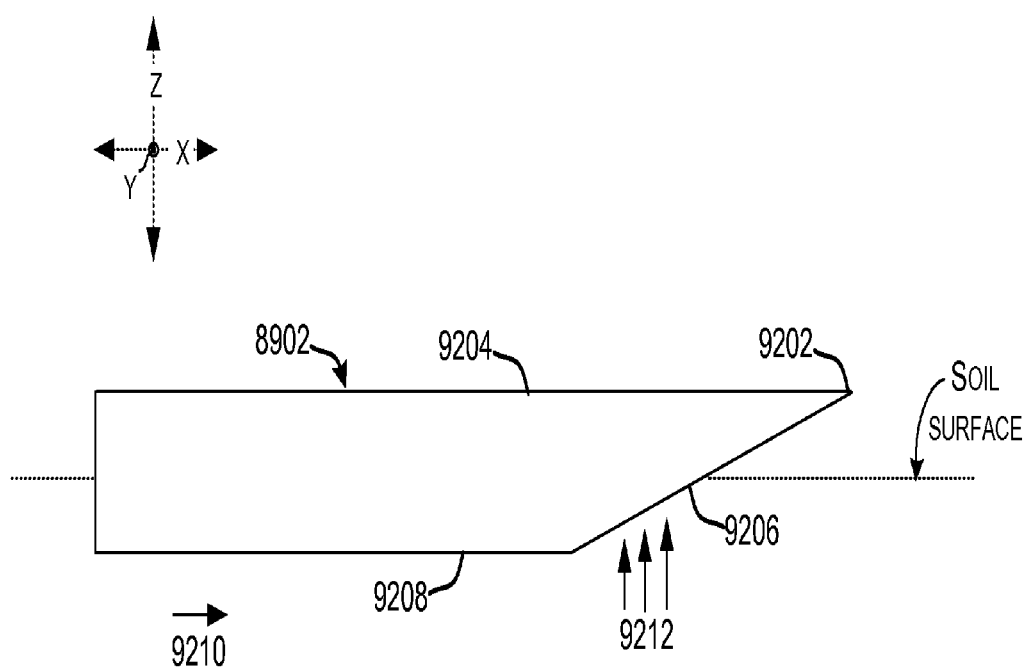
FIG. 92 shows a sectional view of harvester apparatus components in accordance with some implementations of the present concepts.

FIG. 92 shows another view of the cutting portion 8902 of cutter knife 1806. FIG. 92 is a cross-sectional view through cutter knife 1806 parallel to the xz-reference plane as indicated in FIG. 85. In this configuration, a leading edge 9202 is at an upper surface 9204 of the cutting portion. An angled cutting surface 9206 extends from the leading edge back down to a lower surface 9208. Upon contact with the soil surface and/or upon passing into the soil, an upward force 9210 is created by the soil that can reduce a tendency of the cutting portion to 'dive' or 'plow' deeper into the soil as the cutting knife moves through the soil as indicated by arrow 9212. While some implementations can use other cutter knife configurations, this configuration can reduce stress on cutting knife 1806 and/or other components of the harvesting apparatus.

FIGS. 93-95 show three different implementations of lower portion 8902 in a view similar to the view of FIG. 83. For ease of explanation, these lower portions are designated as lower portion 8902(1), 8902(2), and 8902(3), in FIGS. 93-95 respectively. Similarly, leading edges are designated as 9202(1), 9202(2), and 9202(3), respectively.

In some implementations, the leading edge can be parallel to the cutter shaft or the y-reference axis. One such implementation is shown in ghost (dashed lines) relative to FIG. 93 with the leading edge designated as 9202(4). Other implementations can have the leading edge at an oblique angle $\gamma$ relative to the cutter shaft or the y-reference axis. Angling the leading edge can facilitate the asparagus spear and leading edge moving relative to one another upon contact. This movement, which may be thought of as lateral movement, can facilitate a cutting action of the leading edge on the asparagus spear. The base of an asparagus spear can be very fibrous and as such difficult to cut cleanly. Further, cutting edge 9202(1) is smooth, while cutting edges 9202(2) and 9202(3) are serrated. The serrations can further aid in cutting the fibrous asparagus spear. Further still, while cutting edges 9202(1) and 9202(2) are generally linear, cutting edge 9202(3) is curvilinear (a linear line 9502 is provided for reference). In this particular instance, cutting edge 9202(3) can be considered convex, though other configurations can be employed. The combination of serrations and a curvilinear surface can further facilitate cleanly cutting the fibrous asparagus spear during harvesting.

Conclusion

The above description goes into great detail regarding the structure of specific implementations. These structures offer examples for accomplishing the selective harvesting functionality described and claimed herein. For instance, functionality offered by the presently described concepts allows for sensing asparagus spears and selectively harvesting individual spears while leaving other spears relatively unharmed. As the selective harvester travels over an asparagus field, the selective harvesting functionality can have the capacity to selectively harvest individual harvestable spears across a width of the selective harvester. Some implementations accomplish this functionality utilizing a set of serially arranged harvesting apparatus. Individual harvesting apparatus can have the capacity to selectively harvest multiple closely-spaced harvestable asparagus spears. Other implementations can utilize variations of the described structures and/or different structures to accomplish the selective harvesting functionality described herein.

The invention claimed is:

1. A harvester, comprising
a harvesting apparatus that defines an overall width and that includes a hub-bearing assembly and a set of independently controllable cutter arm assemblies that do not exceed the overall width, wherein each of the independently controllable cutter arm assemblies is configured to harvest across an entirety of the overall width.

2. The harvester of claim 1, wherein the hub-bearing assembly includes a drive hub configured to engage a driven cutter shaft.

3. A device, comprising
a cutter arm hub configured to be positioned on a cutter shaft and that includes a vertical mounting flange interposed between a first horizontal portion of the cutter shaft and a second horizontal portion of the cutter shaft;
a set of cutter assembly bearings positioned on an outer surface of the first horizontal portion and an inner shaft bearing positioned on an inner surface of the first horizontal portion; and,
another inner bearing positioned on an inner surface of the second horizontal portion and an arm bearing positioned over the another inner bearing on an outer surface of the second horizontal portion.

4. The device of claim 3, wherein only the inner shaft bearing of the device is configured to contact the cutter shaft upon which the device is positioned.

5. The device of claim 3, wherein the another inner bearing is configured to receive a drive wheel hub that is configured to be driven by the cutter shaft upon which the device is positioned.

* * * * *